United States Patent [19]

Klinkovsky et al.

[11] Patent Number: 4,571,731
[45] Date of Patent: Feb. 18, 1986

[54] PSK MODEM FILTER SWITCH

[75] Inventors: Edward R. Klinkovsky, Brenham; William A. Severin, Houston, both of Tex.

[73] Assignee: Texas Instruments Incorporated, Dallas, Tex.

[21] Appl. No.: 408,578

[22] Filed: Aug. 16, 1982

[51] Int. Cl.⁴ .............................................. H04B 1/38
[52] U.S. Cl. ........................................ 375/9; 375/103
[58] Field of Search ................. 375/8, 9, 10, 44, 46, 375/52, 53, 56, 103; 179/2 DP; 307/574, 577, 279; 330/292; 328/67

[56] References Cited

U.S. PATENT DOCUMENTS

| | | | |
|---|---|---|---|
| 3,349,330 | 10/1967 | Wedmore | 375/9 |
| 3,373,371 | 3/1968 | Fanger | 330/292 |
| 3,536,840 | 10/1970 | Sullivan | 375/46 |
| 3,835,406 | 9/1974 | Thompson | 330/292 |
| 3,937,882 | 2/1976 | Bingham | 375/8 |
| 4,069,392 | 1/1978 | Goldenberg et al. | 179/2 DP |
| 4,336,613 | 6/1982 | Hewes | 375/9 |
| 4,338,571 | 7/1982 | Young | 330/84 |
| 4,371,797 | 2/1983 | Frank | 370/6 |
| 4,425,665 | 1/1984 | Stauffer | 375/9 |
| 4,458,216 | 7/1984 | Bingham | 332/37 R |
| 4,464,587 | 8/1984 | Suzuki et al. | 307/279 |

Primary Examiner—Marc E. Bookbinder
Assistant Examiner—Stephen Chin
Attorney, Agent, or Firm—Thomas G. Devine; Leo N. Heiting; Melvin Sharp

[57] ABSTRACT

A PSK integrated circuit modem employs multi-mode filters in its switched capacitor circuitry for providing a plurality of filter response to accomodate a plurality of modem protocols. Each capacitor is selectively connected or disconnected from the circuit by a transistor switch, and selectively connected and disconnected from the circuit voltage reference by a transistor switch. The switches operate out of phase with each other so that when any capacitor is connected in the circuit, it is disconnected from the reference voltage and when any capacitor is disconnected from the circuit, it is connected to the reference voltage. The modem switch minimizes the effect of stray capacitance from the unselected capacitors and their associated transistor switches that have been turned off.

9 Claims, 87 Drawing Figures

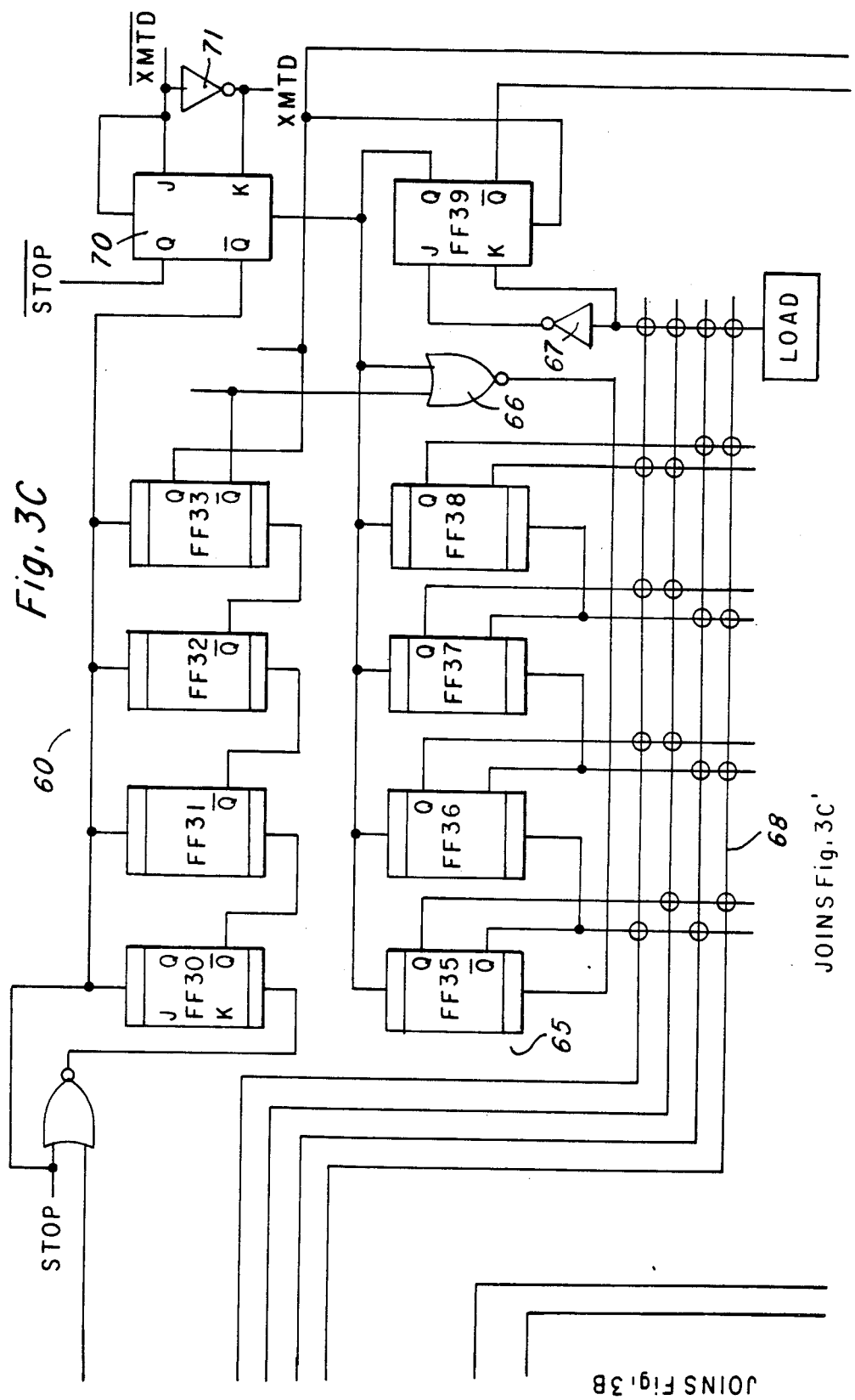

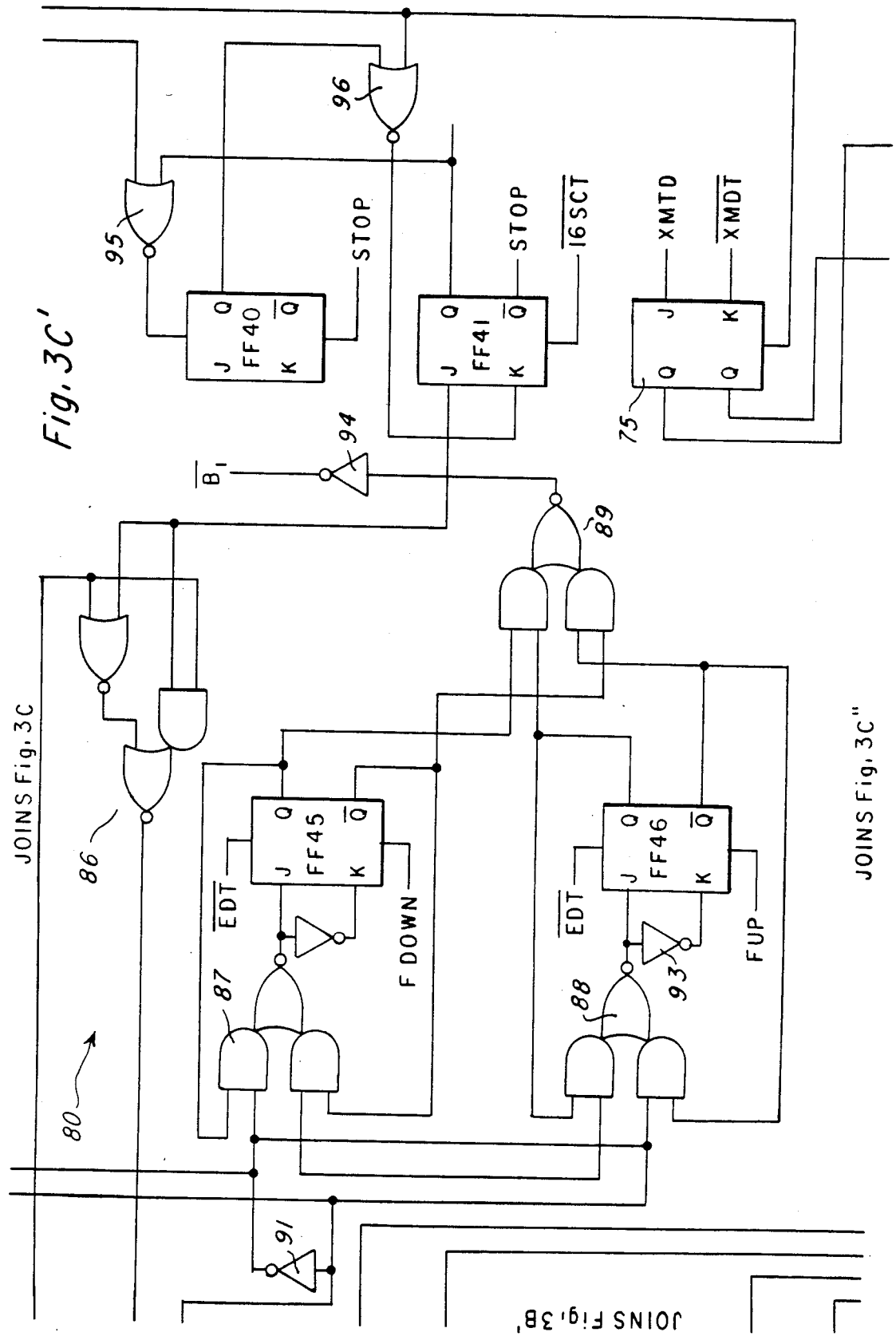

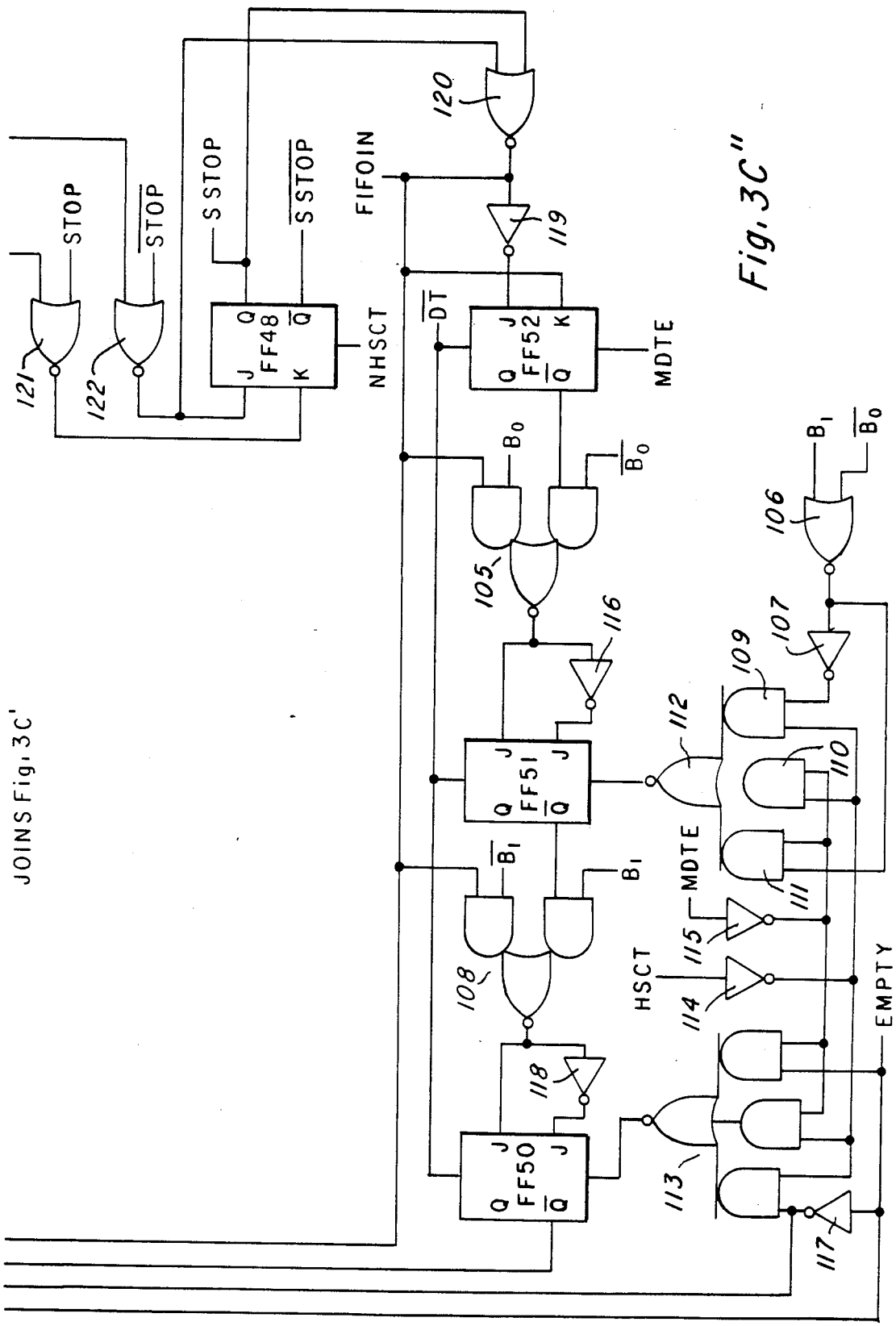
Fig. 3C"

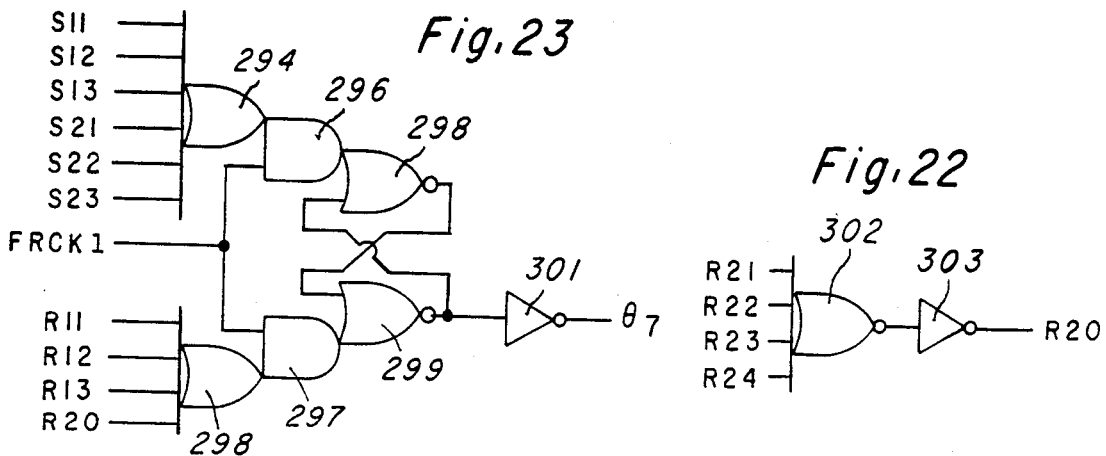
Fig.23
Fig.22
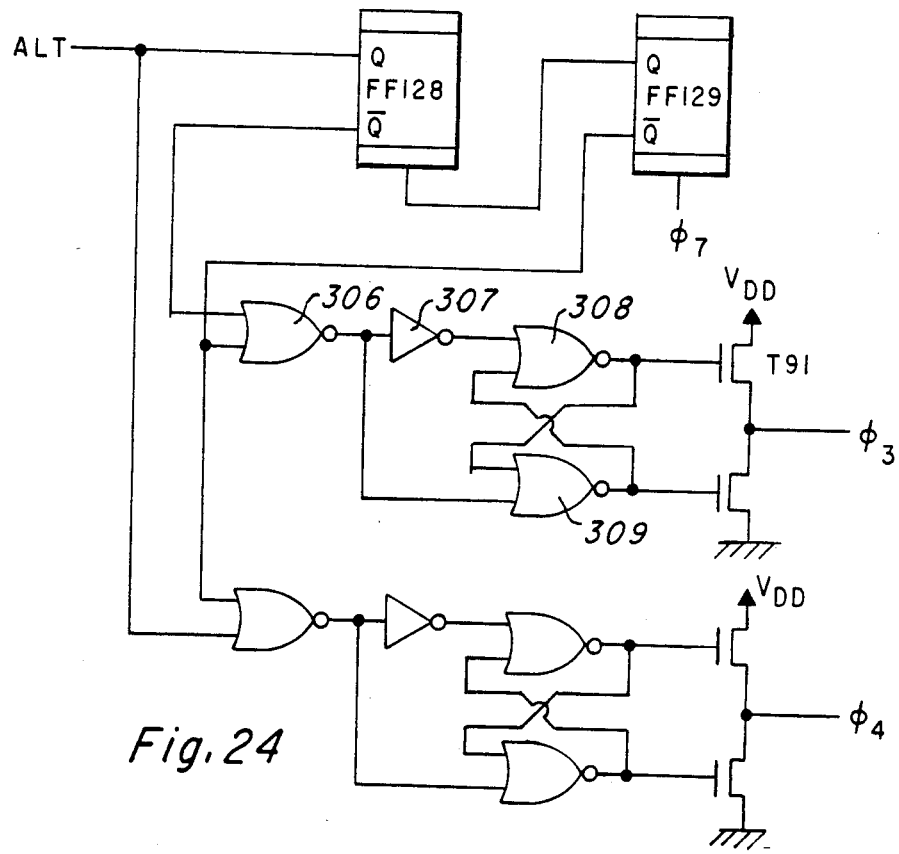
Fig.24
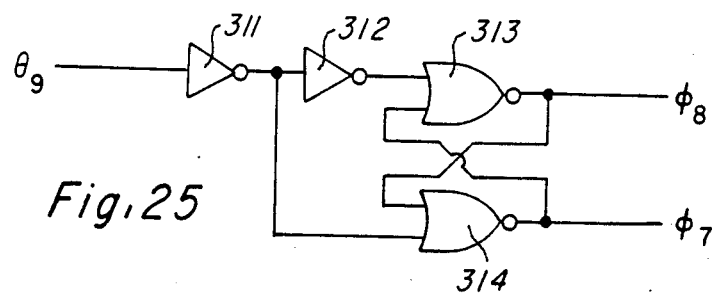
Fig.25

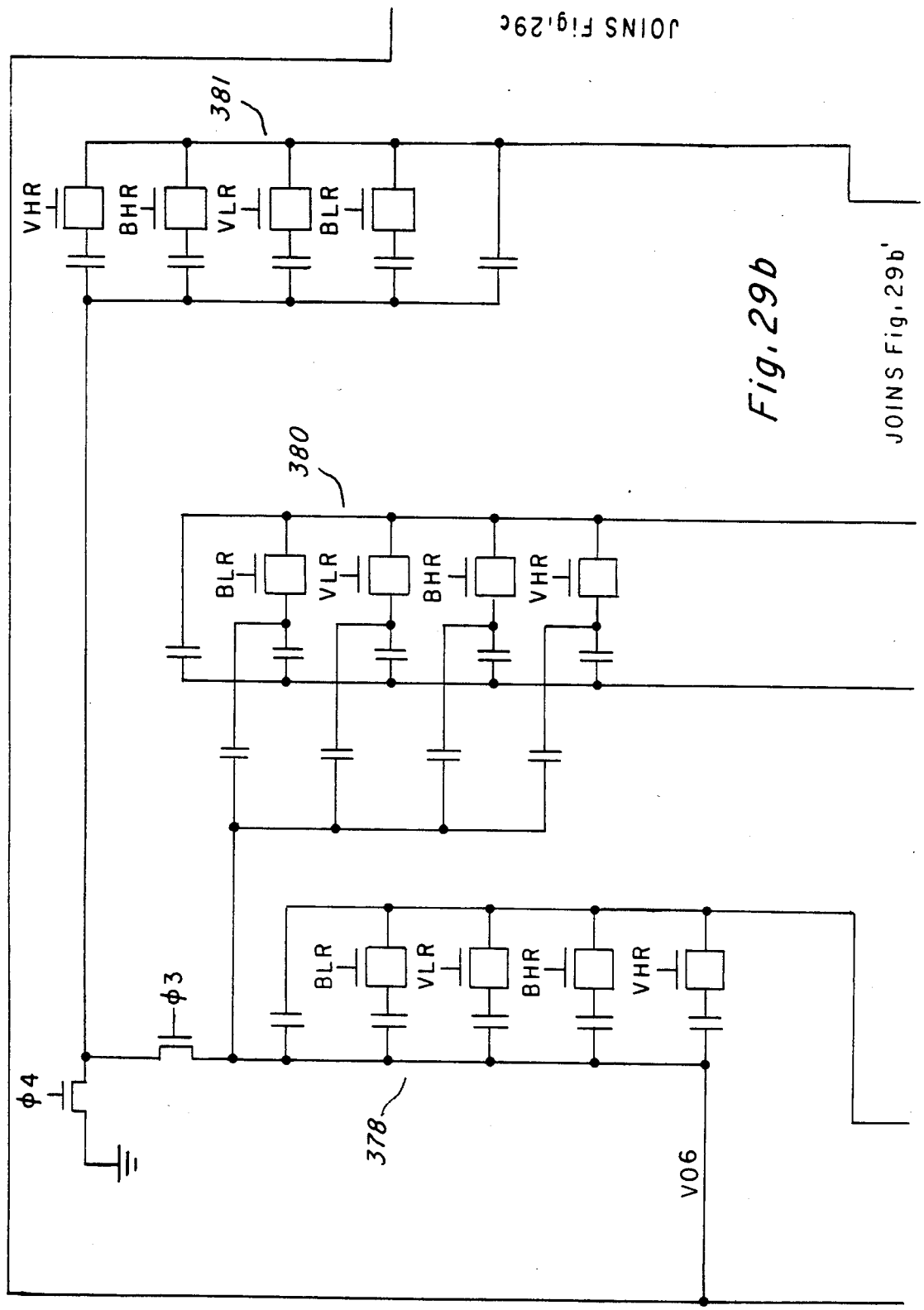

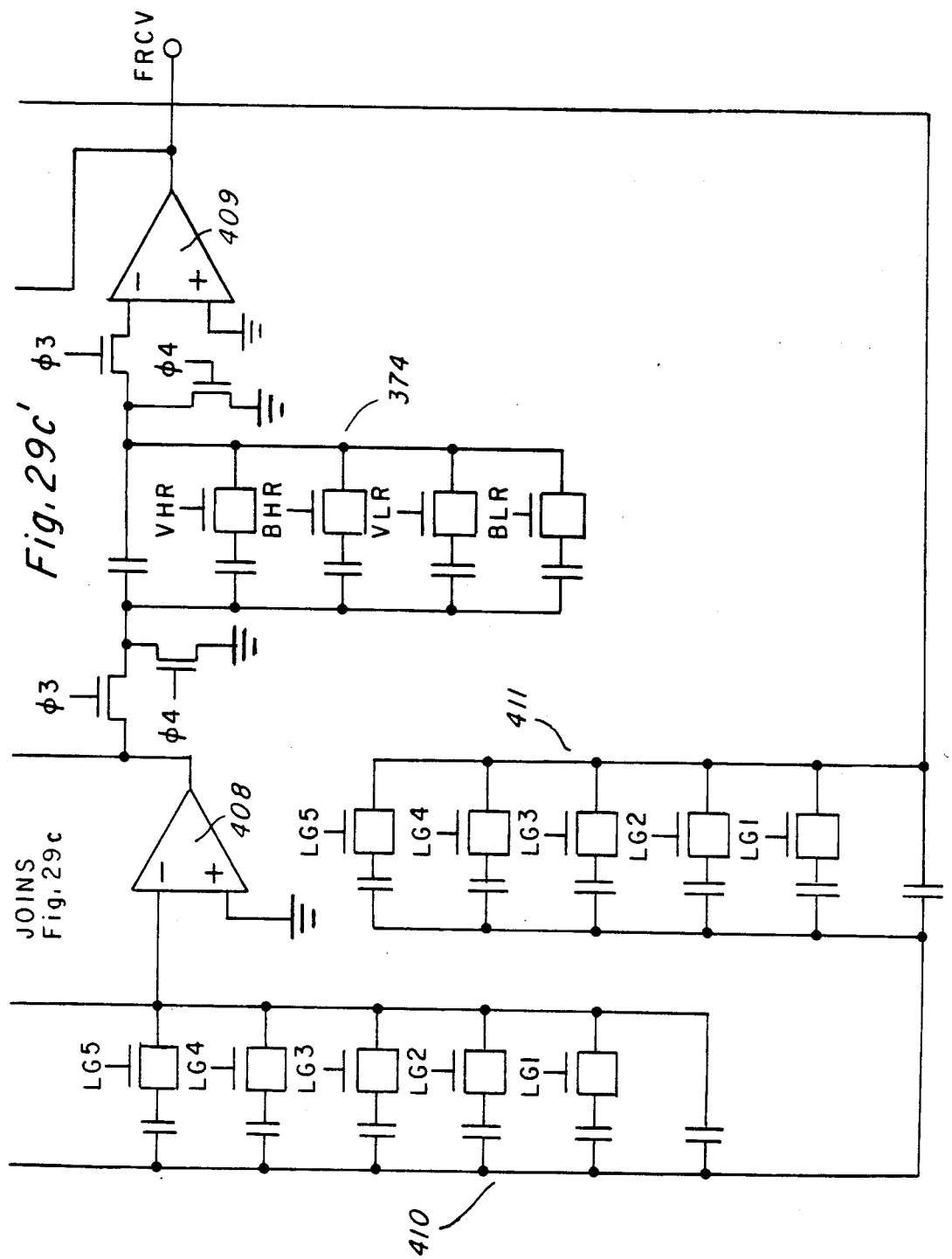

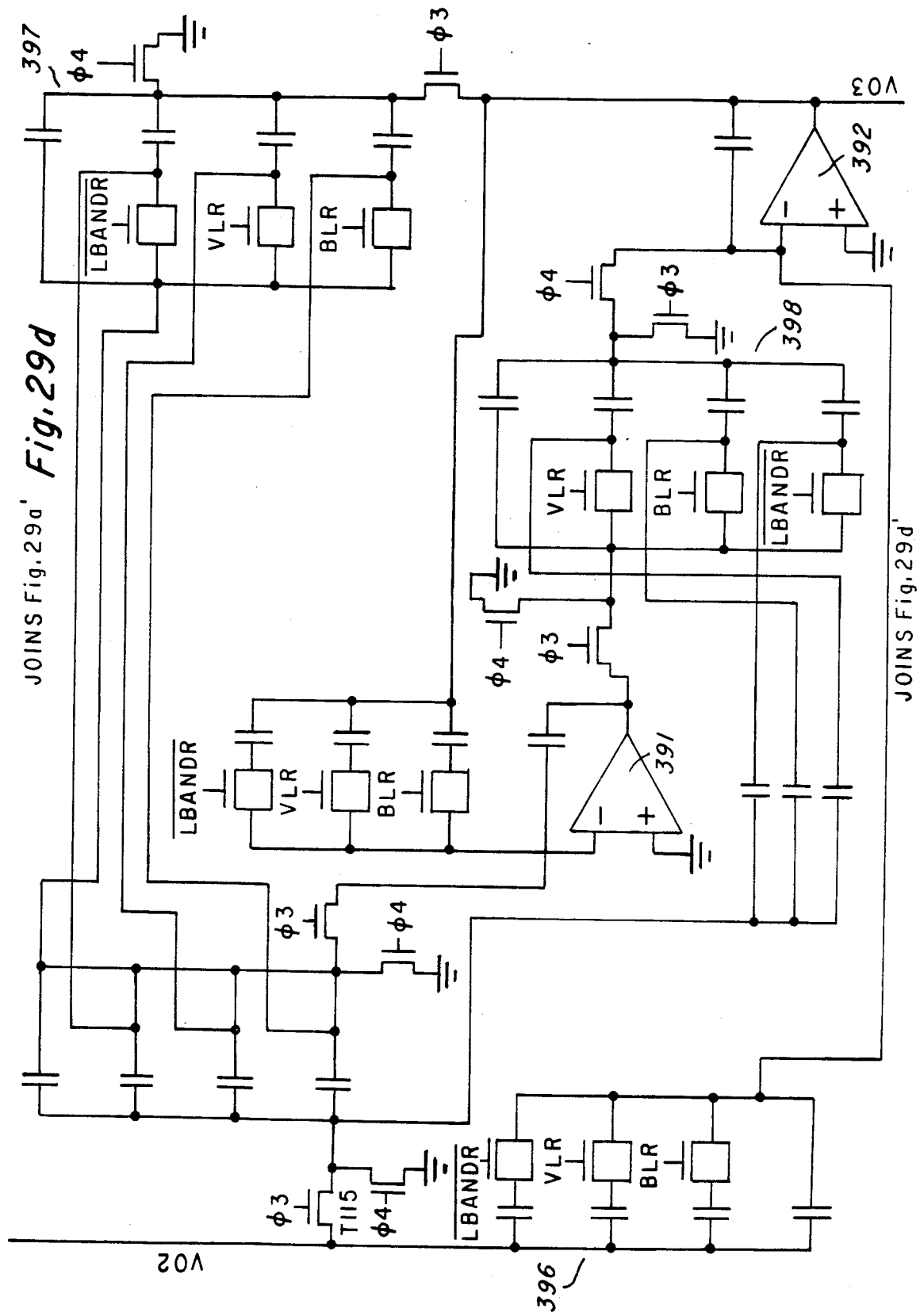

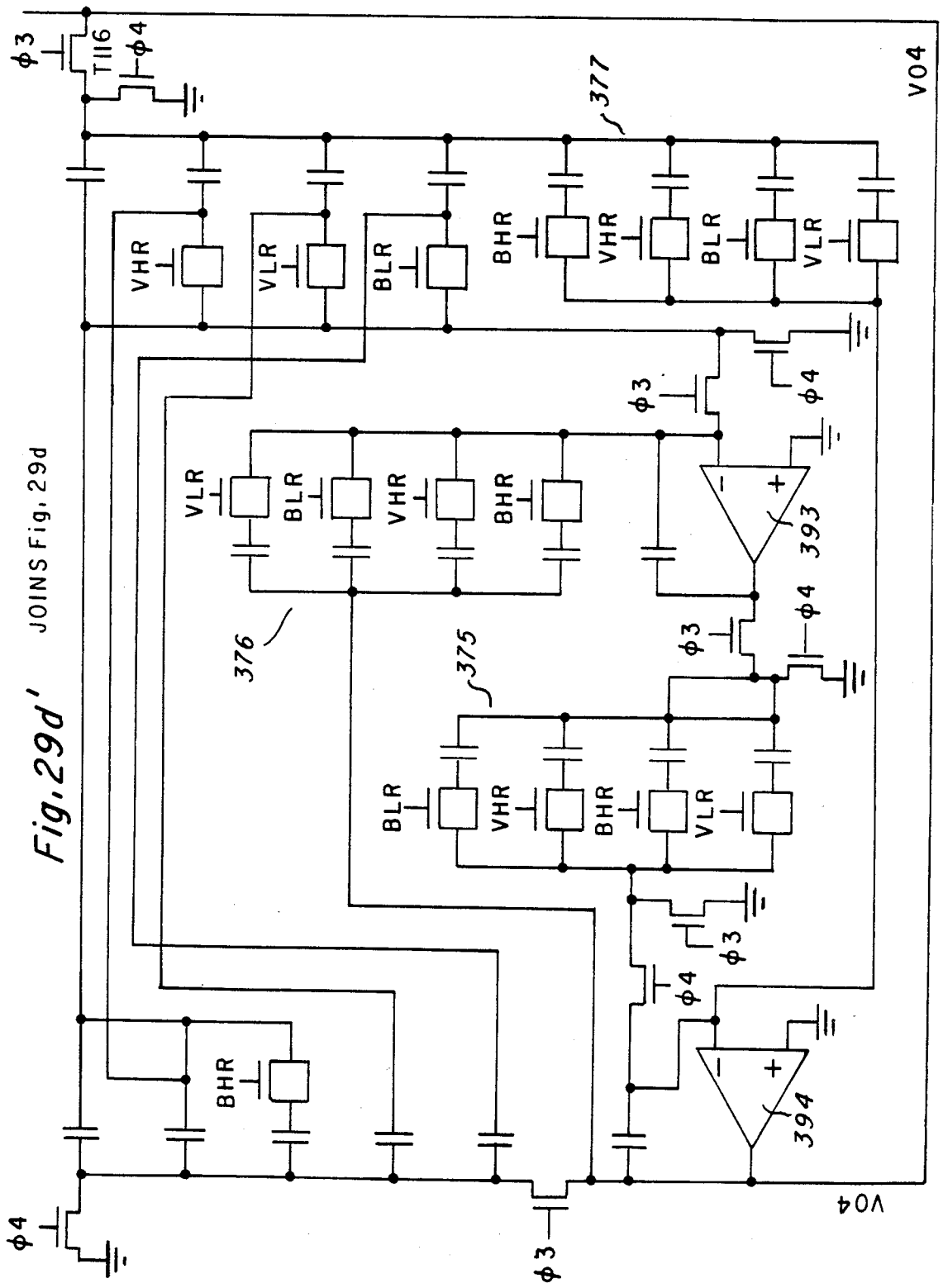
Fig. 29d' JOINS Fig. 29d

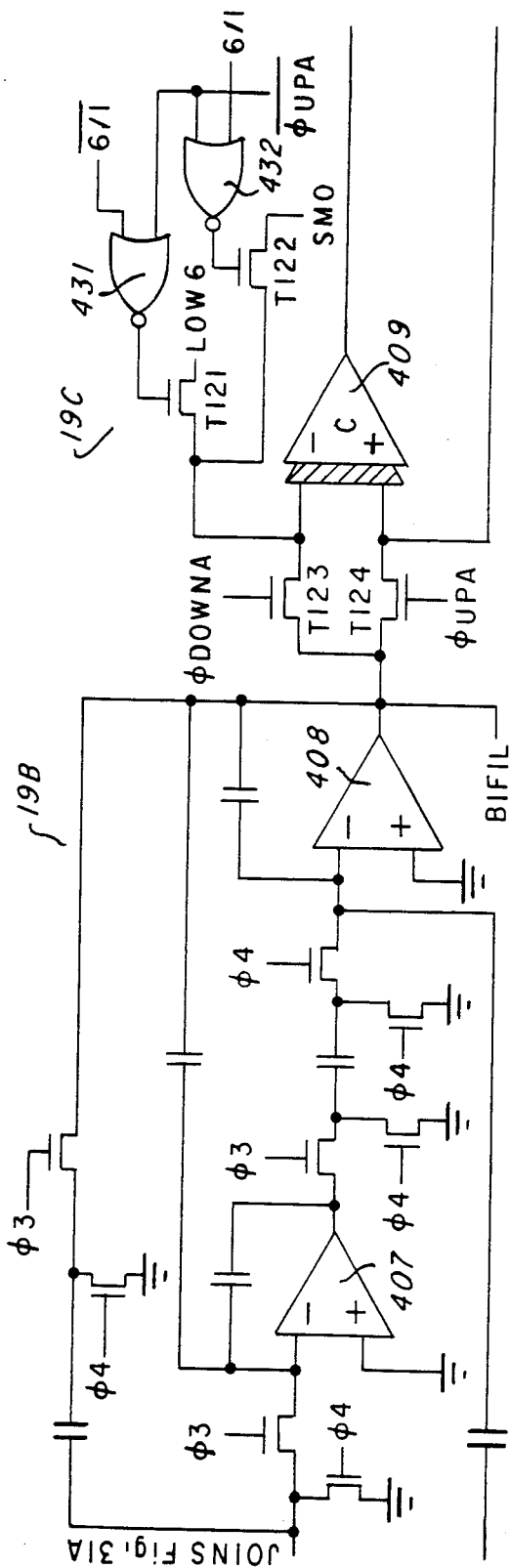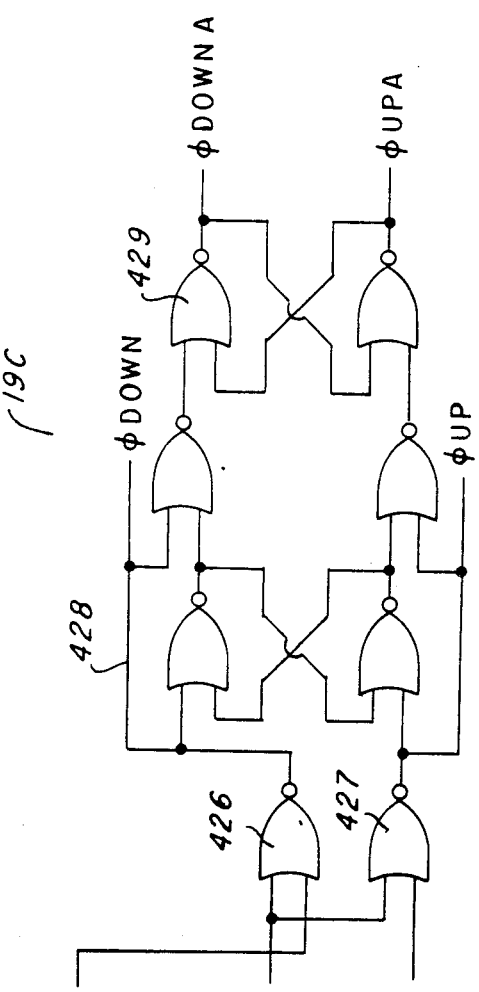
Fig. 31B

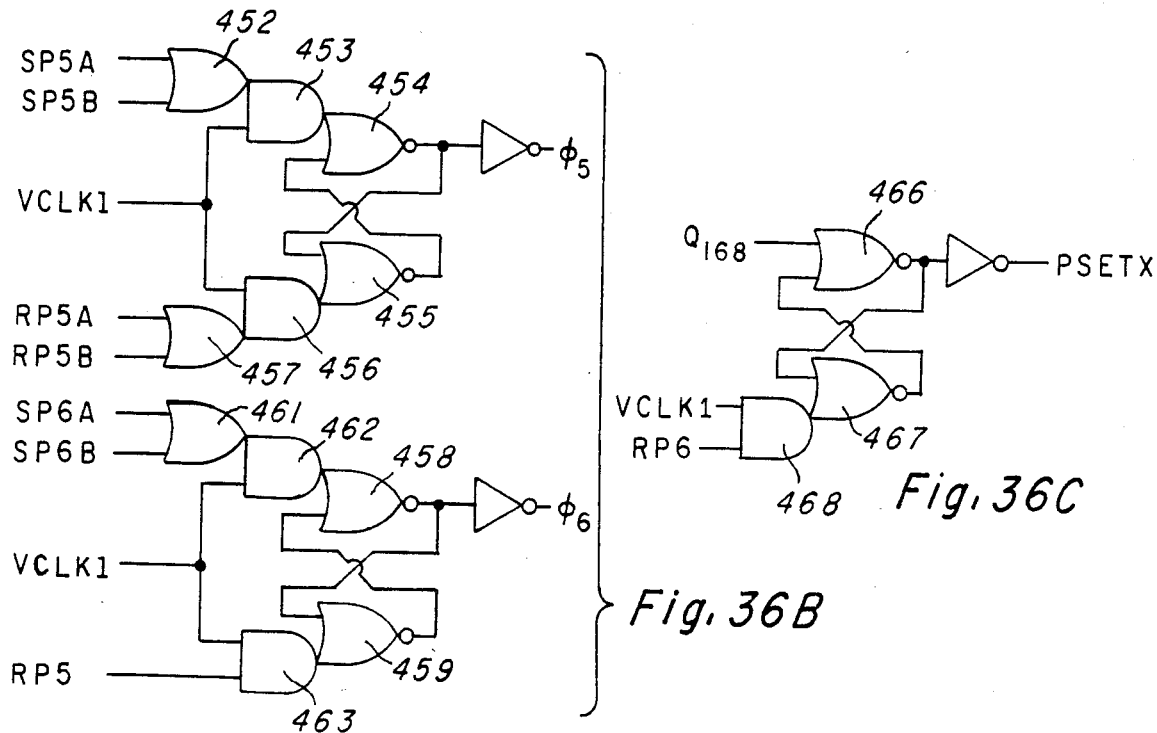
Fig. 36B
Fig. 36C
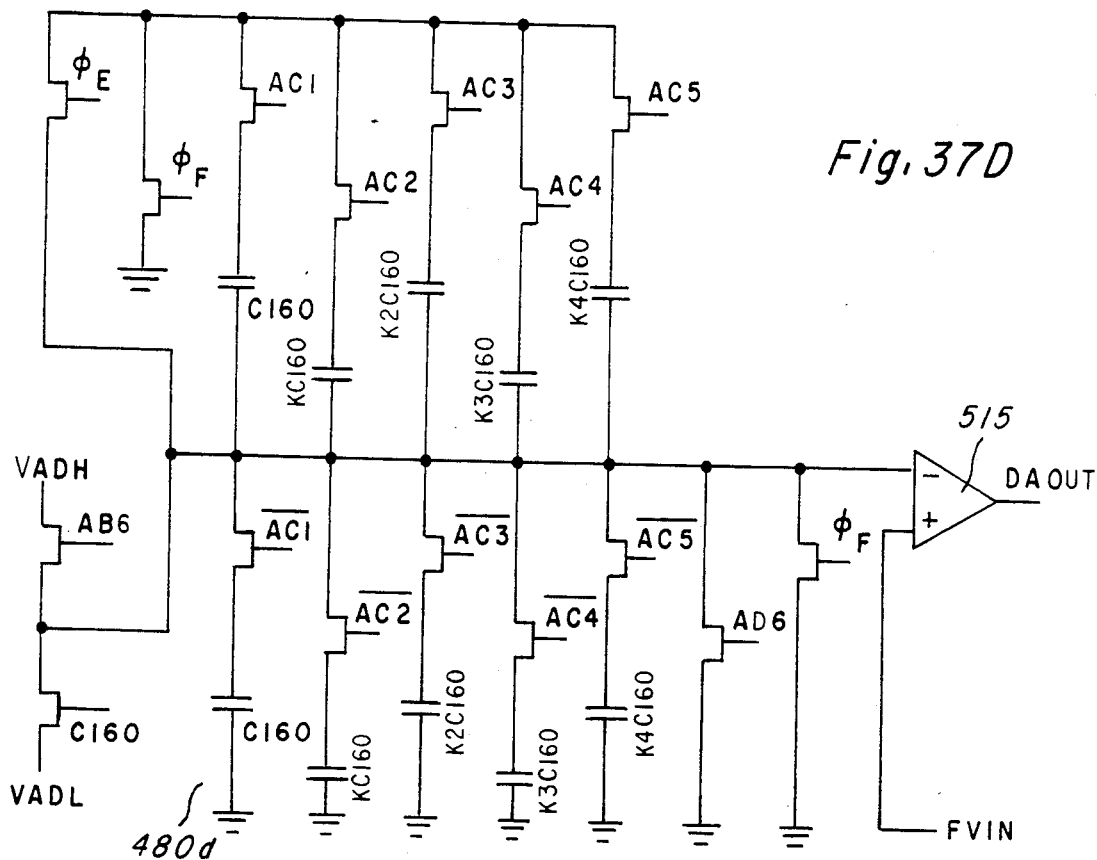
Fig. 37D

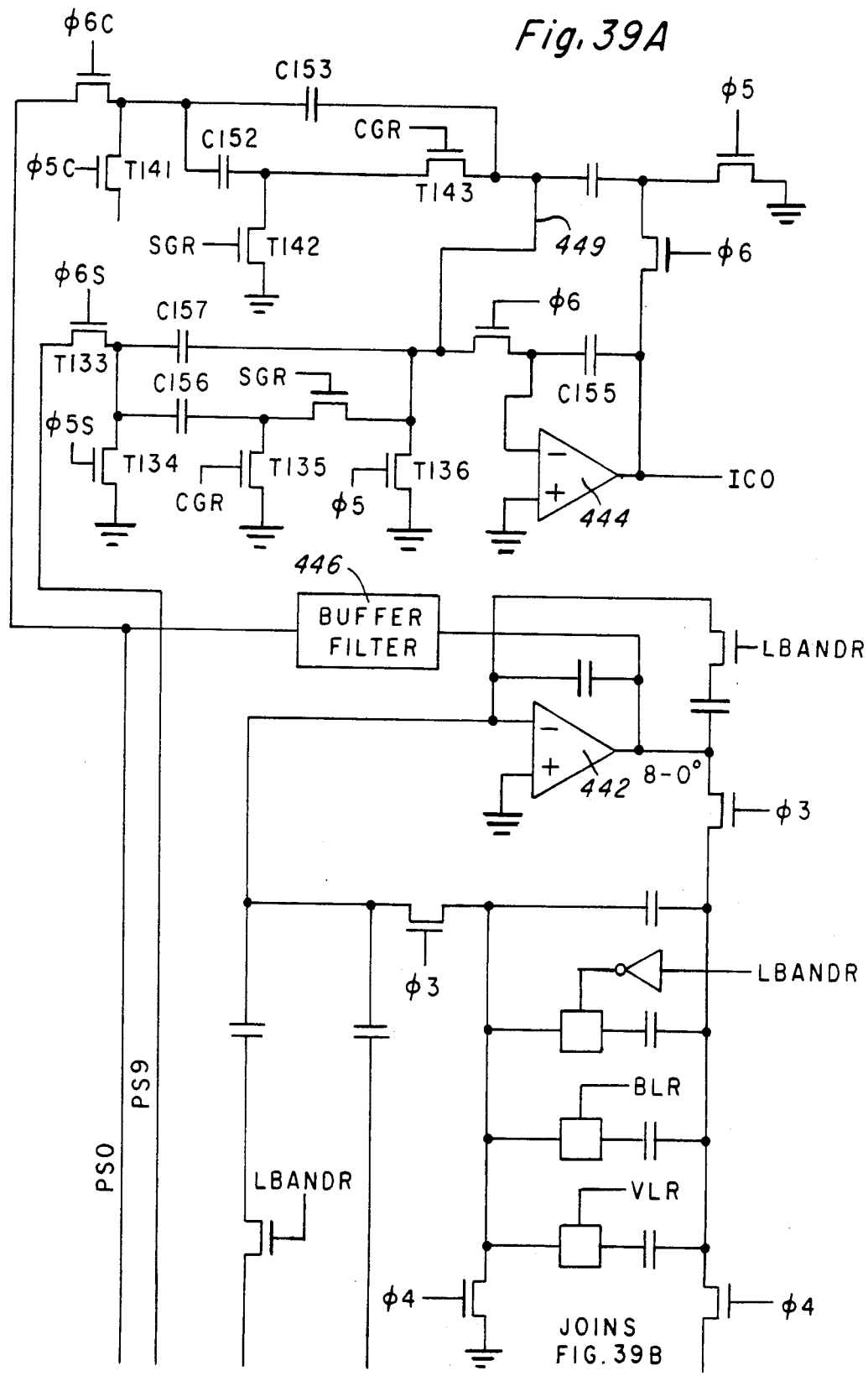

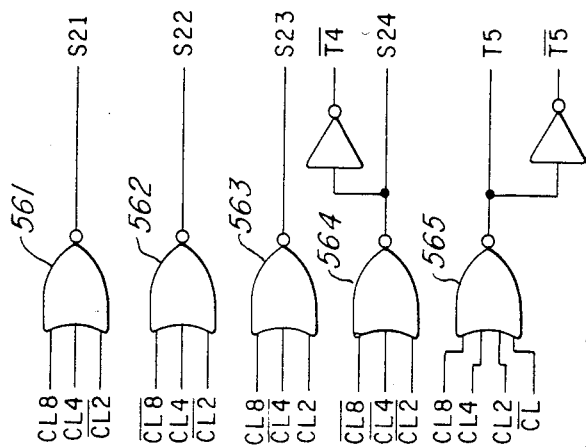
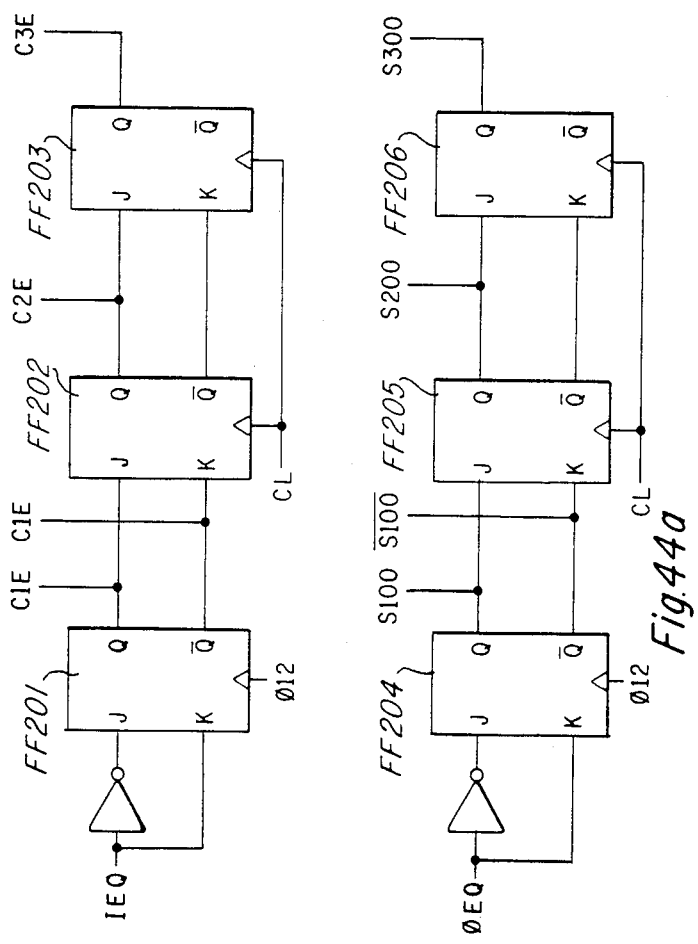
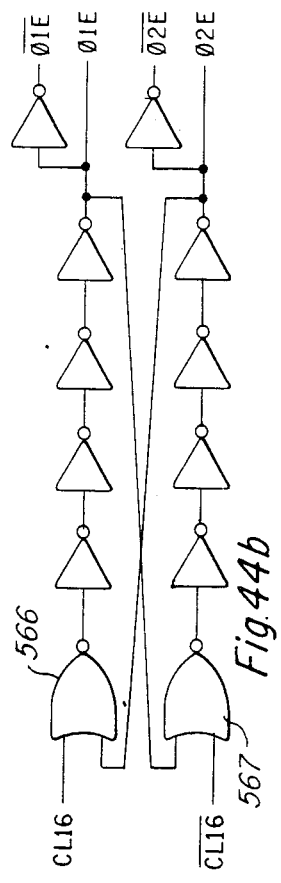
Fig. 44c
Fig. 44a
Fig. 44b

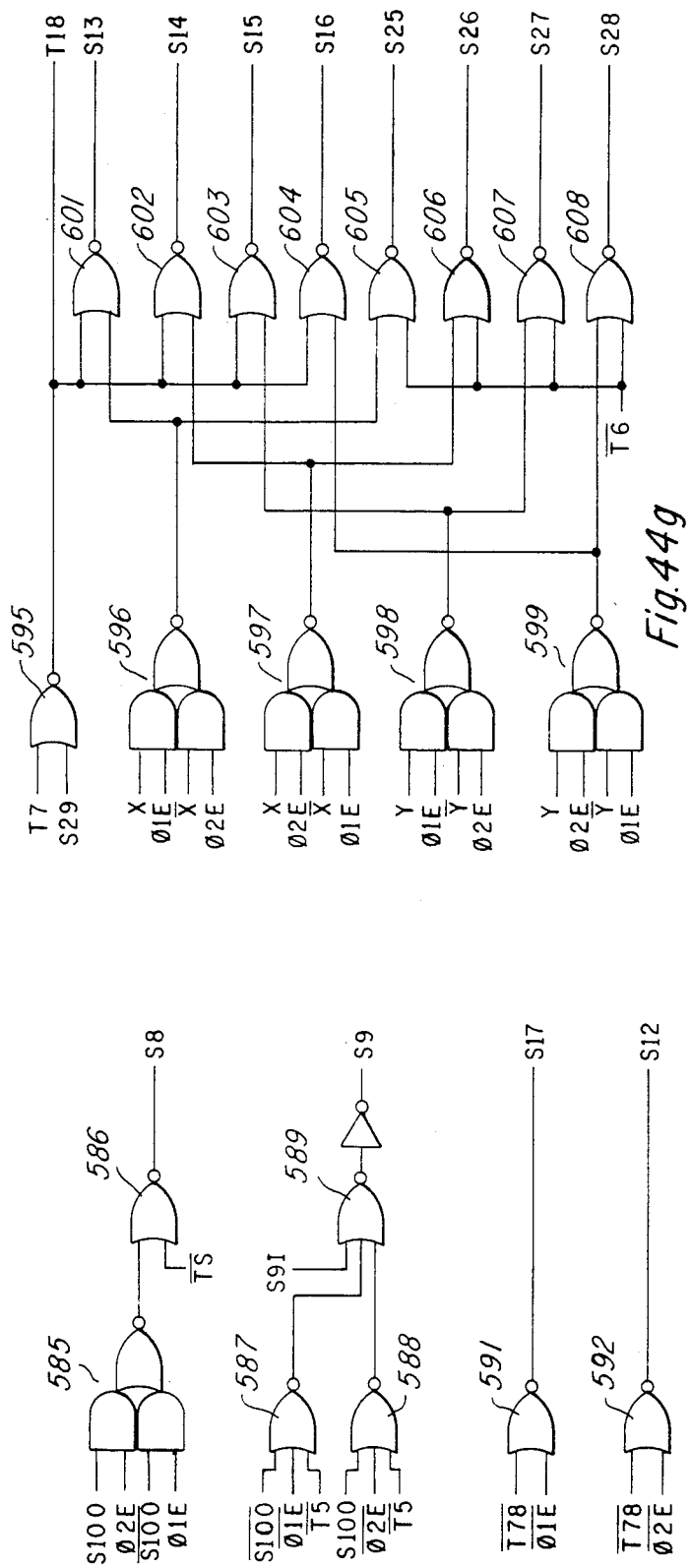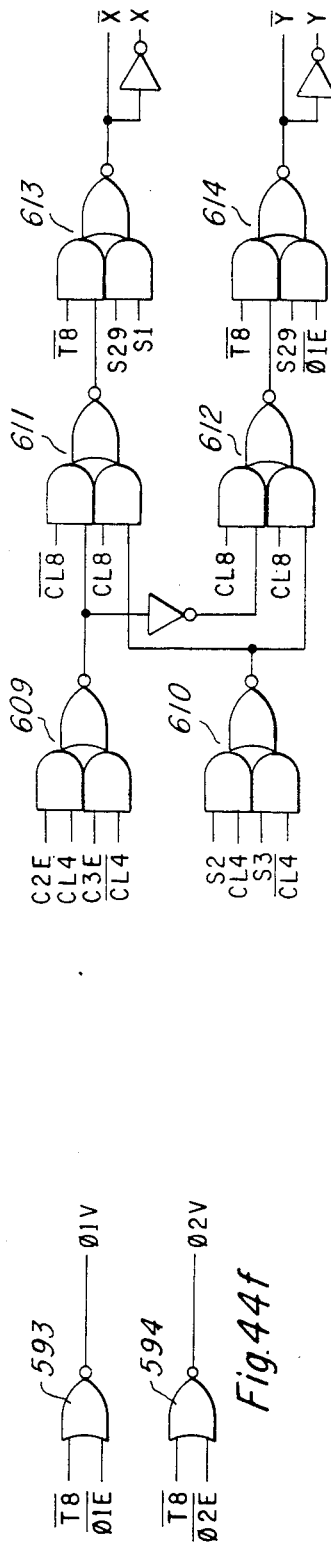
Fig.44g
Fig.44h
Fig.44f

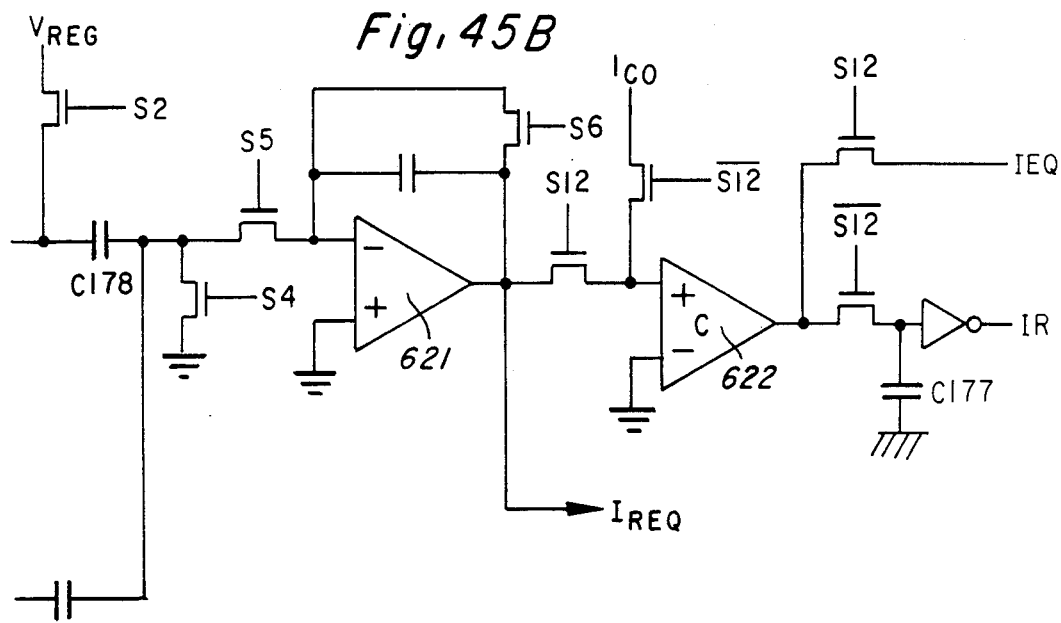
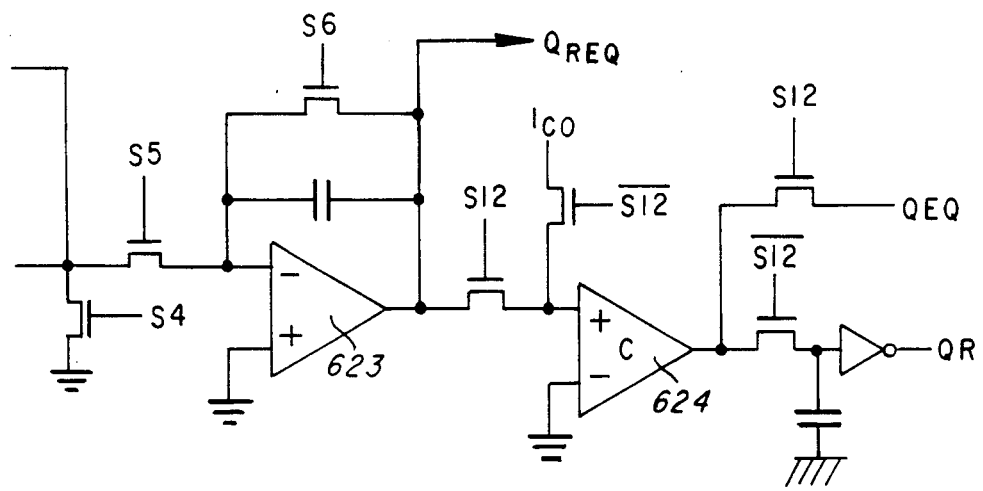
Fig. 45B

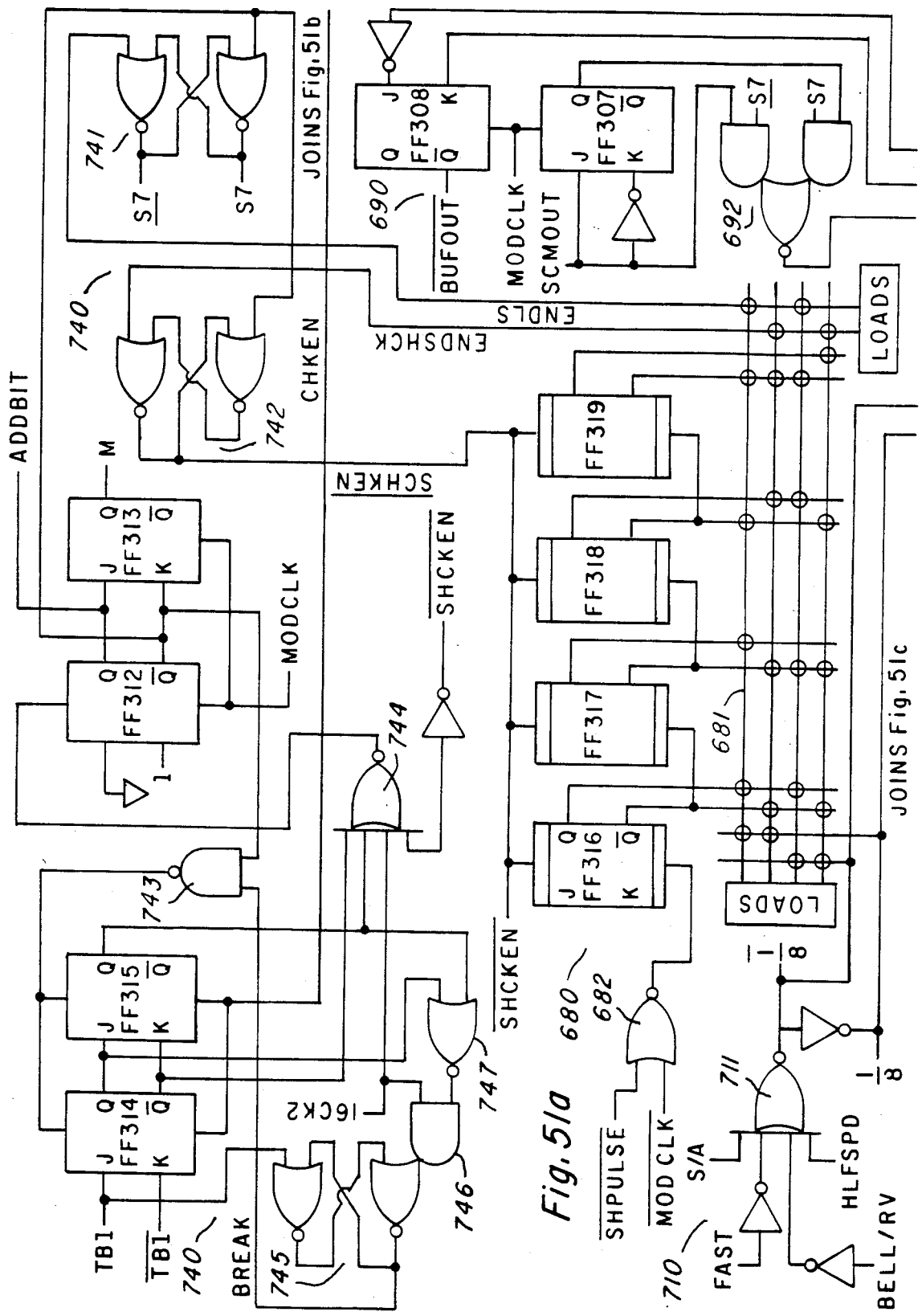

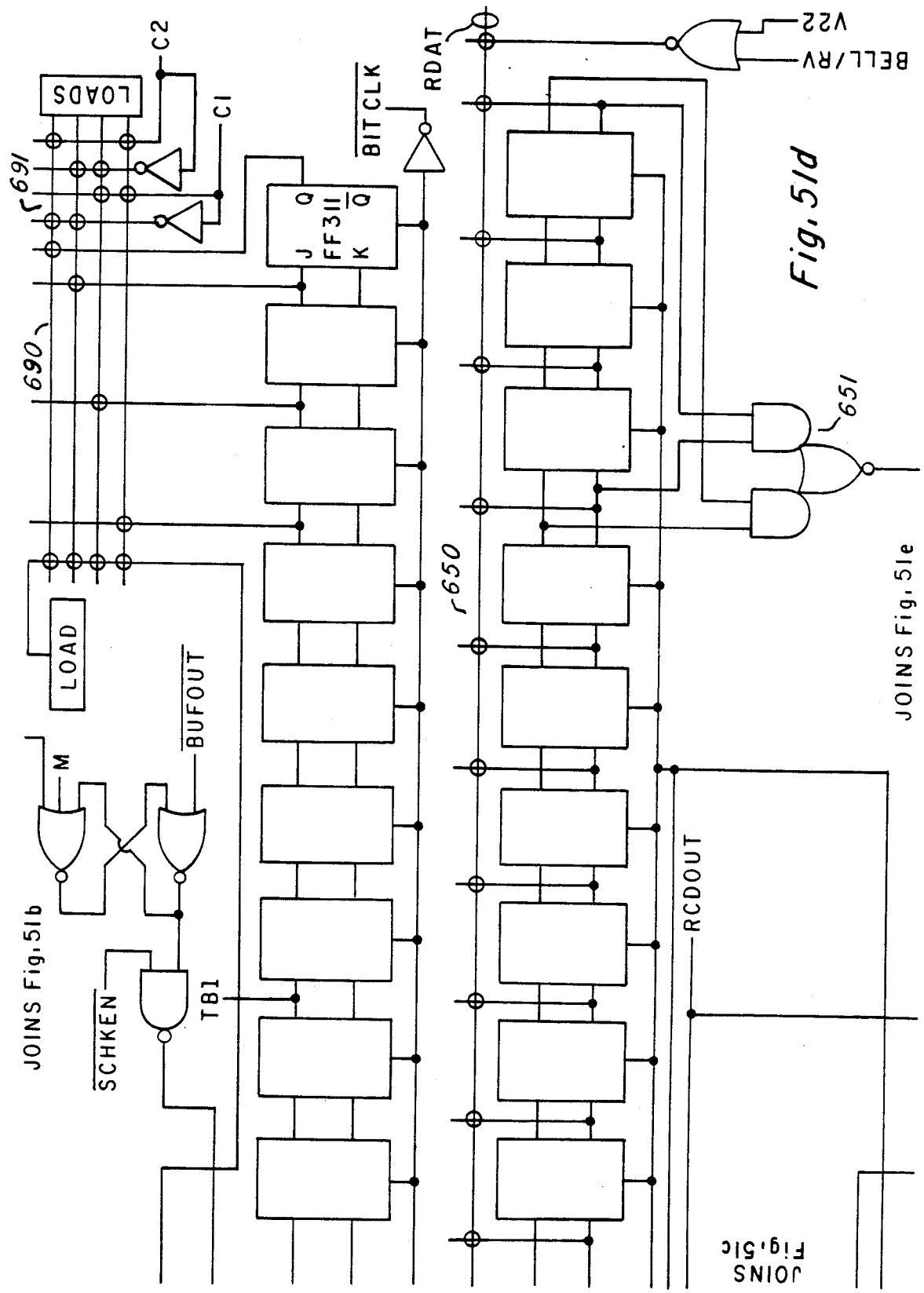

PSK MODEM FILTER SWITCH

BACKGROUND OF THE INVENTION

1. Field of the Invention

This invention relates to phase shift keying (PSK) modems and in particular to integrated circuit PSK modems employing field effect transistors and switched capacitor filters, including multi-mode filters having a plurality of selectable capacitors associated therewith.

2. Description of the Prior Art

Discrete component type PSK modems are well known in the prior art. Integrated circuit PSK modems are also known in the prior art, but in those modems, the digital functions are provided on the chip with analog filtering being done externally of the chip.

In the past, in switched capacitor circuits, when a plurality of filter responses was desired, a plurality of filters was provided, each with the desired response.

The modem switch of this invention makes it possible to simply select at least one of a plurality of capacitors to provide a filter with the proper response or to provide other circuits requiring varying values of capacitance with that capacitance, without causing filter skew and other problems in other circuits by stray capacitance added by those capacitors not selected.

BRIEF SUMMARY OF THE INVENTION

An integrated circuit PSK modem is implemented in a single chip, in this preferred embodiment. Switched capacitor technology is employed for the analog functions, implemented in field effect transistors and capacitors. The modem may be adapted to perform with other type modems at the other end of the transmission line. To accomplish this, the filter response must be variable to accomodate various modem protocols. In this preferred embodiment, multi-mode filters include a plurality of selectable capacitors connected in parallel. An inventive switch selectively connects a selected capacitor into the filter circuit and at the same time disconnects the capacitor from the reference voltage. In the case of unselected capacitors, the switch disconnects the unselected capacitor from the circuit and connects it to the reference voltage. The switch is made up of a pair of FET transistors, one connecting the capacitor to the circuit and the other connecting the capacitor to the reference voltage. The switches are selected out of phase so that when the capacitor is switched into the circuit, it is switched out of its connection with the reference voltage and vice-versa.

The switch connected to the reference voltage is connected between the capacitor and the other transistor to nullify the stray capacitance of not only the capacitor but also of the other transistor.

The principle object of this invention is to provide a PSK modem with multi-mode filters that are single filters with adjustable filter responses.

This and other objects will be made evident in the detailed description that follows.

Figure 3A:
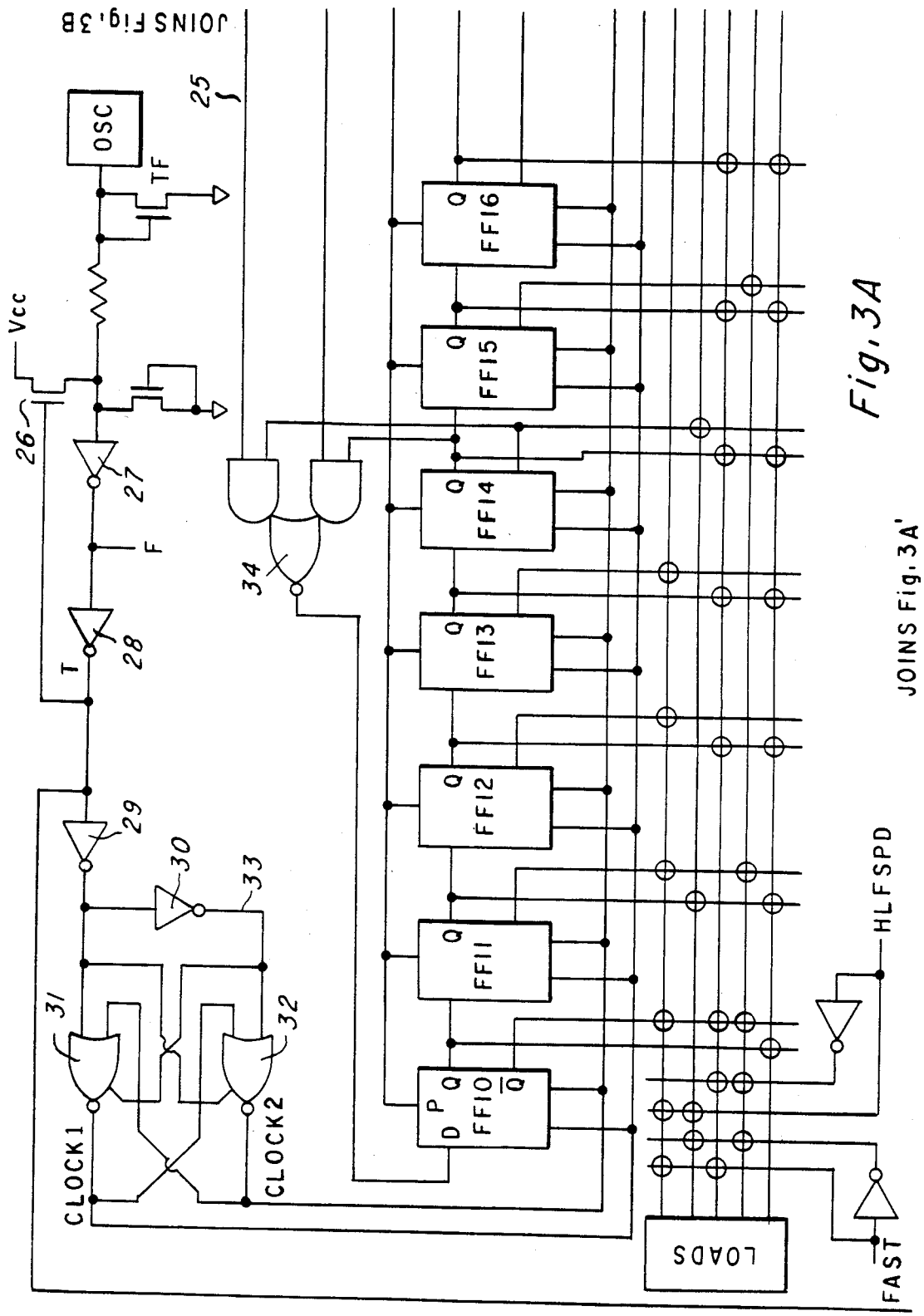
Figure 3A:
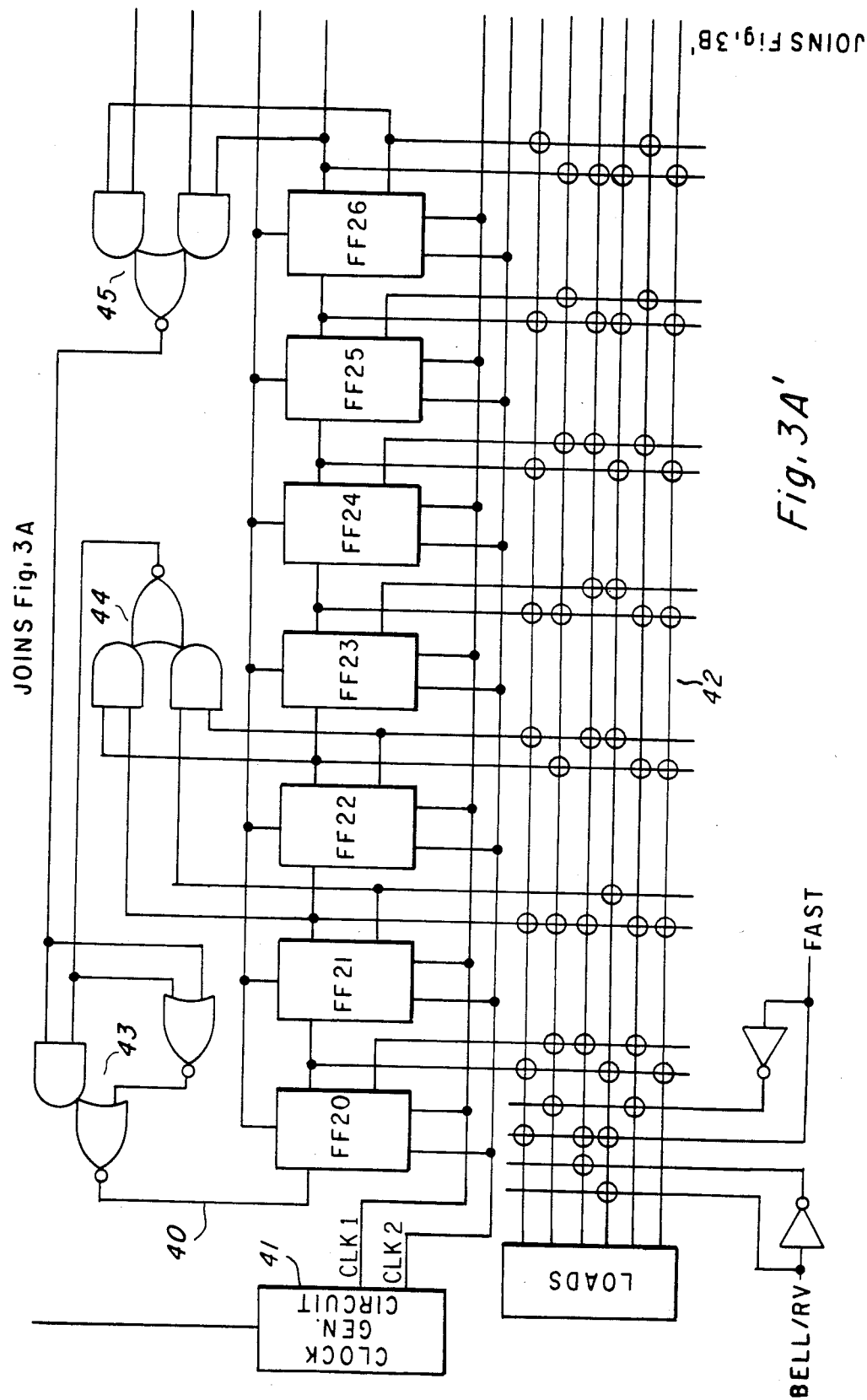
Figure 3B:
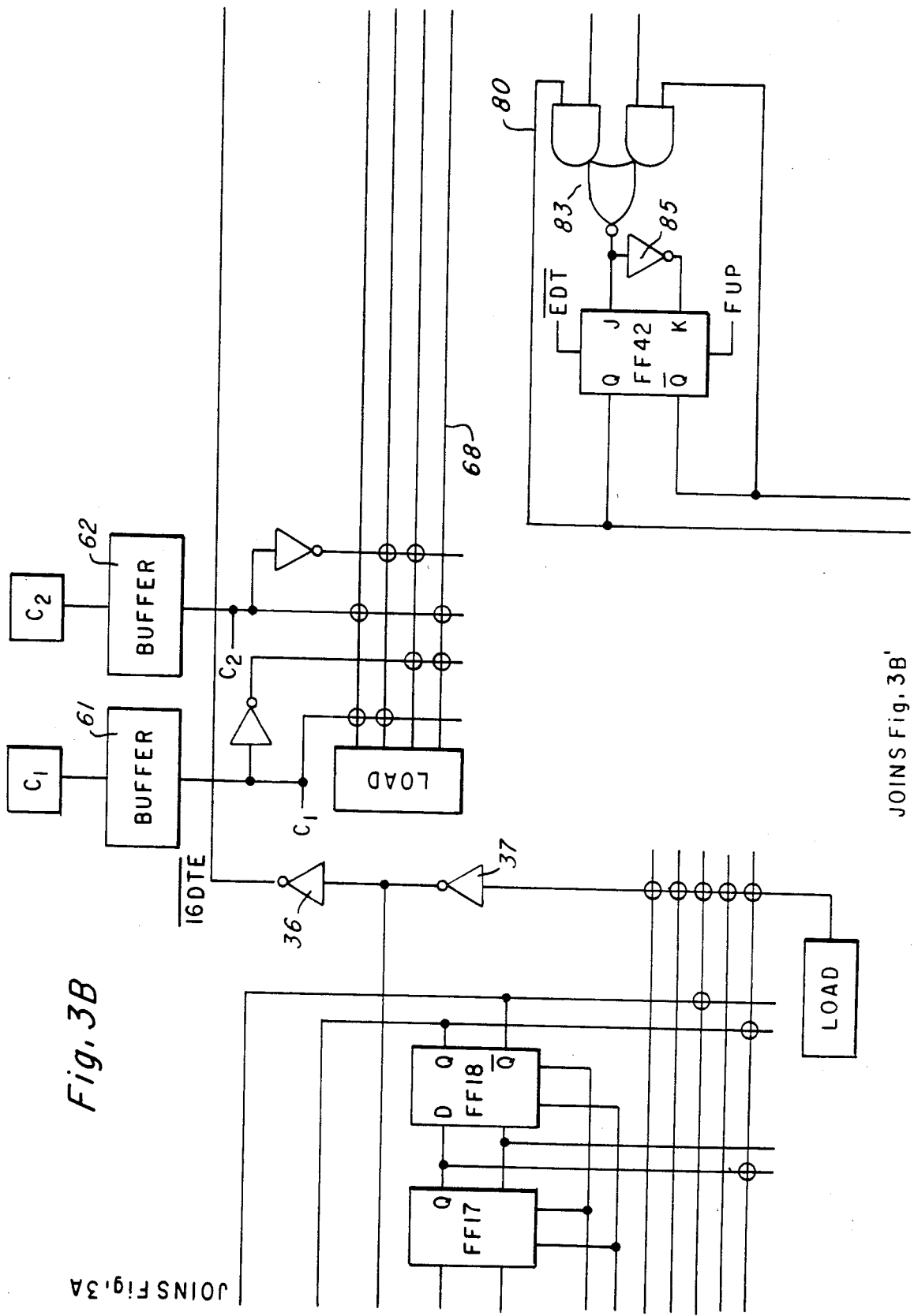
Figure 3B:
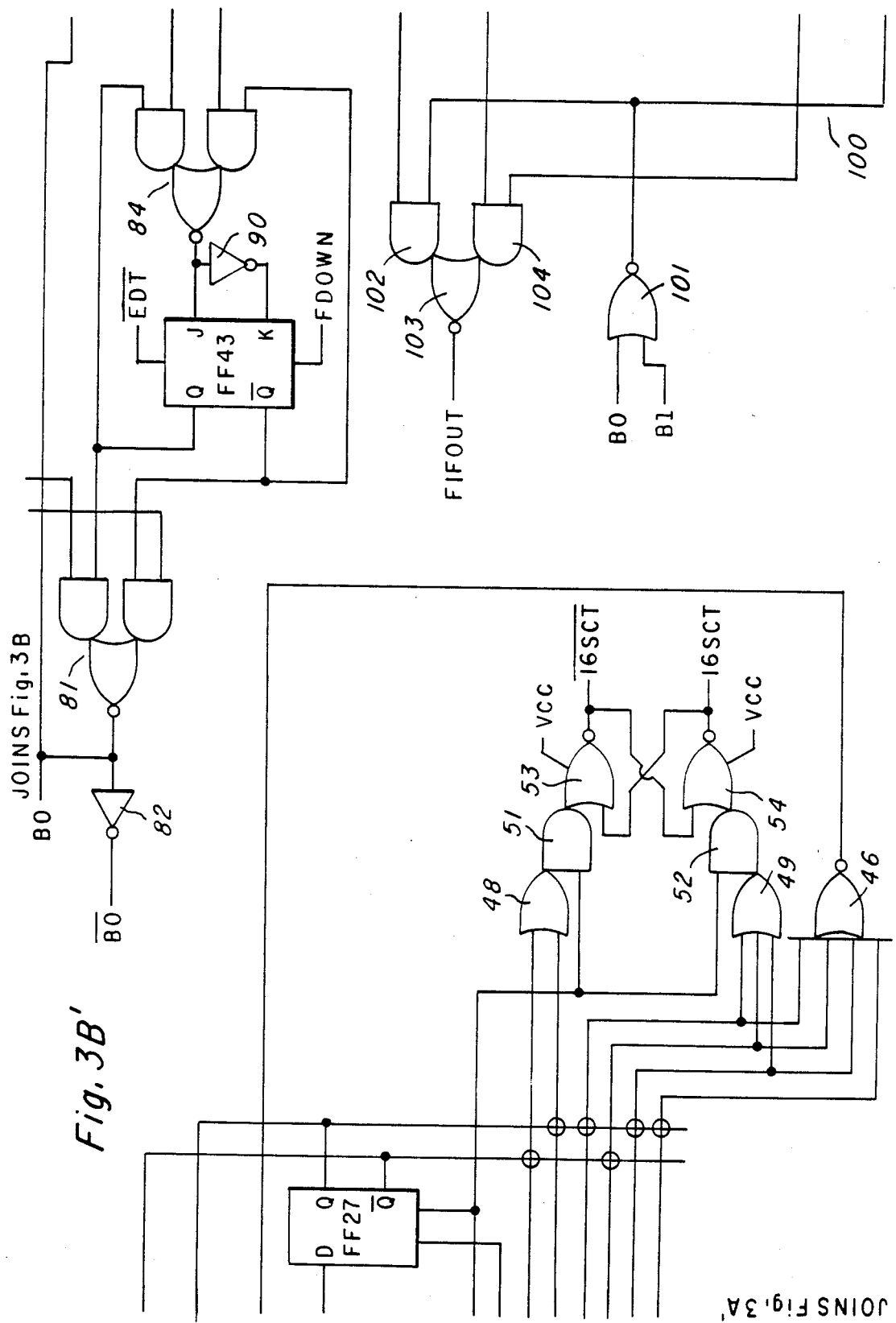

FIGS. 3A–3C form a schematic diagram of the DTE and SCT clock generation circuits, the start-stop counter, the character bit counter, input sampling, stop bit detect, up/down/counter and FIFO, of the transmit buffer.

Figure 4:
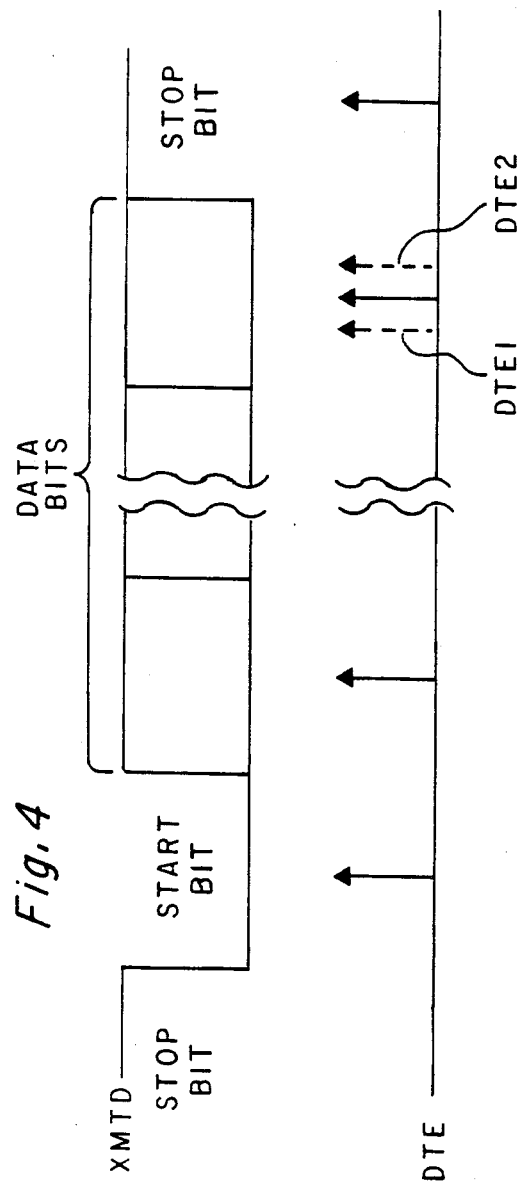

FIG. 4 illustrates data bit sampling.

Figure 5:
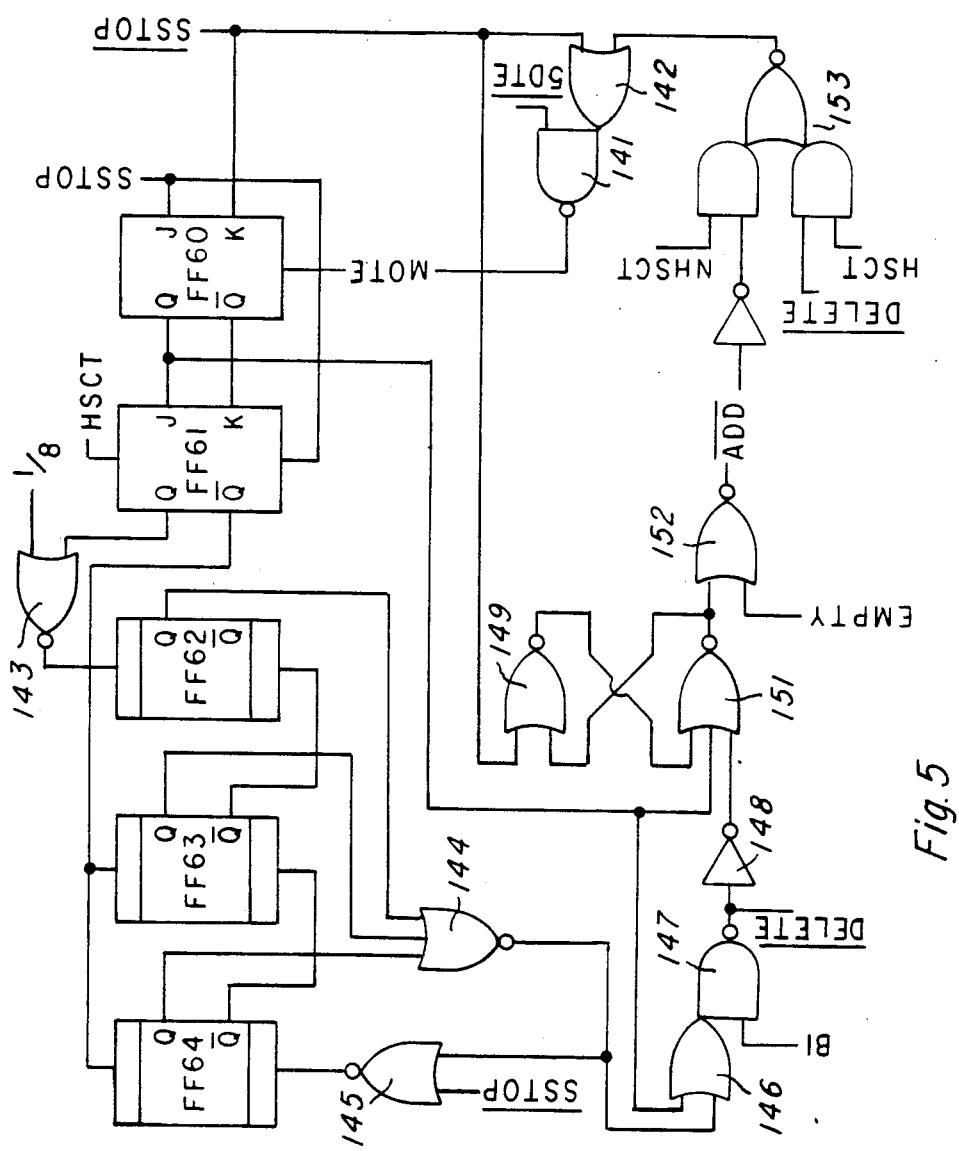

FIG. 5 schematically illustrates stop bit insert-delete control of the transmit buffer.

Figure 6:
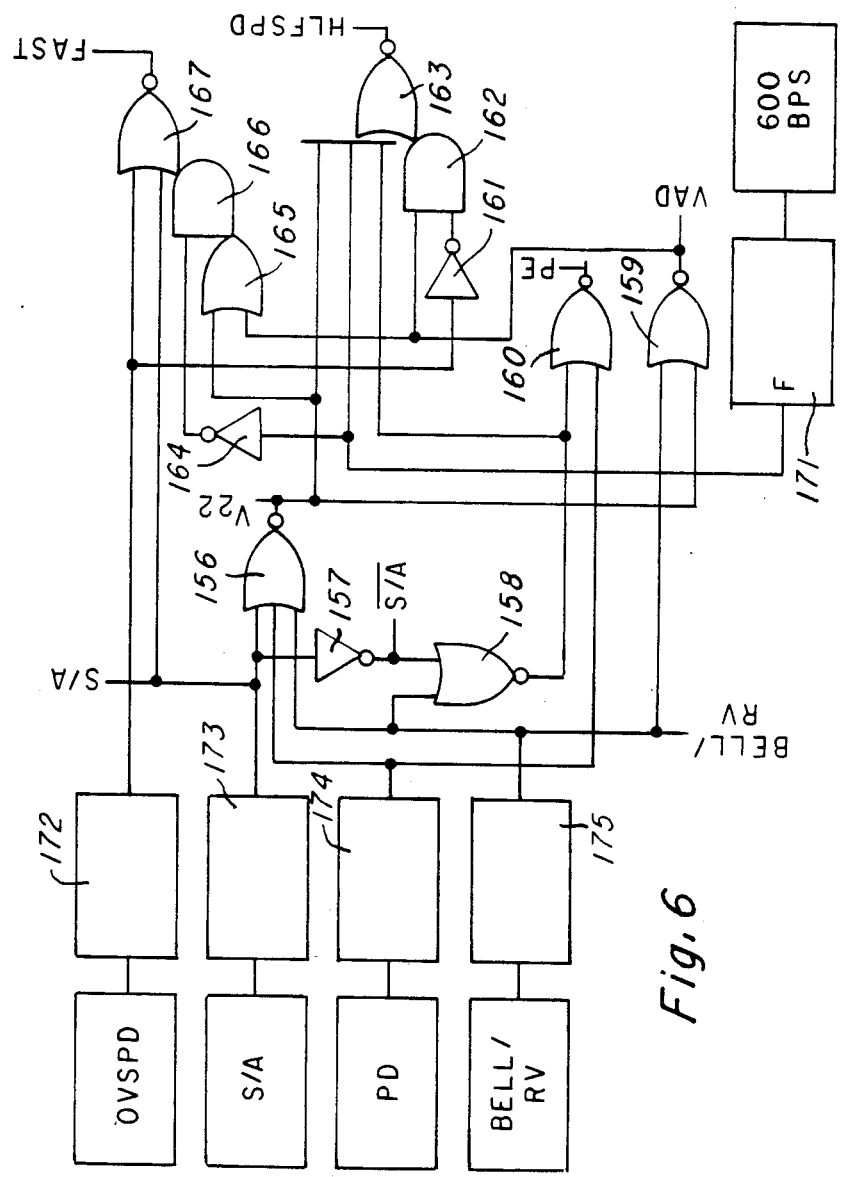

FIG. 6 schematically illustrates modem selection circuitry for the transmit buffer.

Figure 7A:
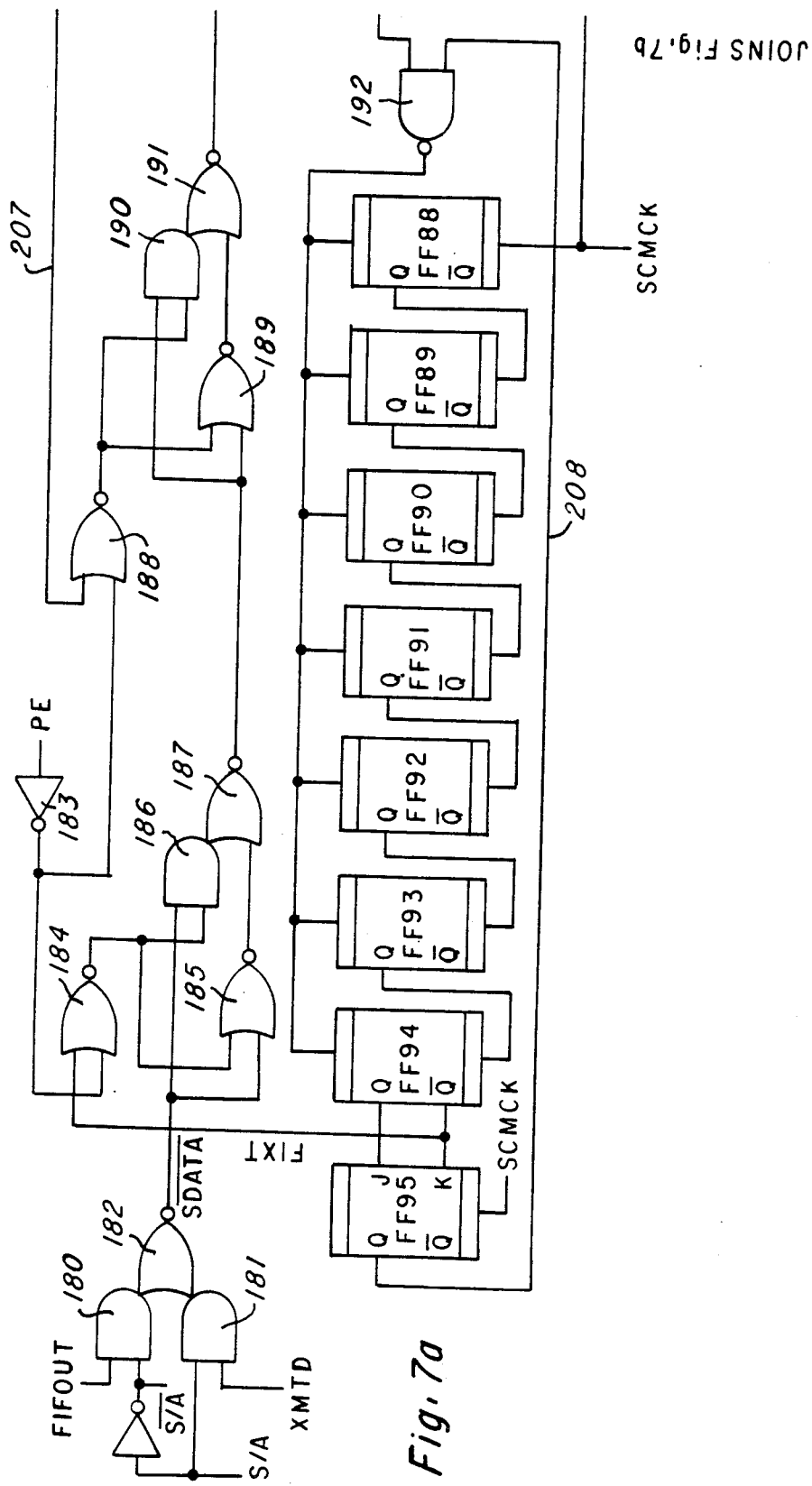
Figure 7B:
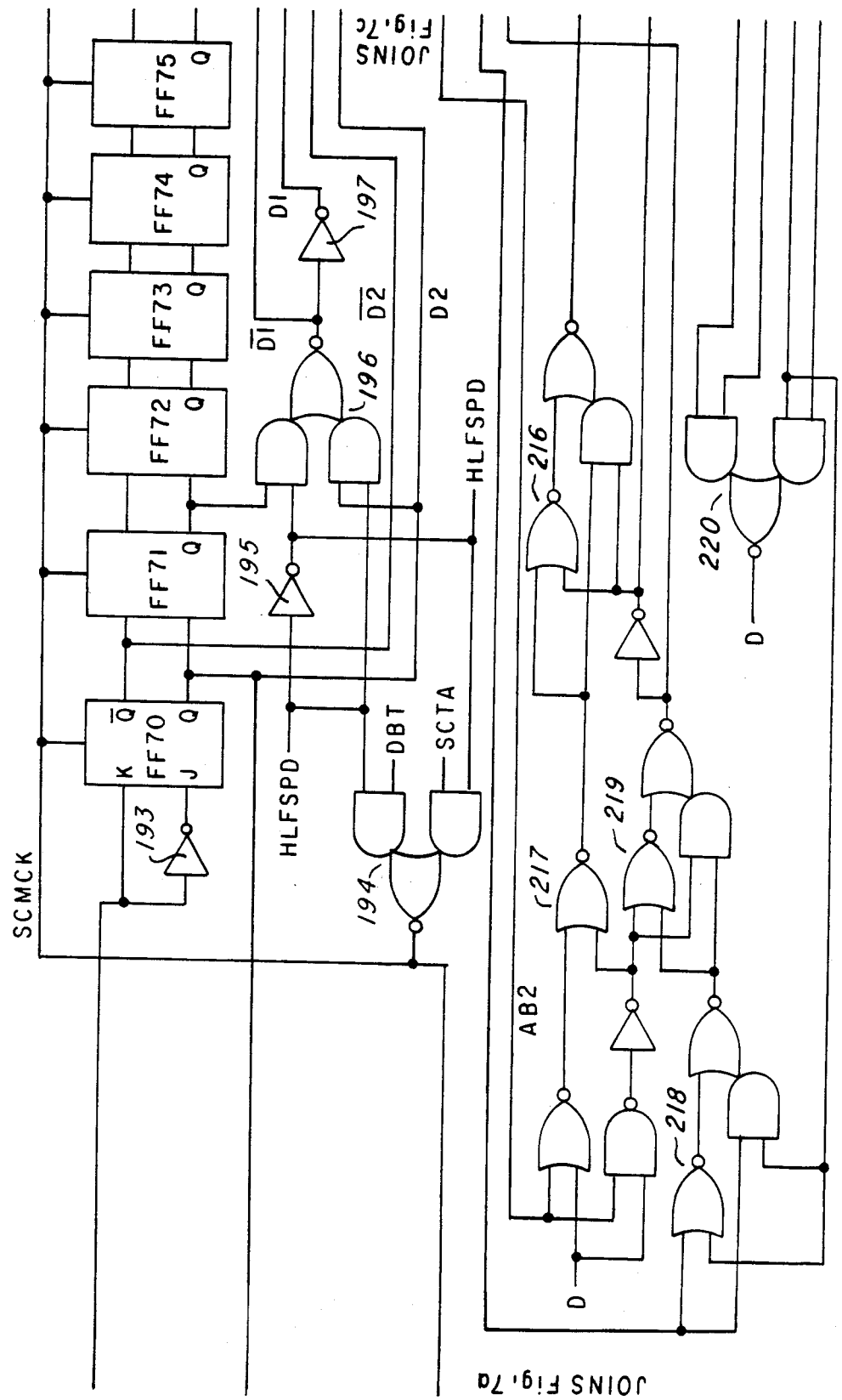
Figure 7C:
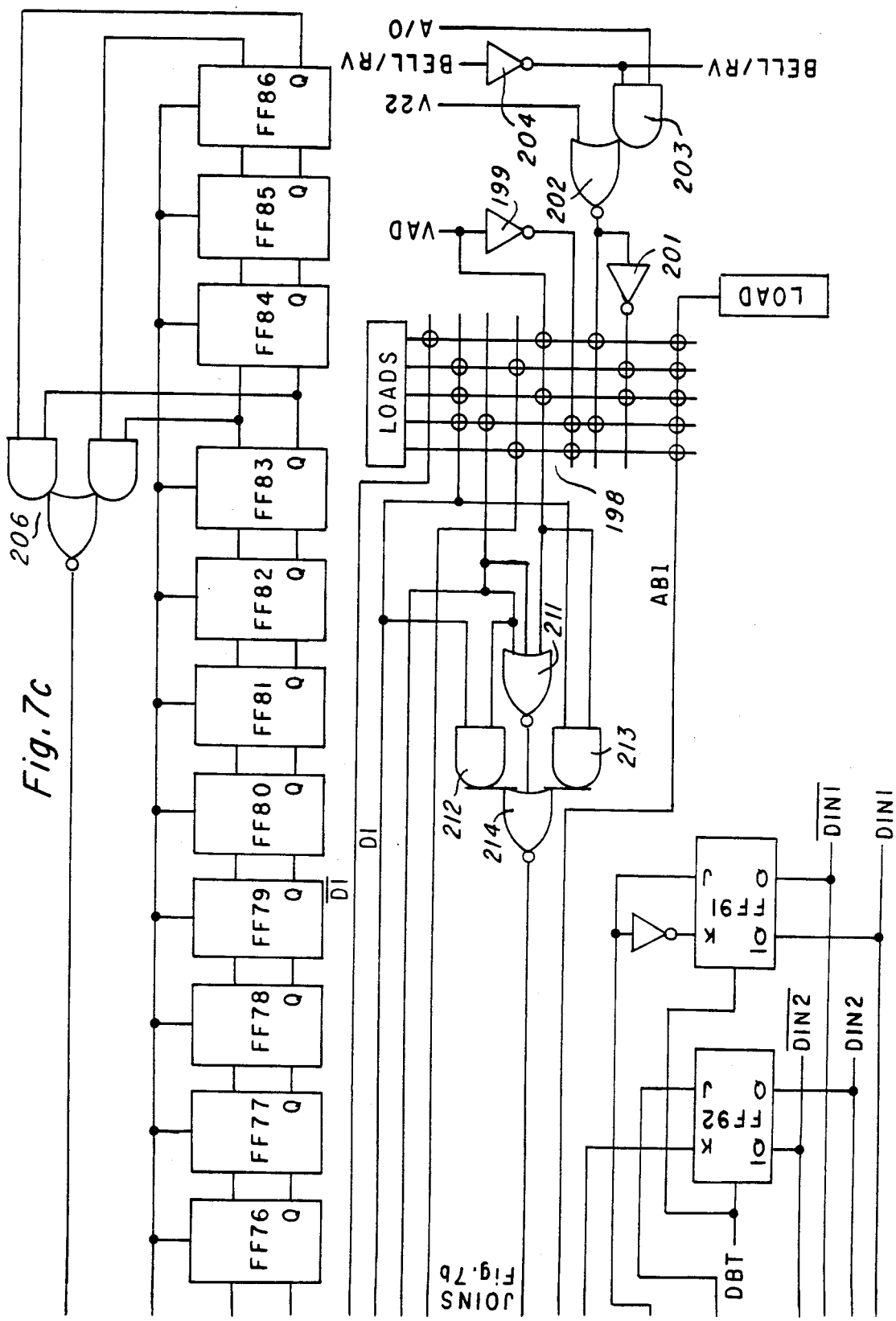

FIGS. 7A–7C illustrate the scrambler and dibit generator of the transmit buffer.

Figure 8:
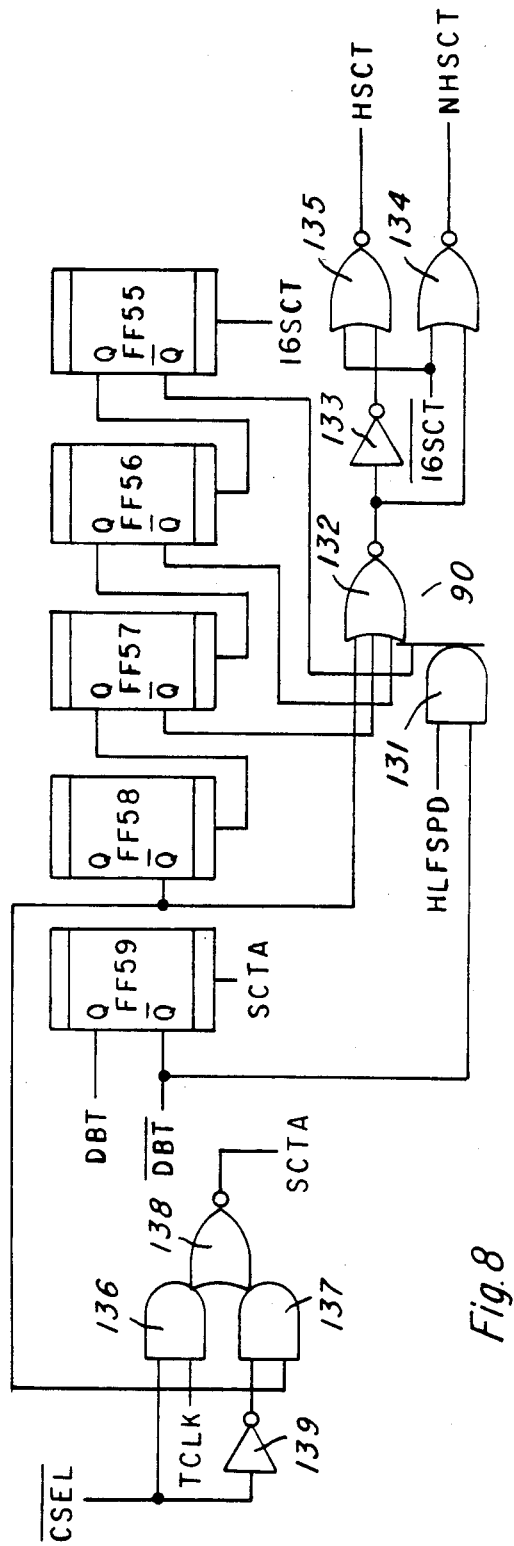

FIG. 8 illustrates circuitry for the generation of signals used in the transmitter.

Figure 9:
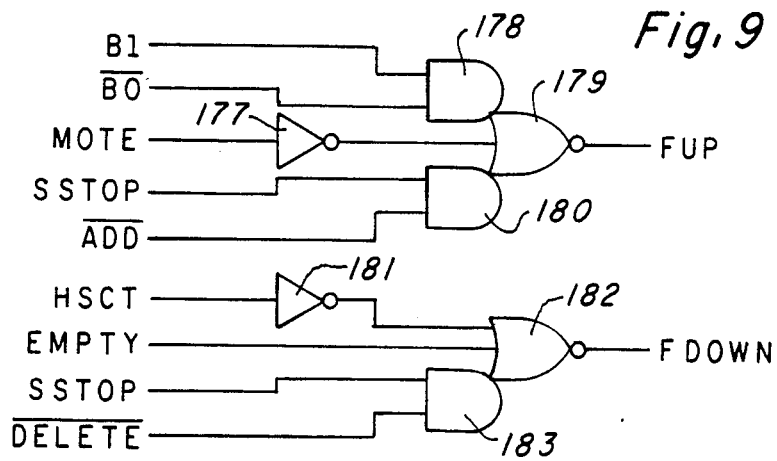

FIG. 9 illustrates circuitry for the generation of control signals for the up/down counter.

Figure 10A:
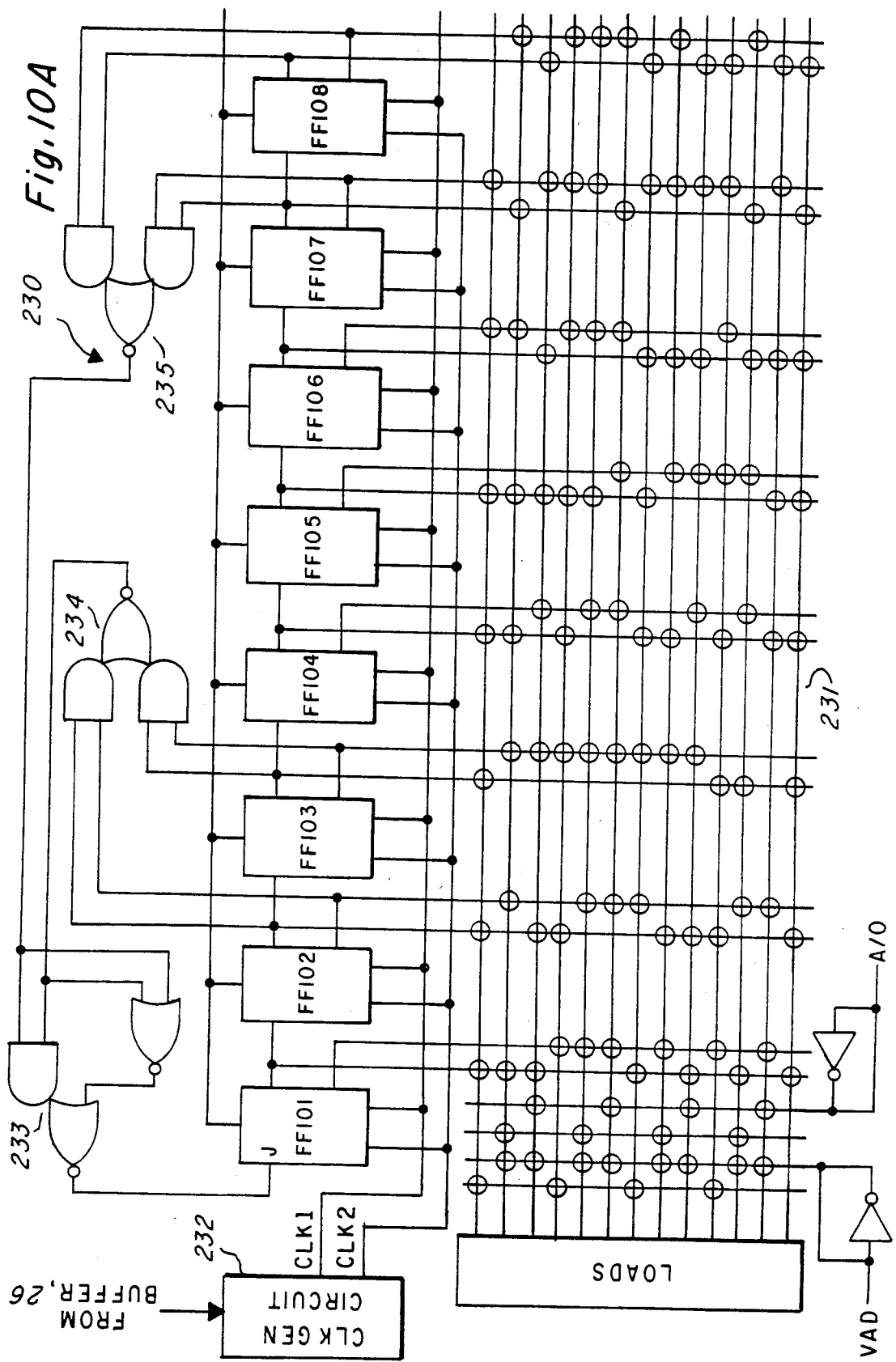
Figure 10B:
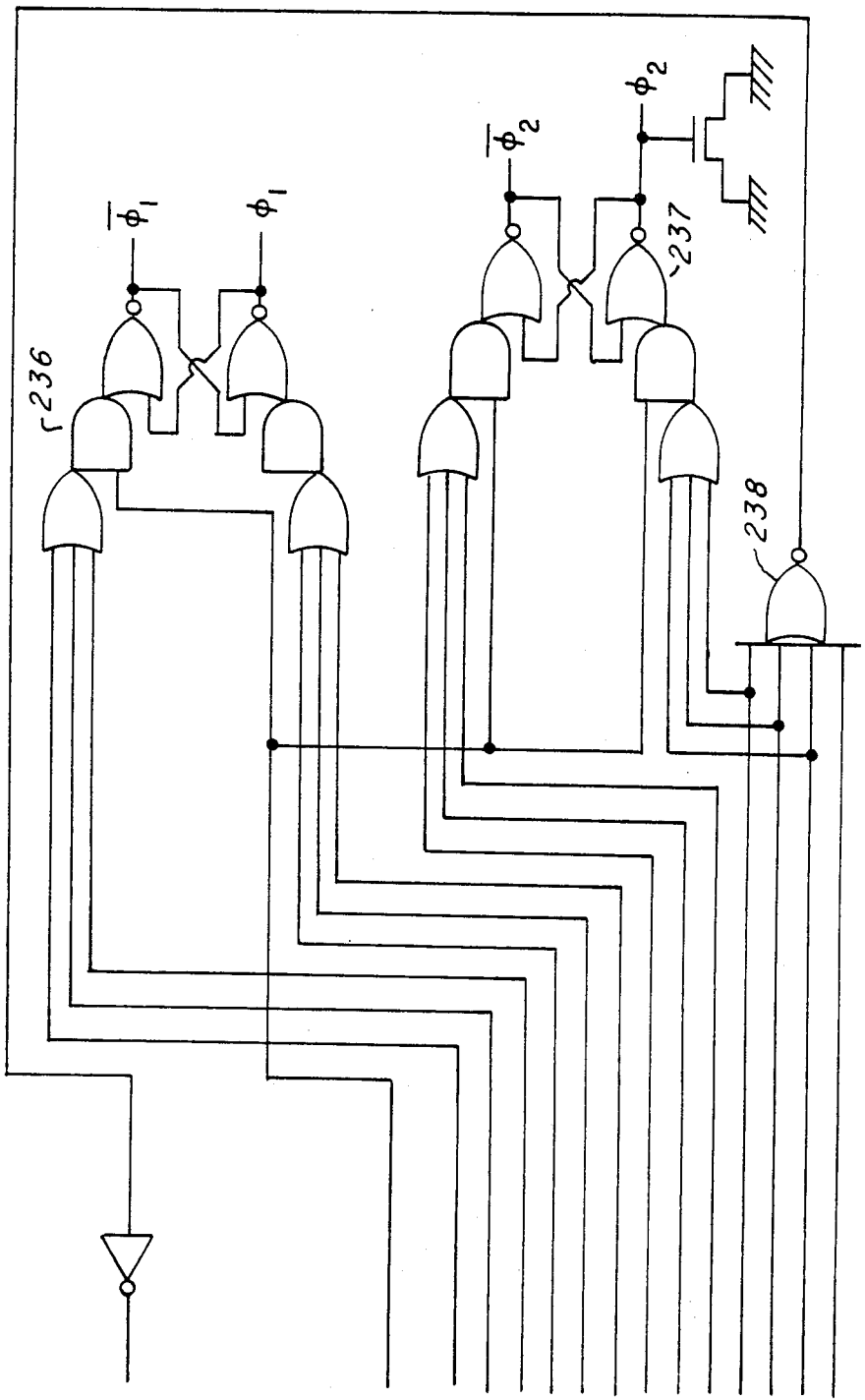

FIGS. 10A and 10B are schematic diagram illustrating the development of timing signals for the transmitter.

Figure 11:
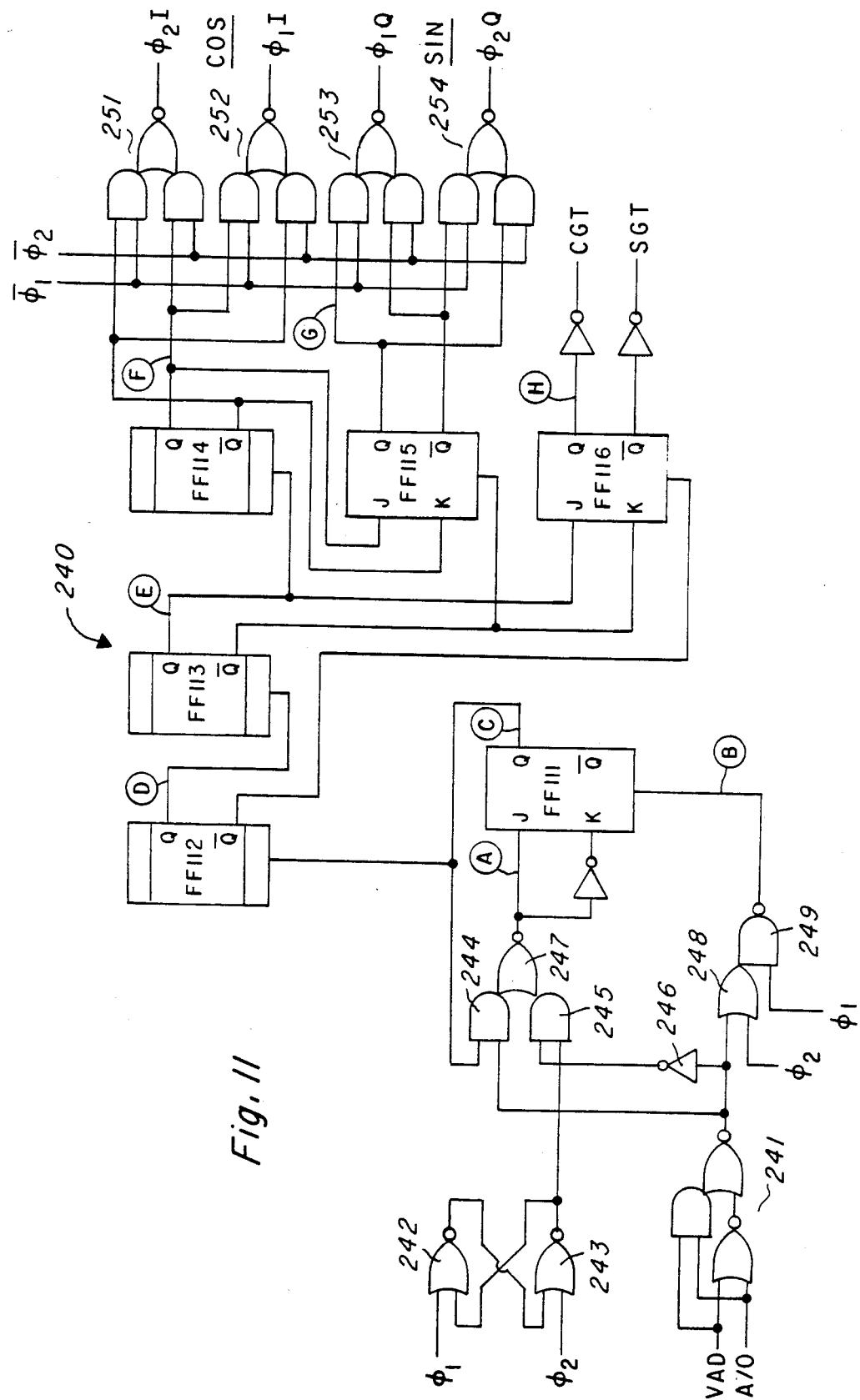

FIG. 11 is a schematic diagram illustrating the development of timing signals for the I and Q channel timing for the transmitter.

Figure 12:
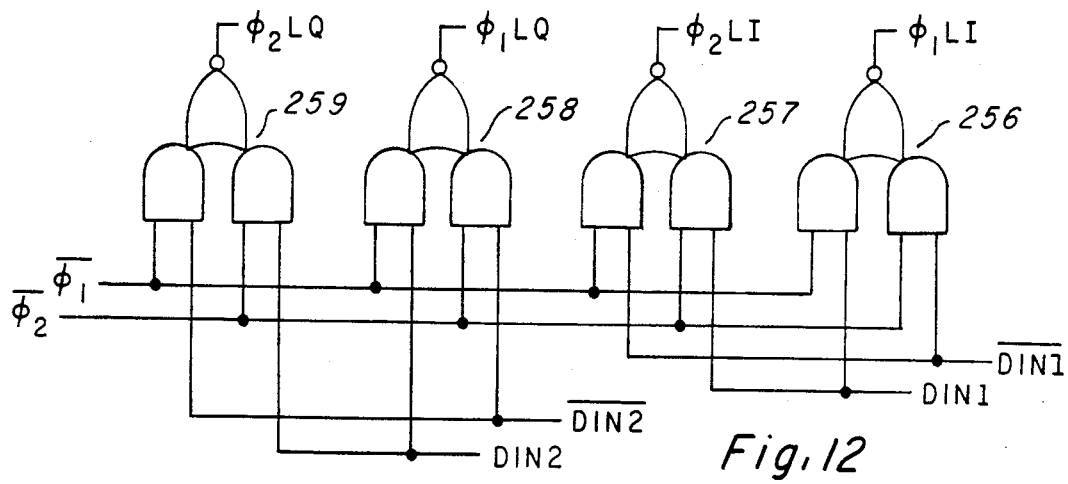

FIG. 12 is a schematic diagram illustrating the development of data derived timing signals for modulating the I and Q channels.

Figure 13:
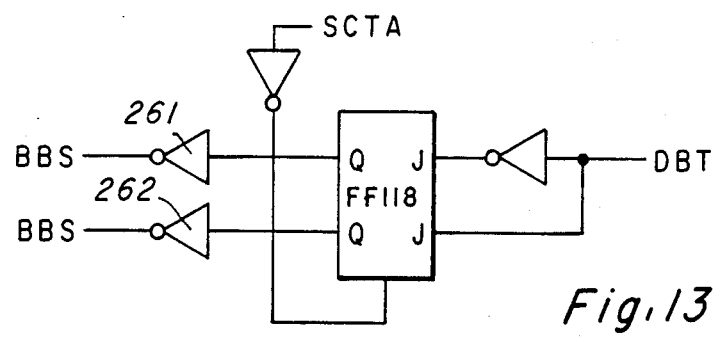

FIG. 13 is a schematic diagram illustrating the development of signals used in shaping the input square wave digital signals.

Figure 14:
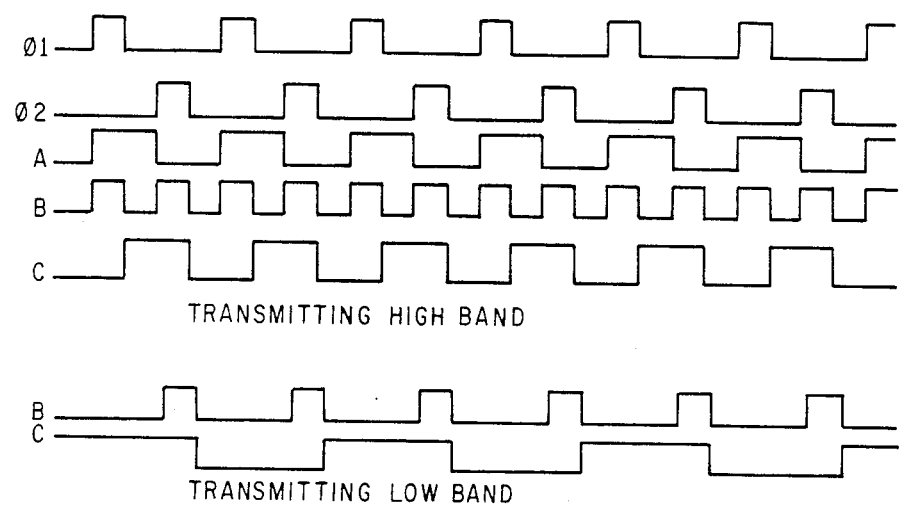

FIG. 14 contains timing signals of the transmitter.

Figure 15:
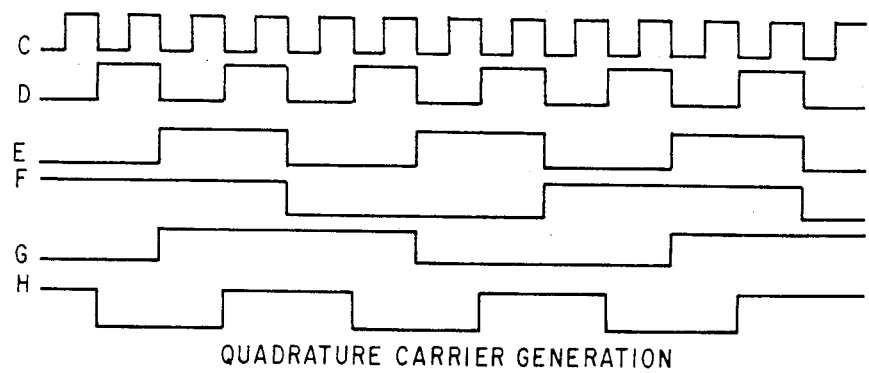

FIG. 15 illustrates signals used in the carrier generation.

Figure 16A:
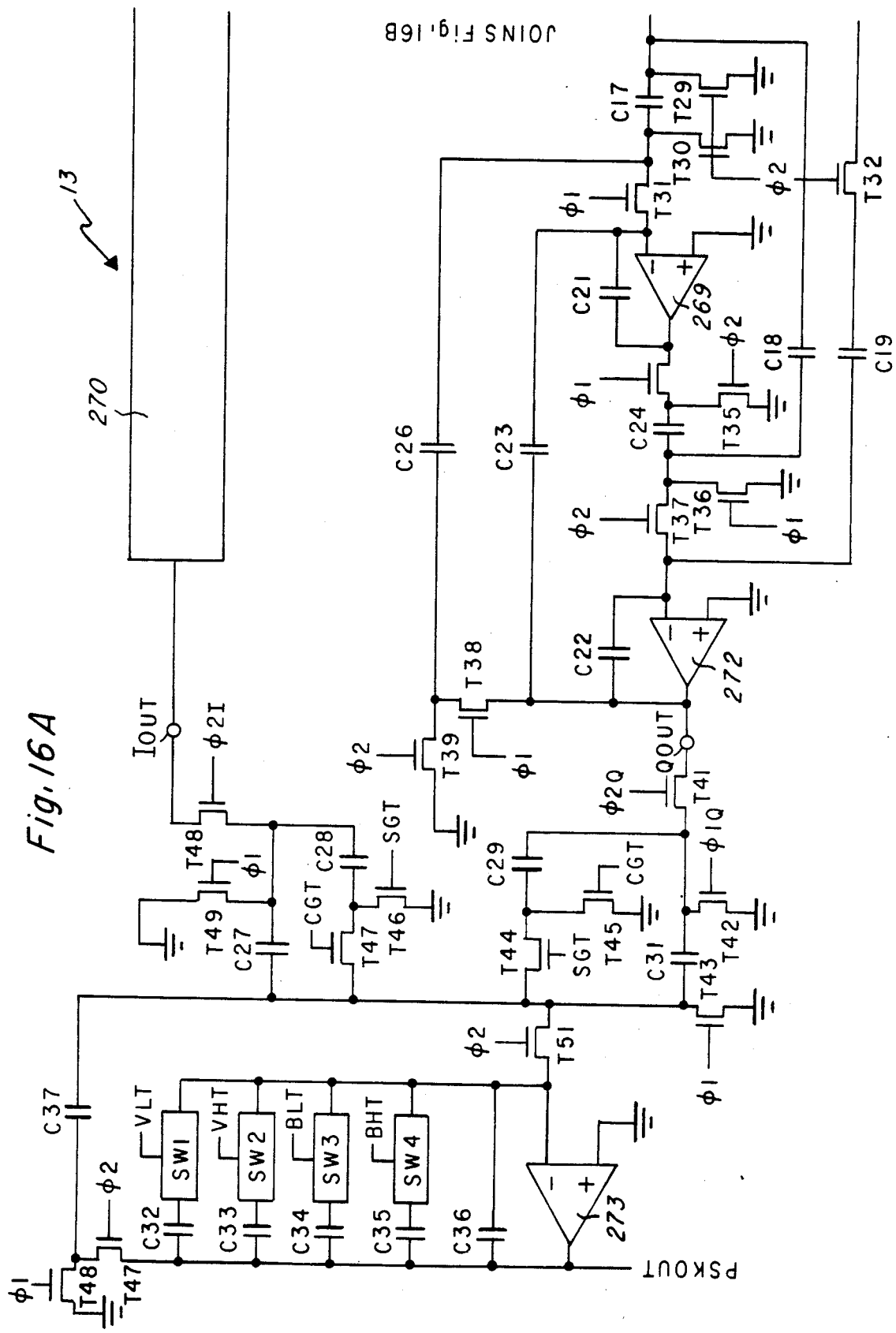
Figure 16B:
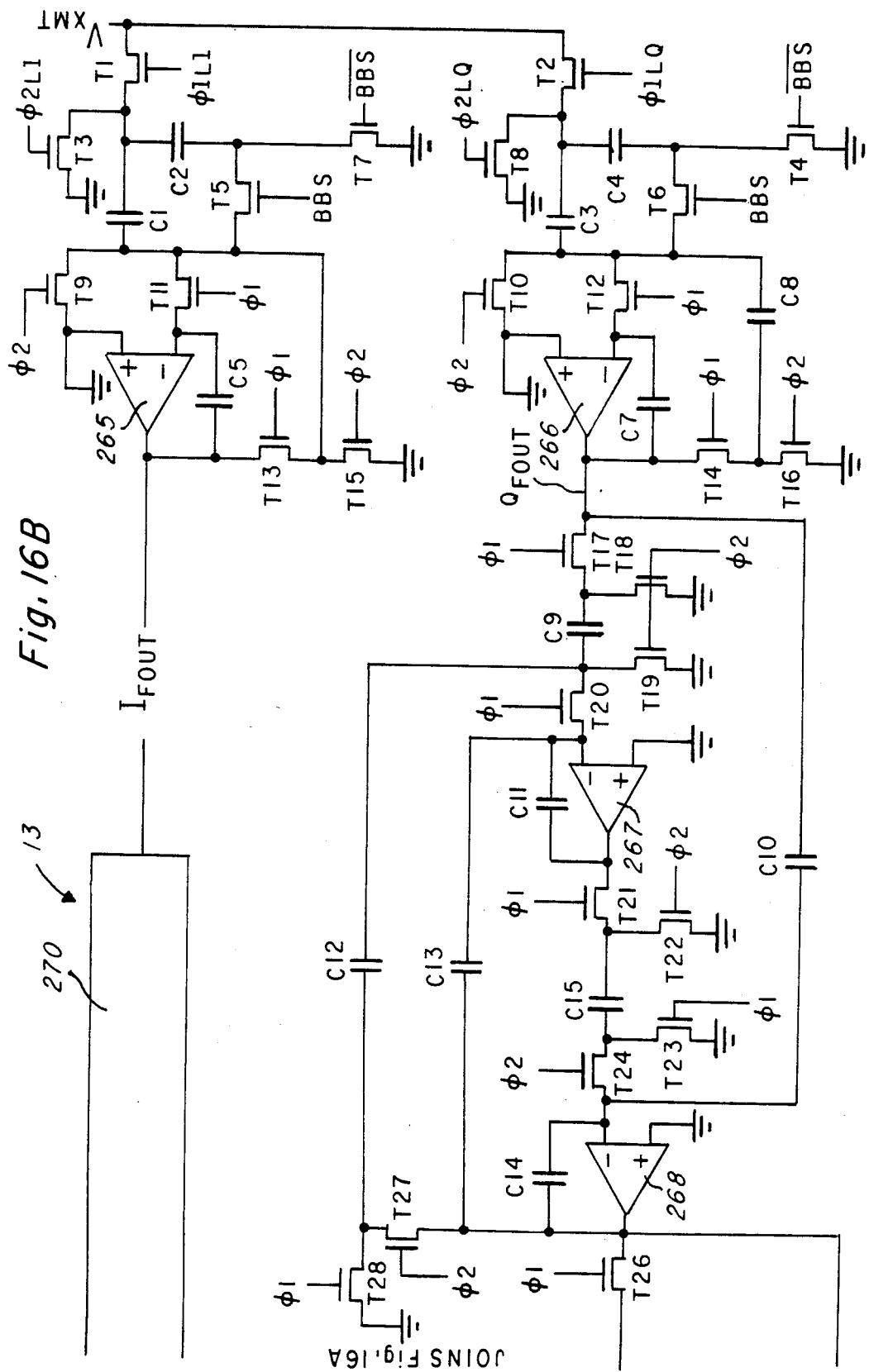

FIGS. 16A and 16B form a schematic diagram of the transmitter modulator.

Figure 17:
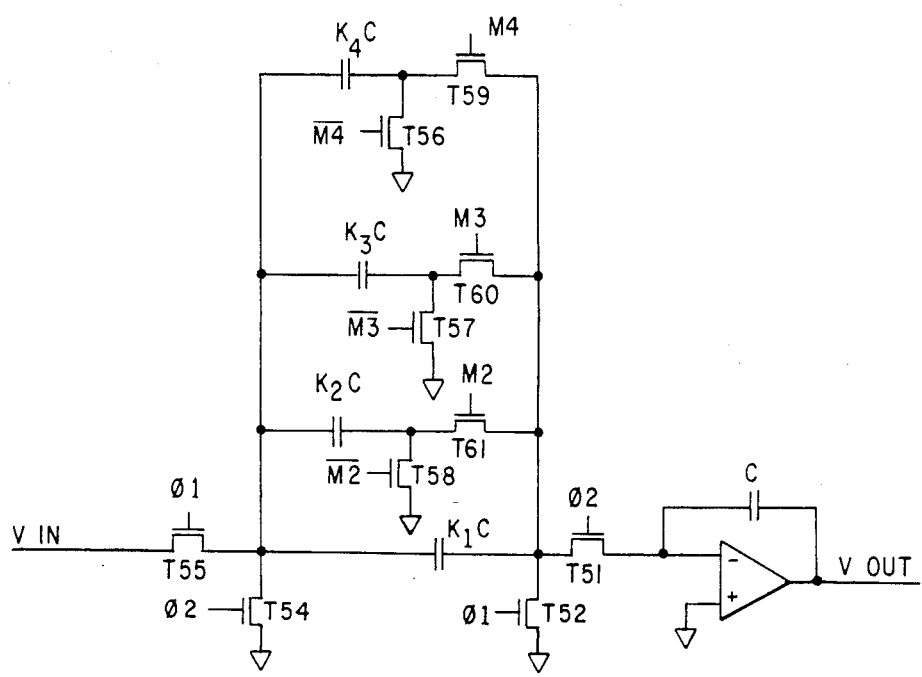

FIG. 17 is a schematic diagram of the switching circuits for switching capacitance in and out of the circuit.

Figure 18:
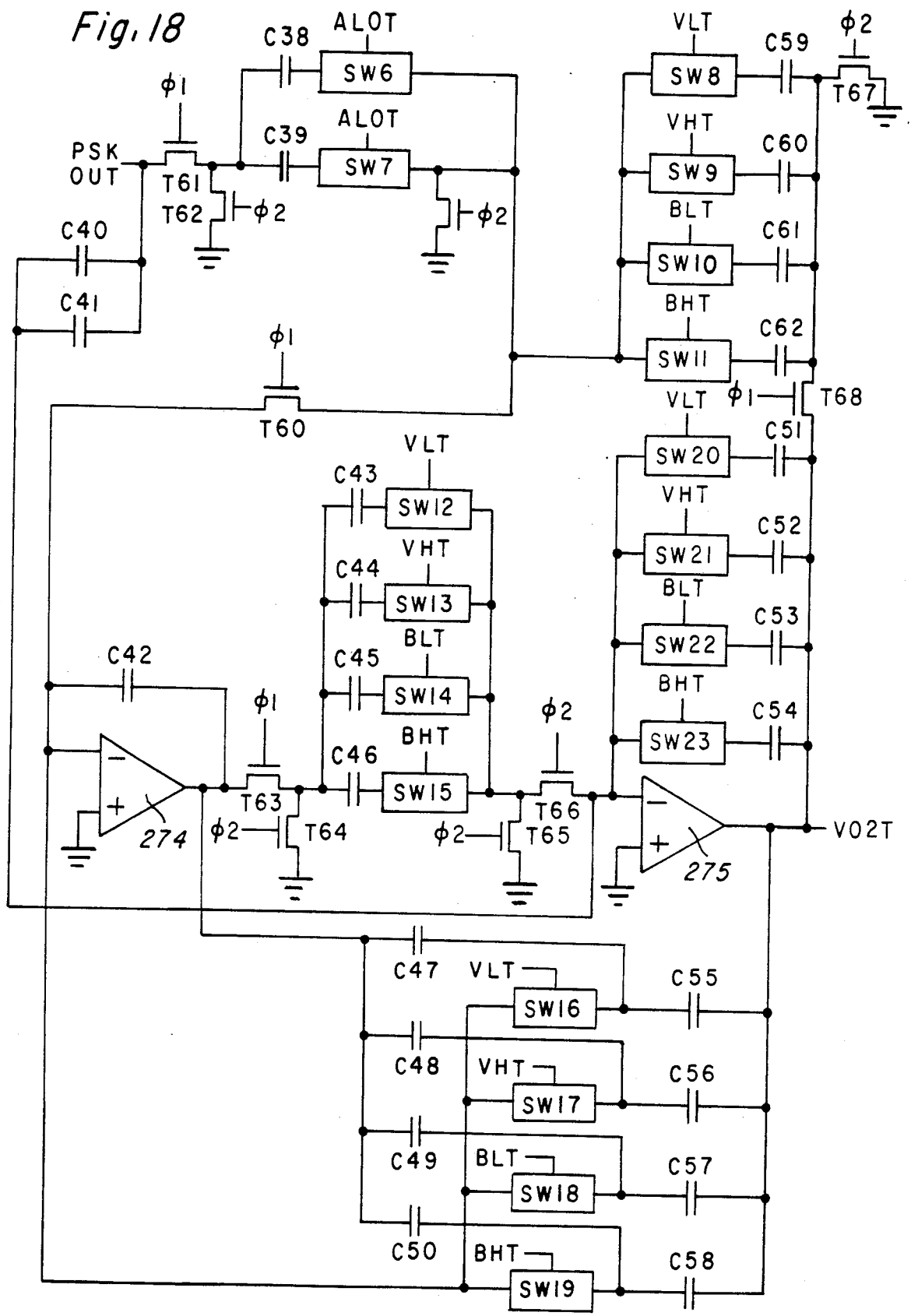

FIG. 18 is a schematic diagram of the transmitter gain compensation filter.

Figure 19:
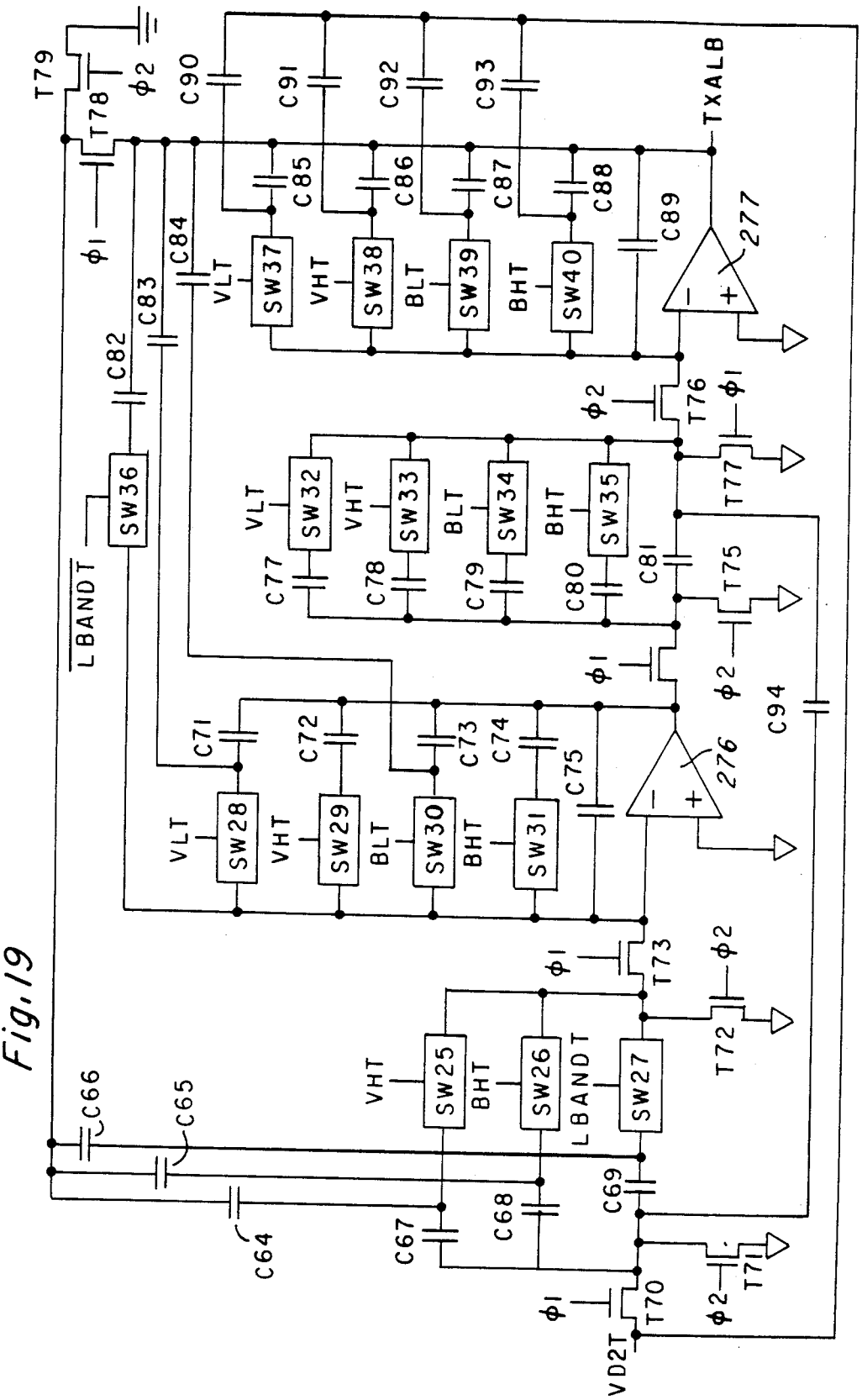

FIG. 19 is a schematic diagram of the transmitter phase compensation filter.

Figure 20:
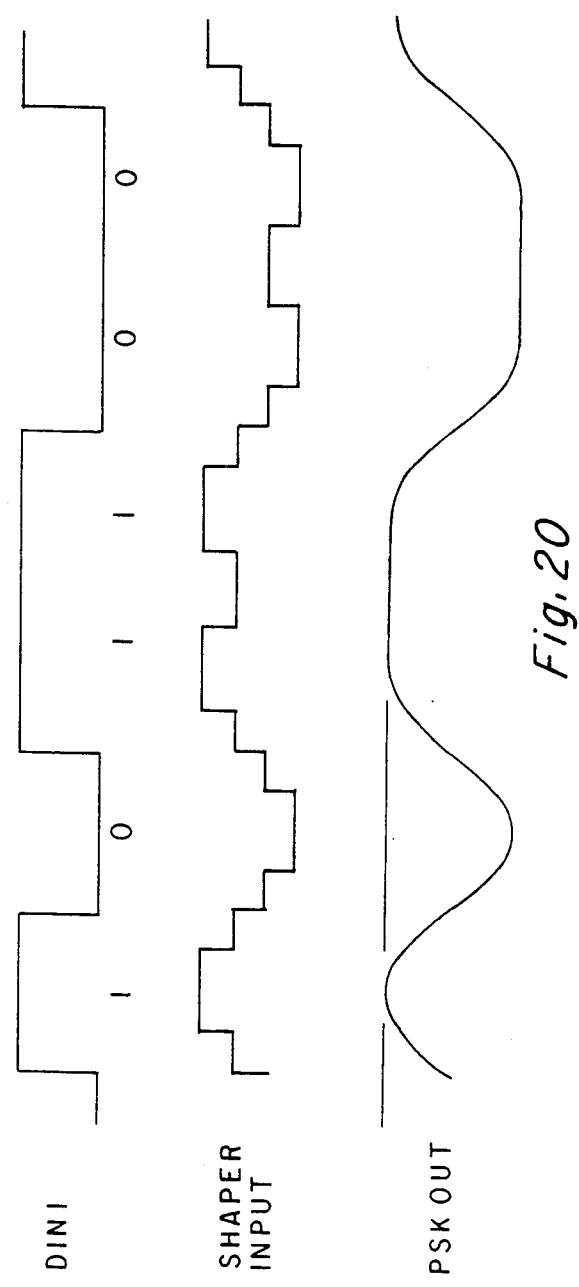

FIG. 20 illustrate waveforms at various points within the transmitter.

FIGS. 21–25 illustrate circuits for the development of timing signals used in the modem receiver.

Figure 26:
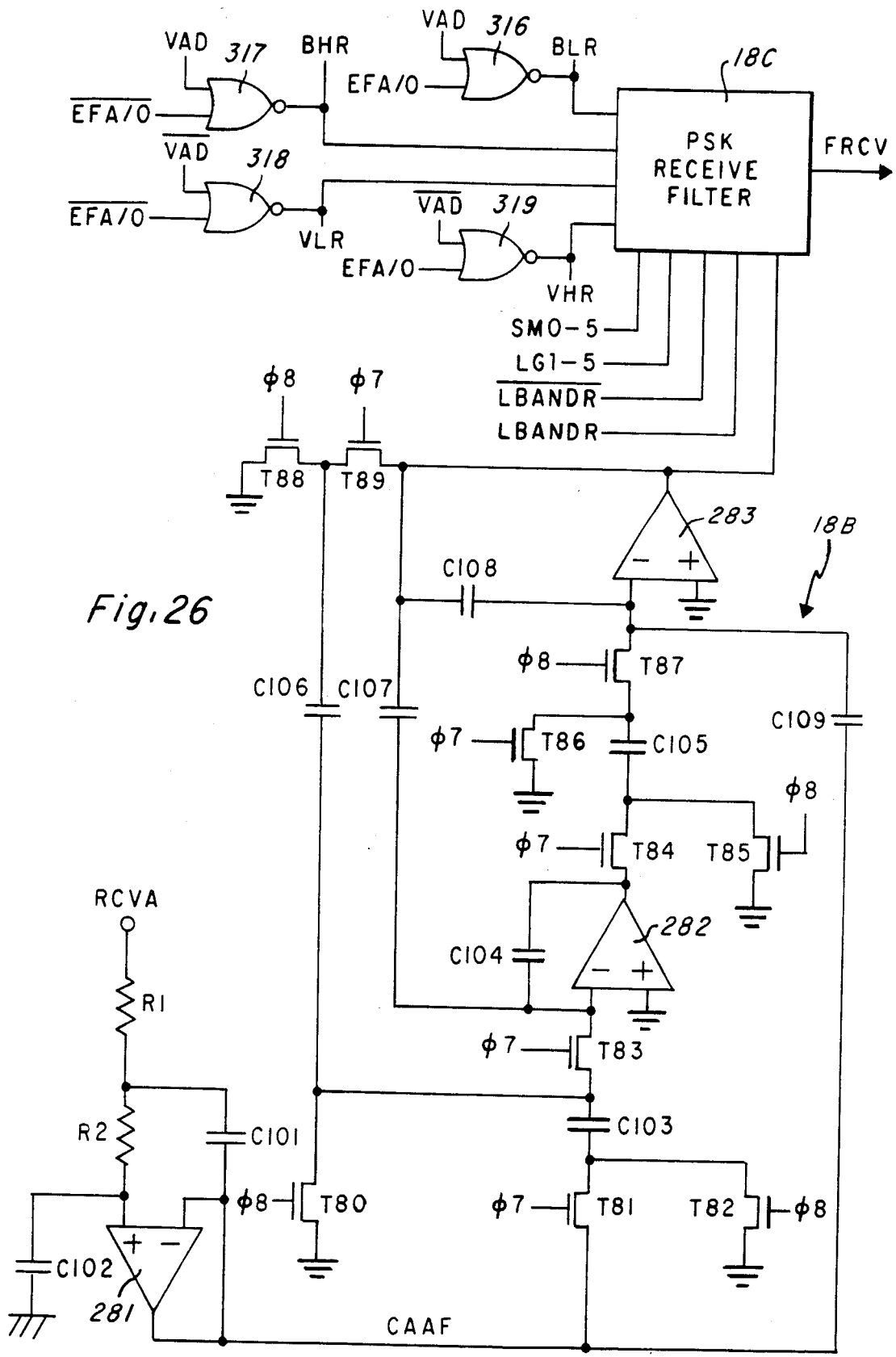

FIG. 26 is a schematic diagram of a continuous filter for receiving a PSK signal followed by a sampled low pass filter followed by a block indication of the PSK receive filter.

Figure 27A:
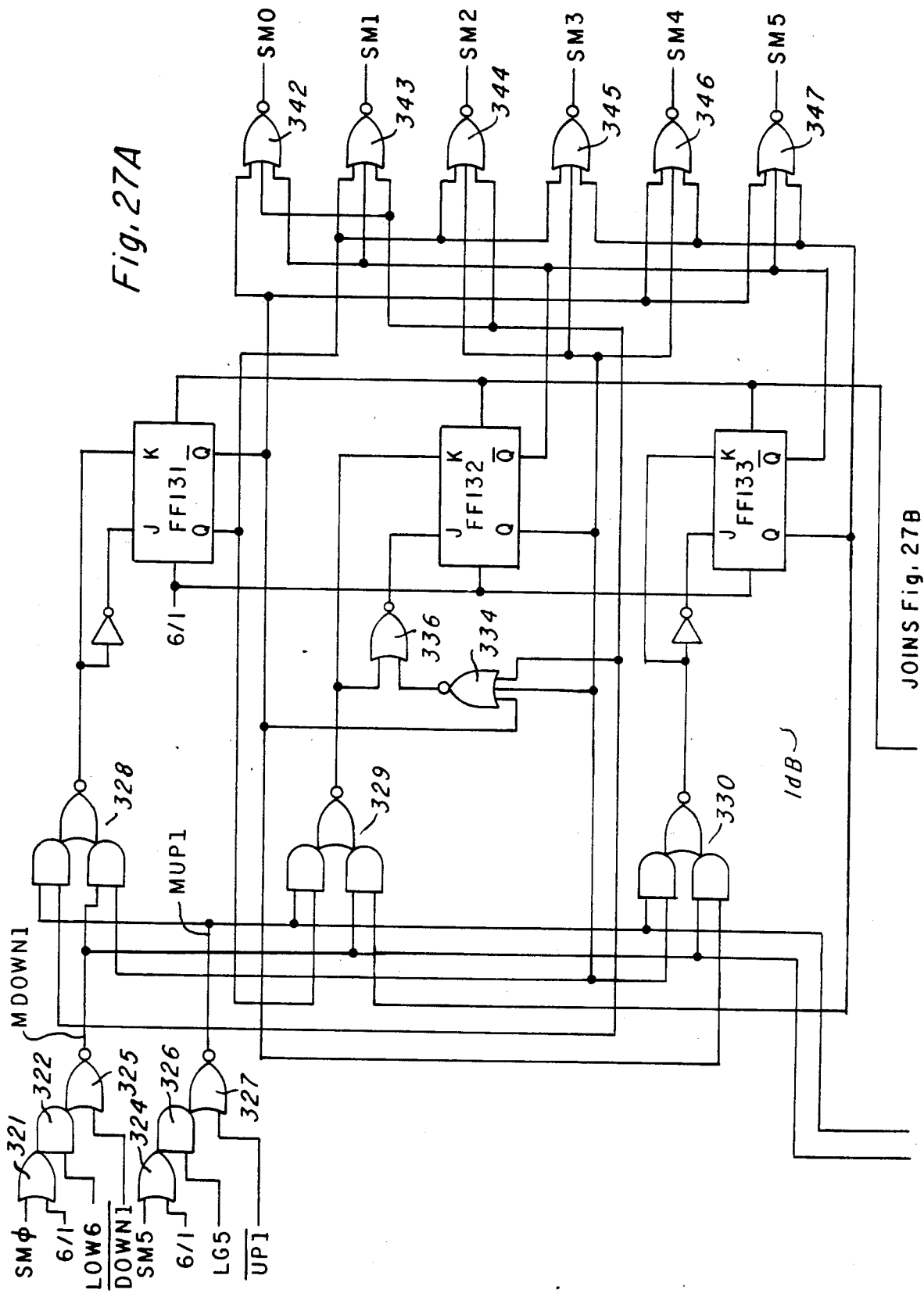
Figure 27B:
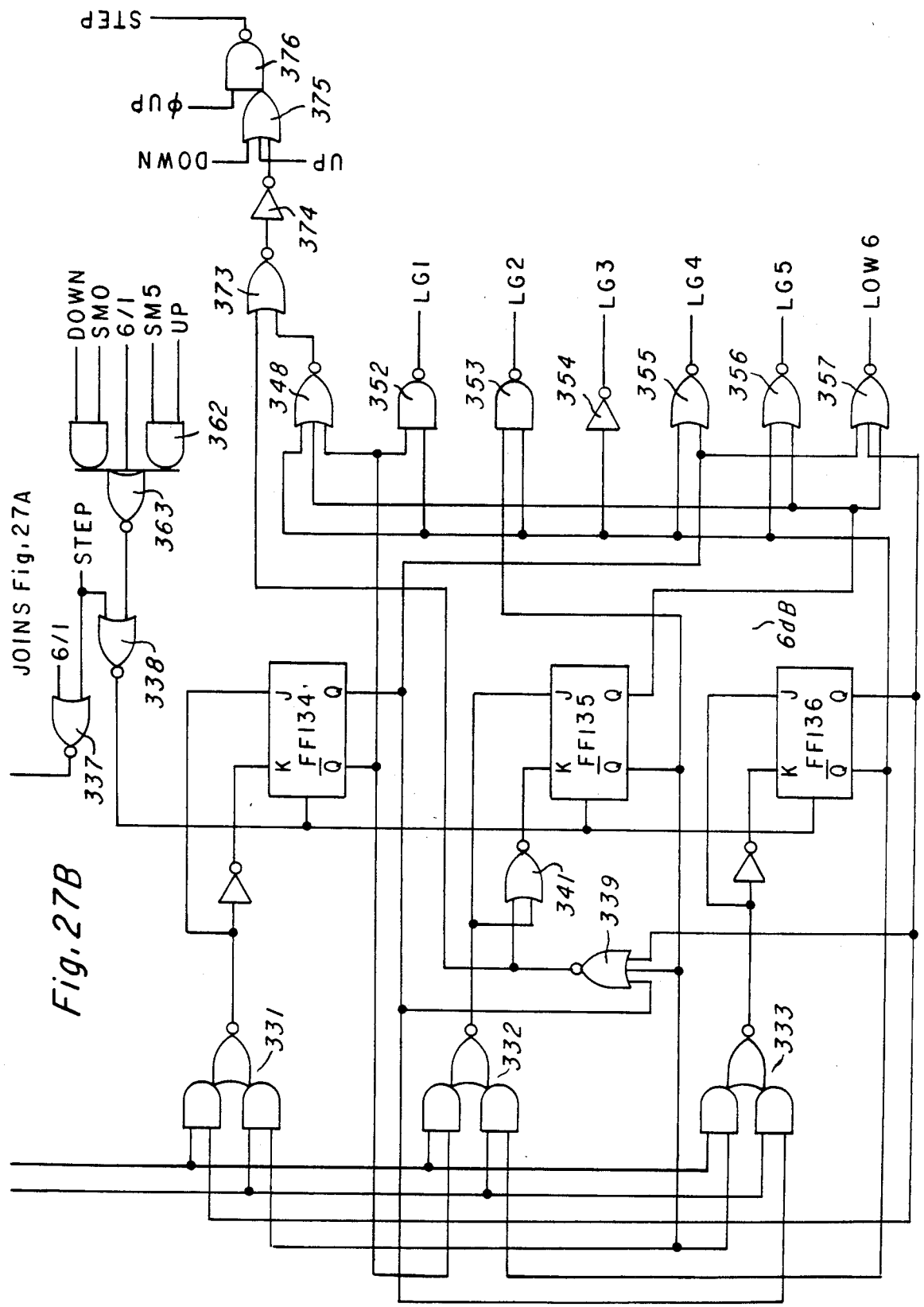

FIGS. 27A and 27B form a schematic diagram of circuitry for the development of signals controlling the gain of the PSK receive filter.

Figure 28:
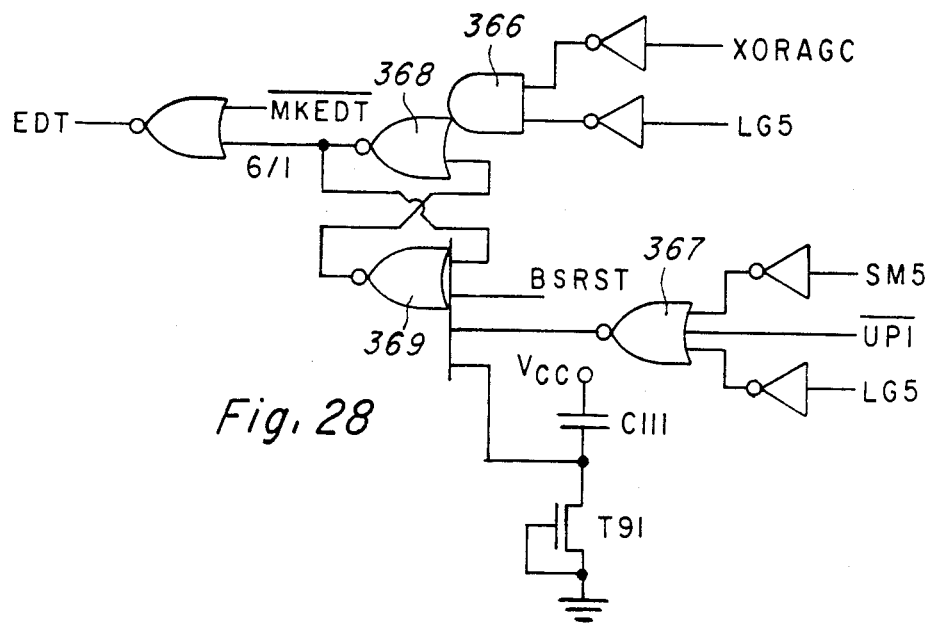

FIG. 28 is a schematic diagram of the development of the energy detect signal.

FIGS. 29A–29E form a schematic diagram of the receive filter.

Figure 30:
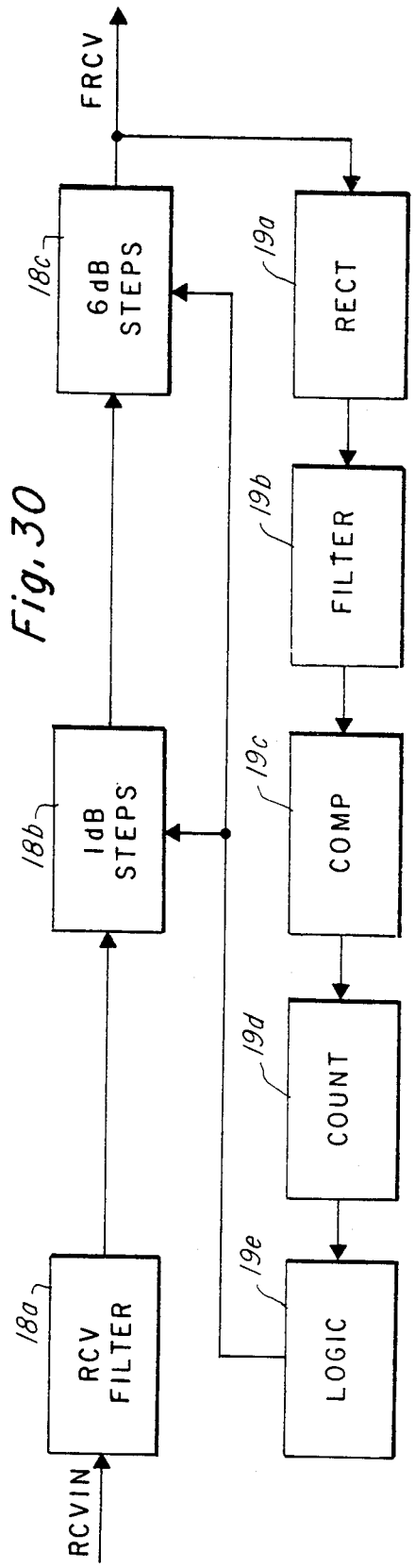

FIG. 30 is a block diagram of the automatic gain control and associated circuits.

Figure 31A:
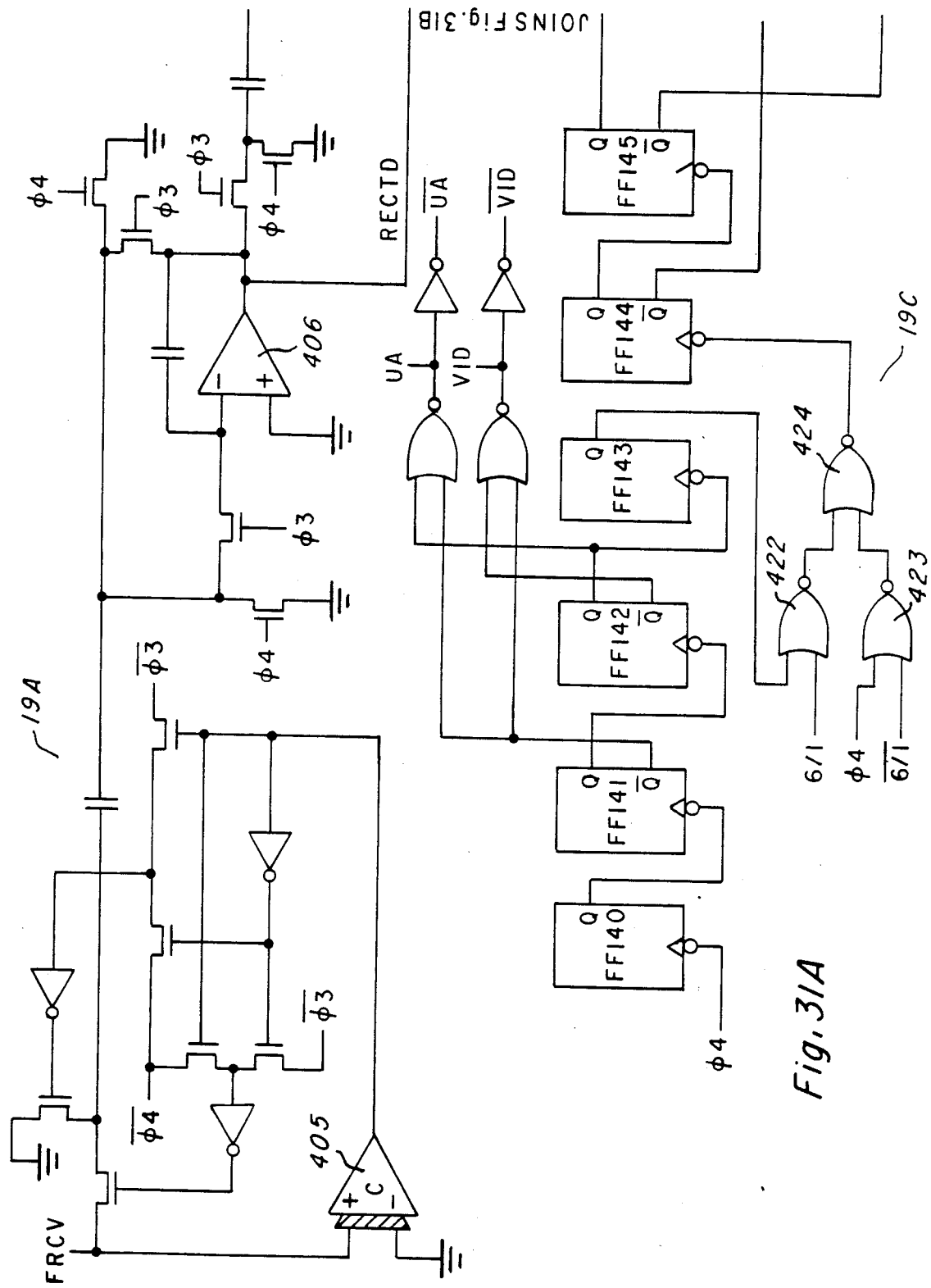
Figure 31C:
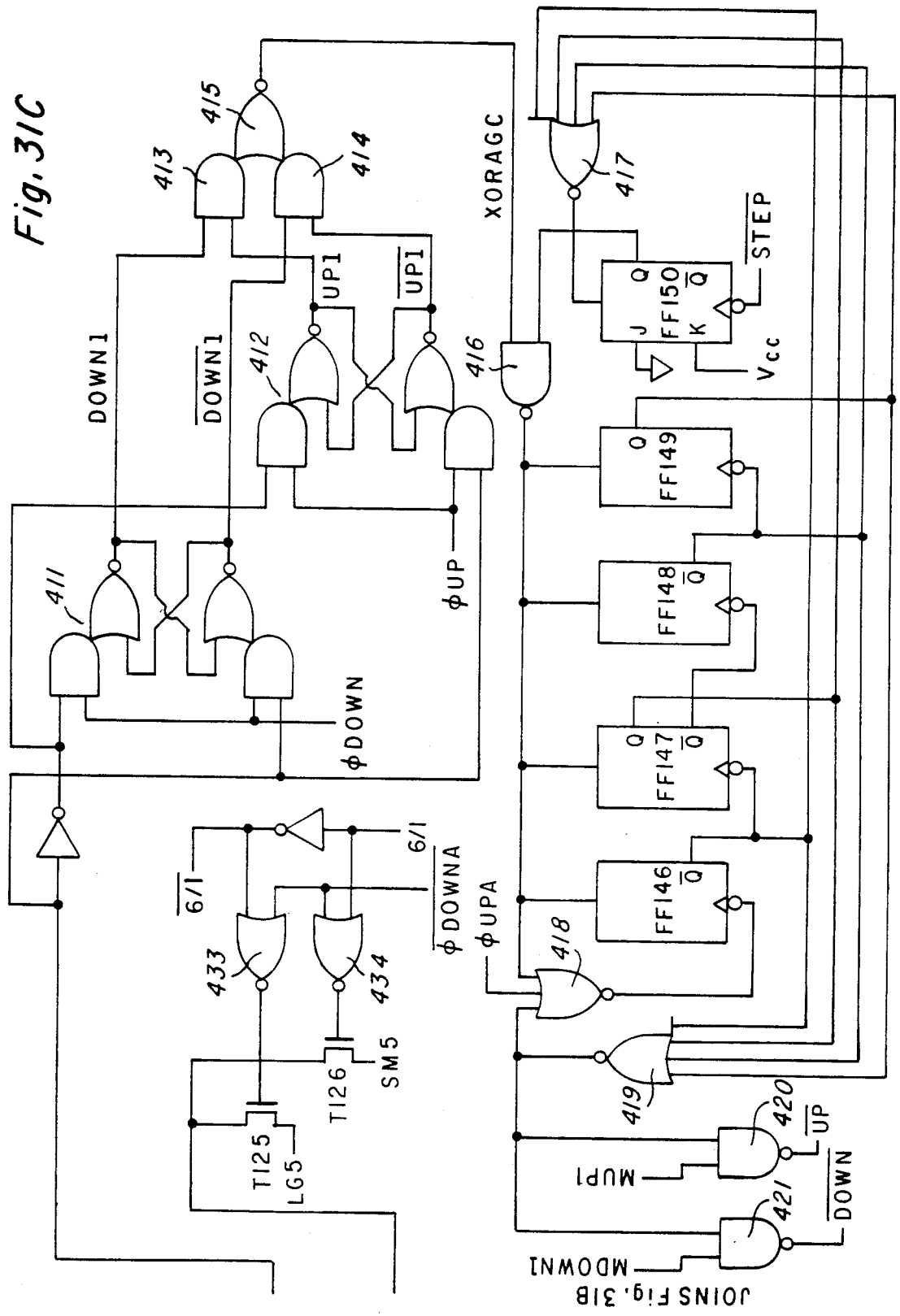

FIGS. 31A–31C form a schematic diagram of the specific AGC circuit.

Figure 32:
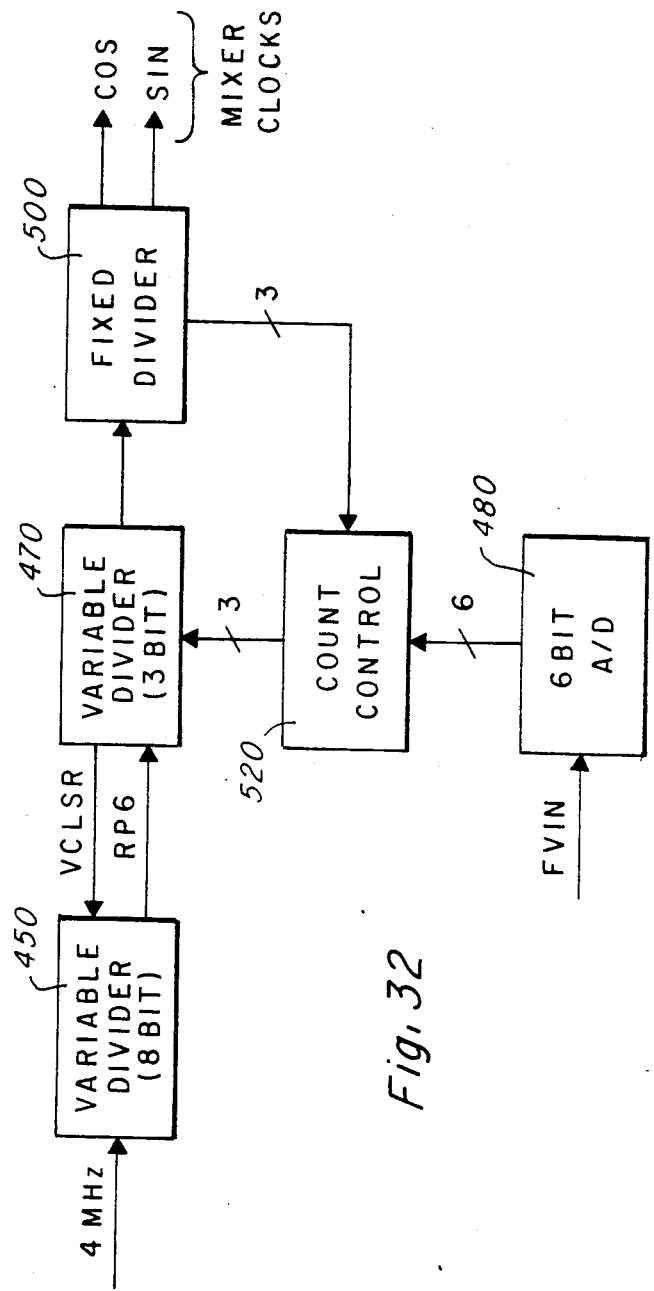

FIG. 32 is a block diagram of a digital voltage controlled oscillator used in the carrier recovery loop.

Figure 33:
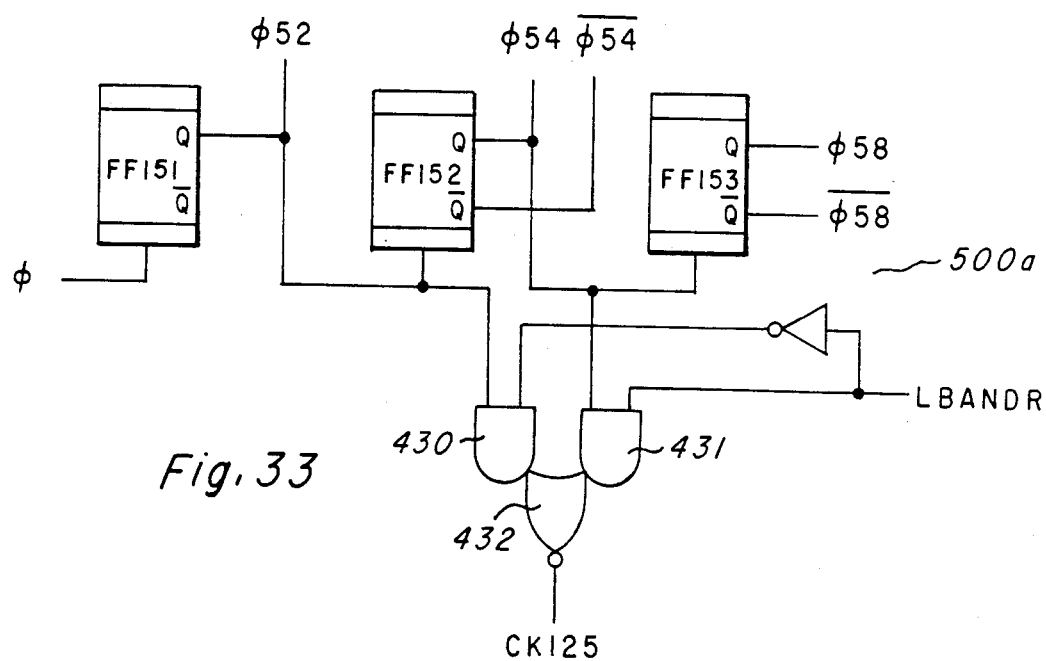
Figure 34:
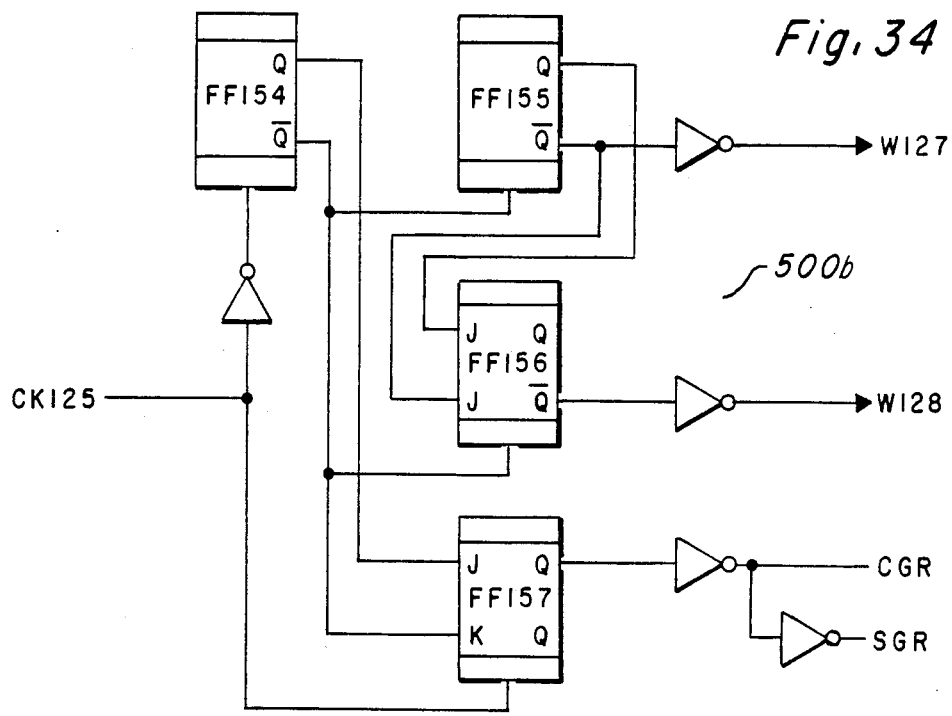
Figure 35:
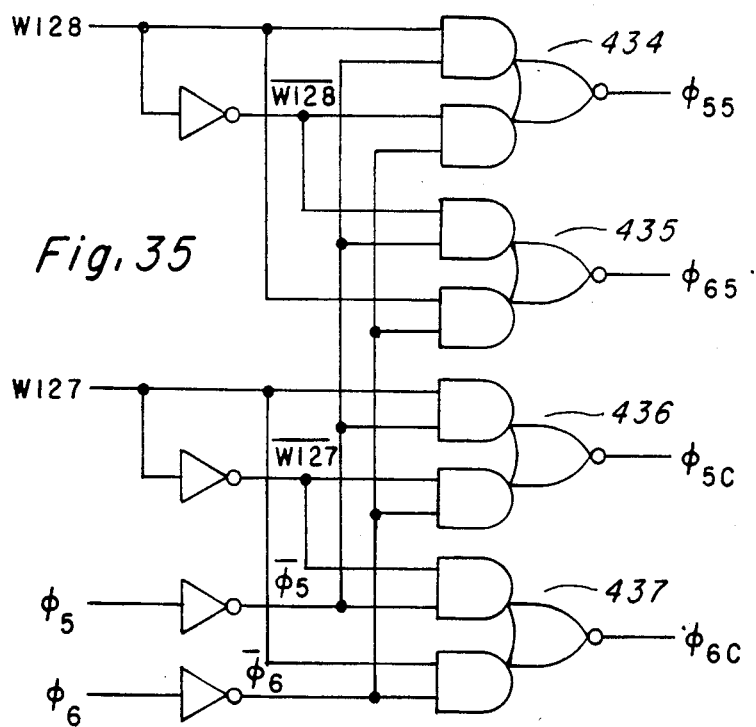

FIGS. 33–35 are schematic diagrams illustrating the development of gating signals for the phase shifting network.

FIGS. 36A–36D are schematic diagrams of circuits for the voltage controlled oscillator and signal development therefor.

FIGS. 37A–37D schematically illustrate the A to D converter and signal development therefor.

Figure 38A:
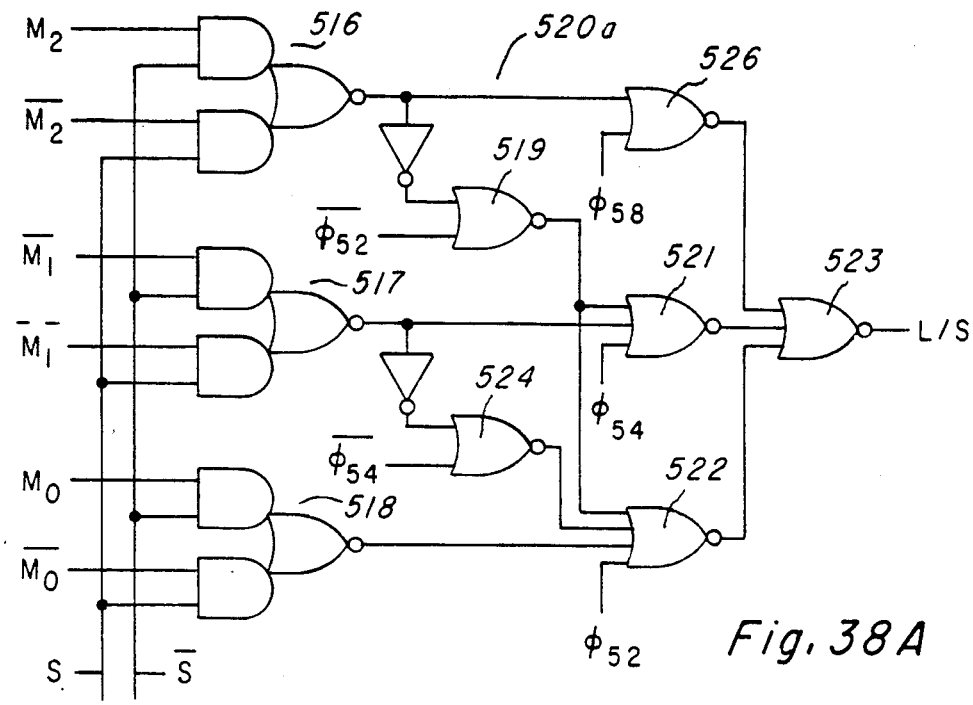
Figure 38B:
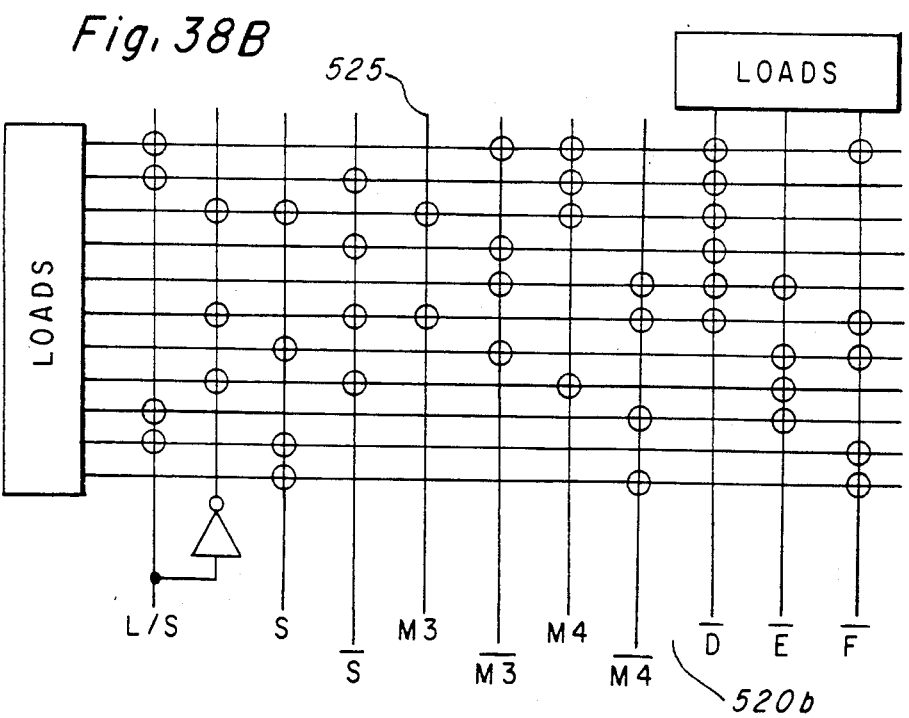

FIGS. 38A and 38B form a schematic diagram of the count control circuit.

Figure 39B:
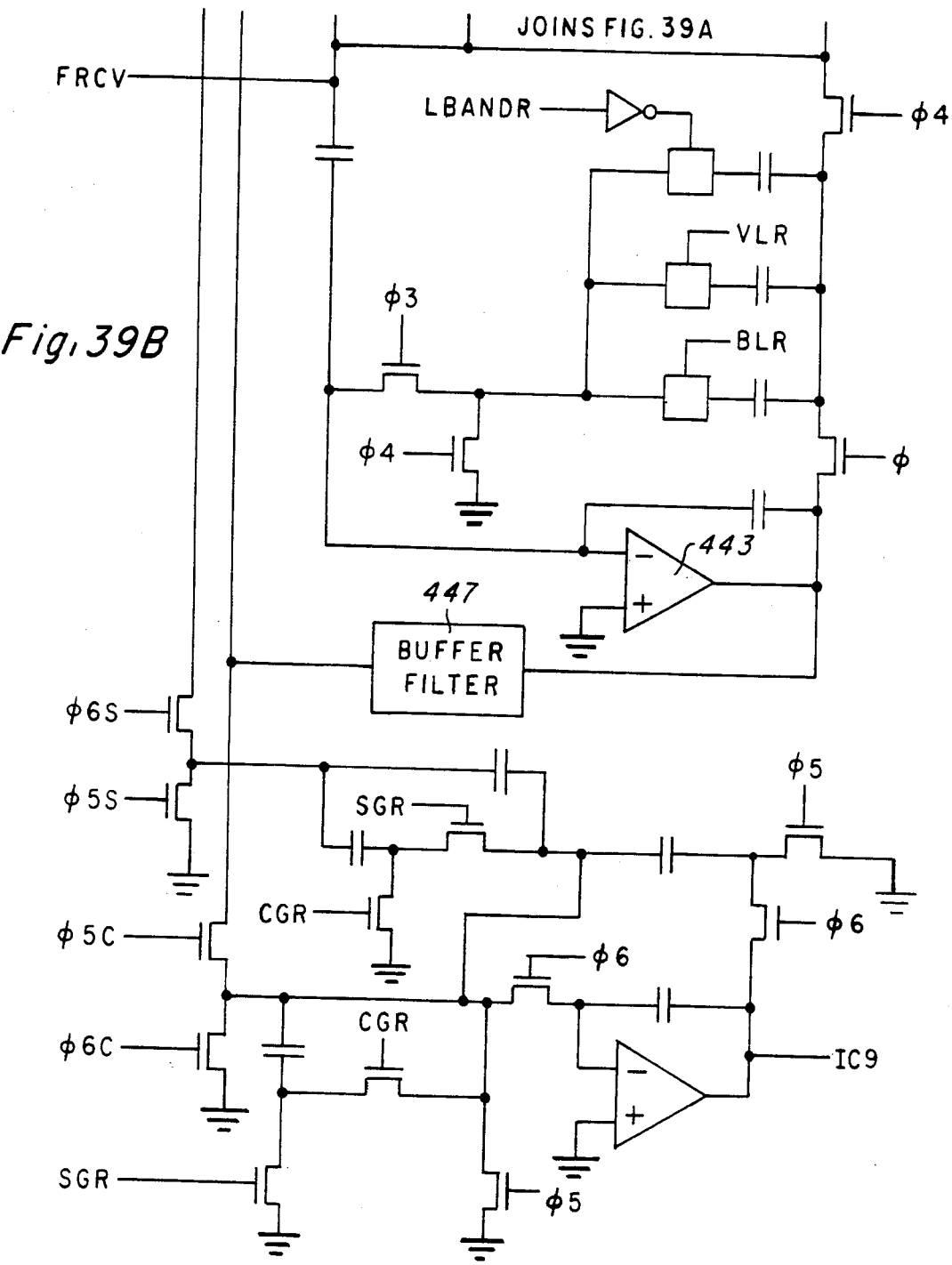

FIGS. 39A and 39B form the phase shifter circuit schematic.

Figure 40:
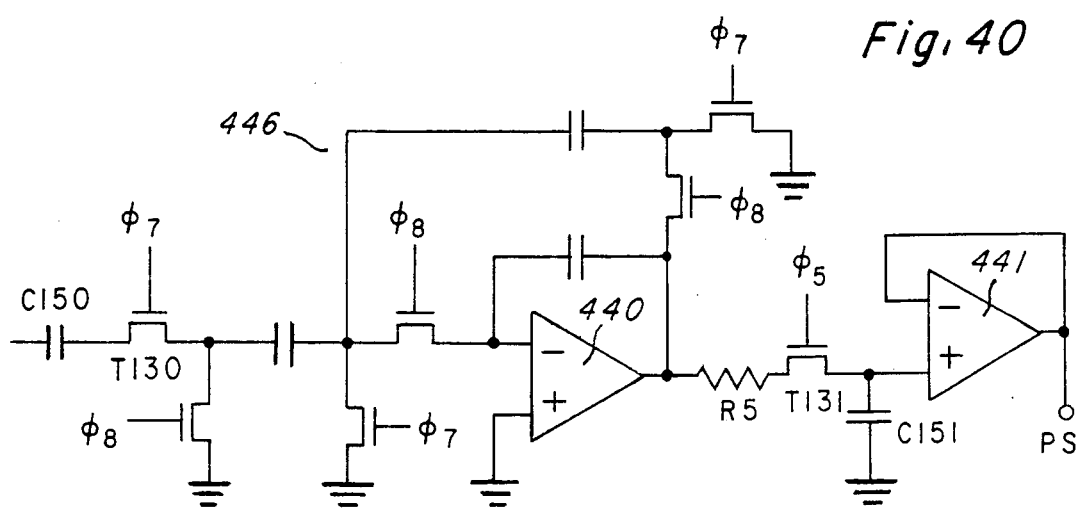

FIG. 40 is a schematic diagram of a buffer filter.

Figure 42A:
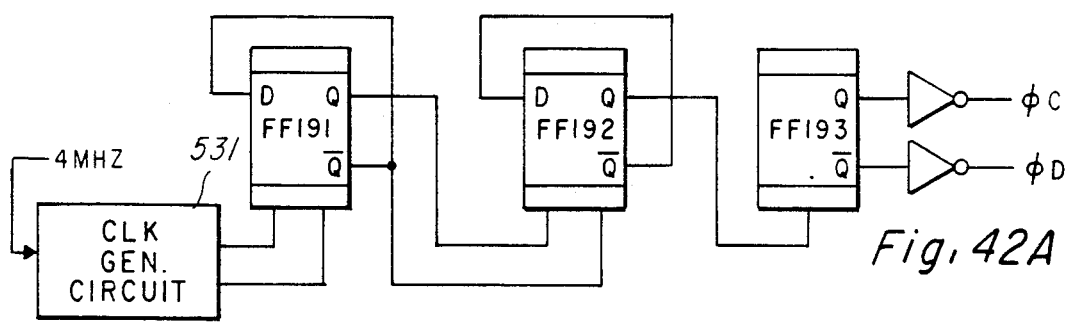
Figure 42B:
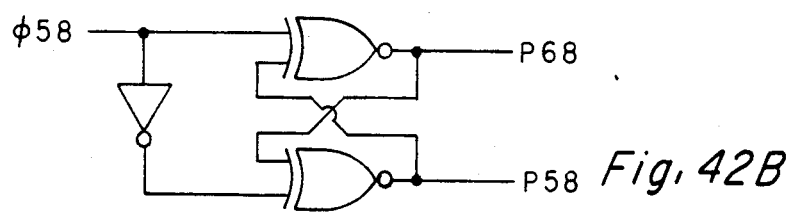
Figure 41:
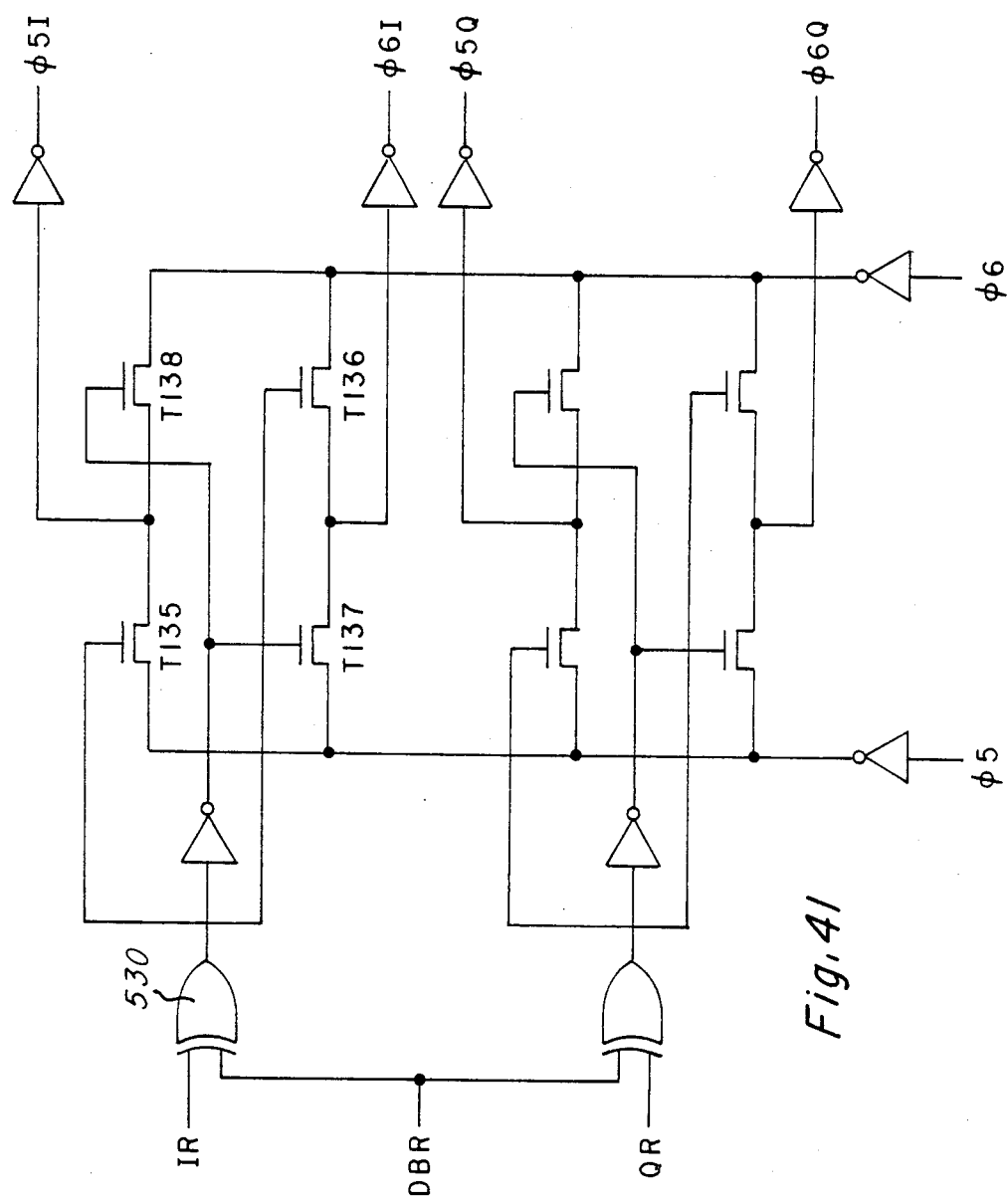

FIGS. 41 and 42A and 42B are schematic diagrams illustrating the development of timing signals for the clock recovery loop.

Figure 43A:
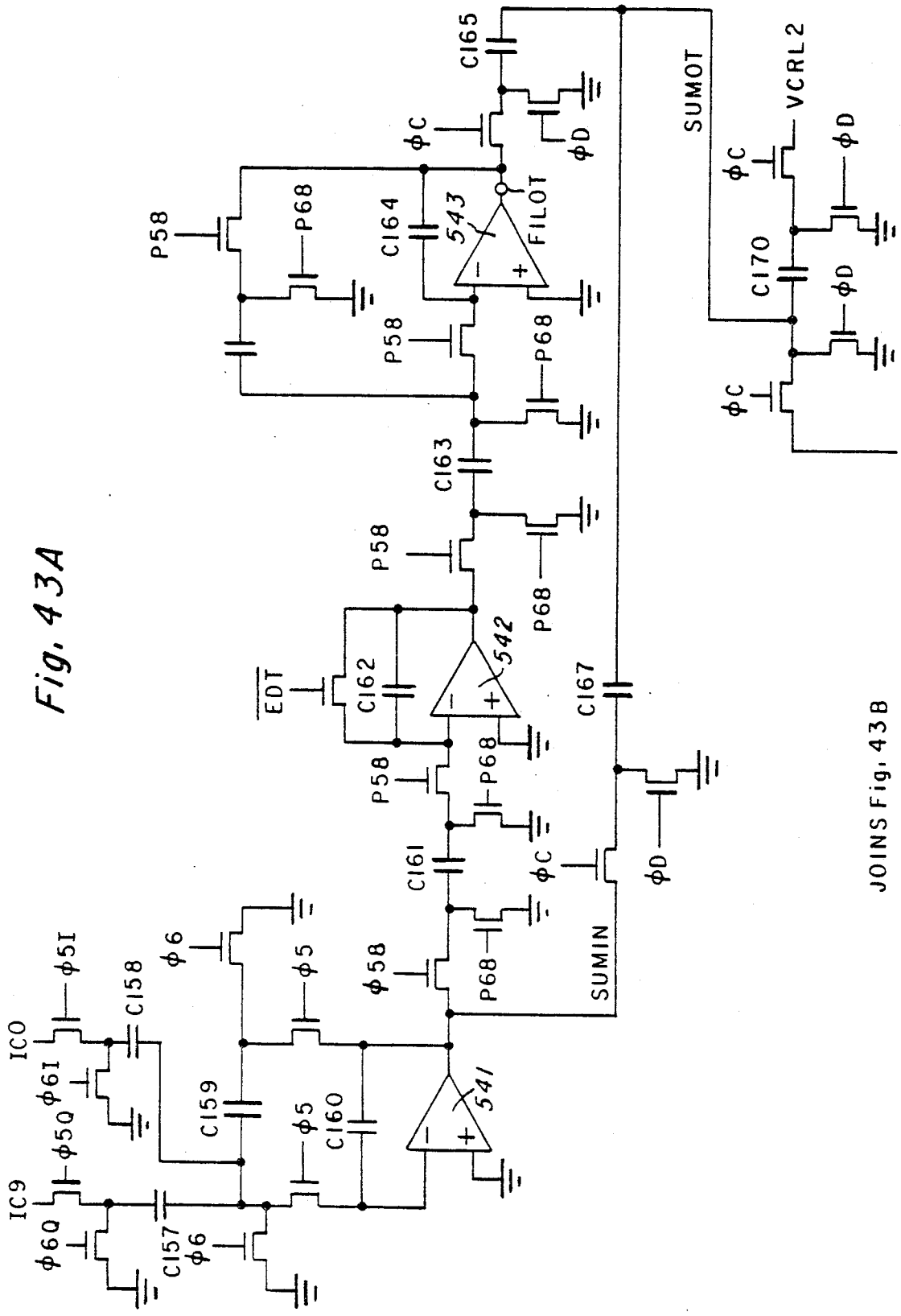
Figure 43B:
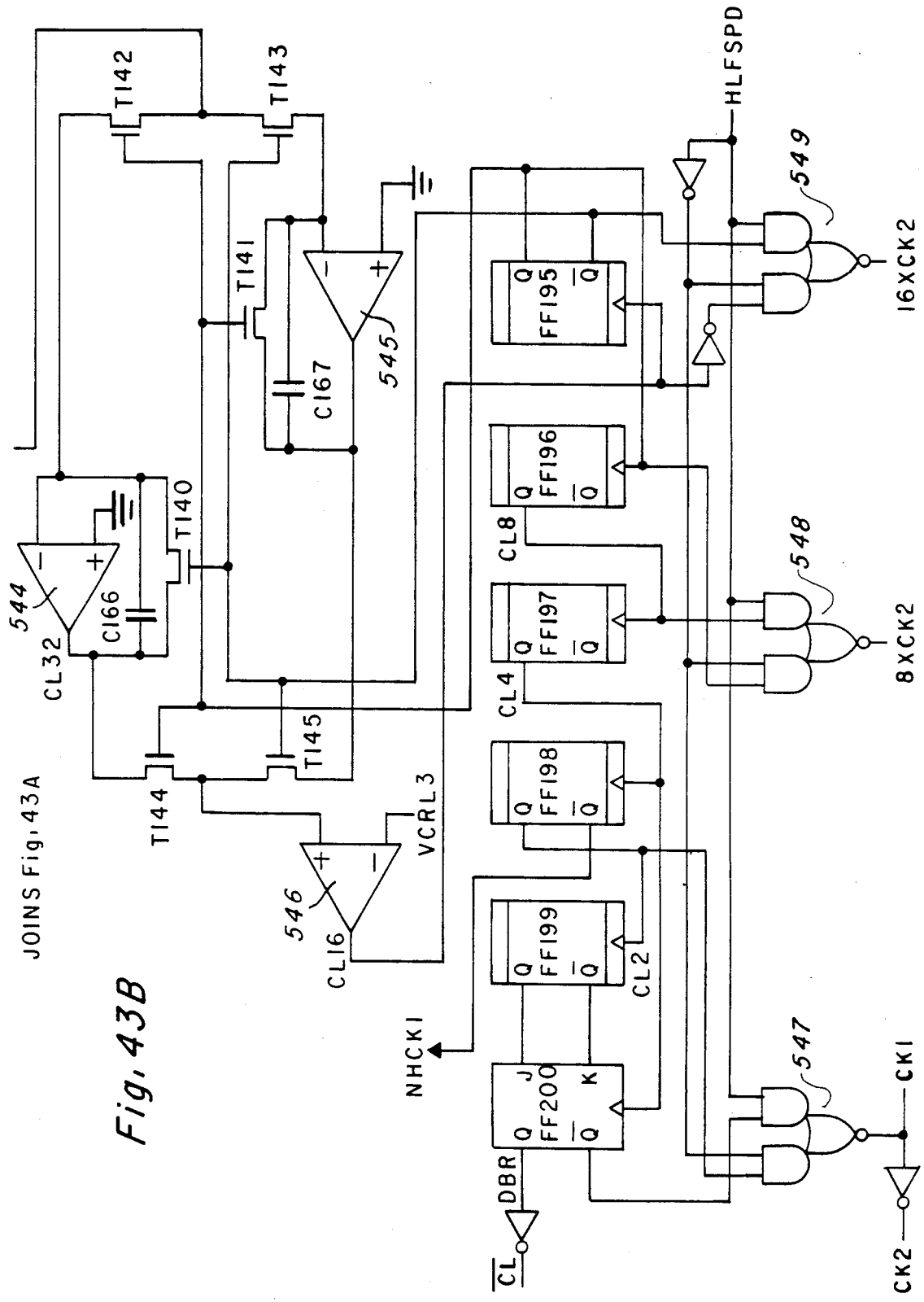

FIGS. 43A and 43B schematically illustrate the clock recovery loop.

FIGS. 44A–44H are schematics illustrating the development of timing signals for the adaptive equalizer.

Figure 45A:
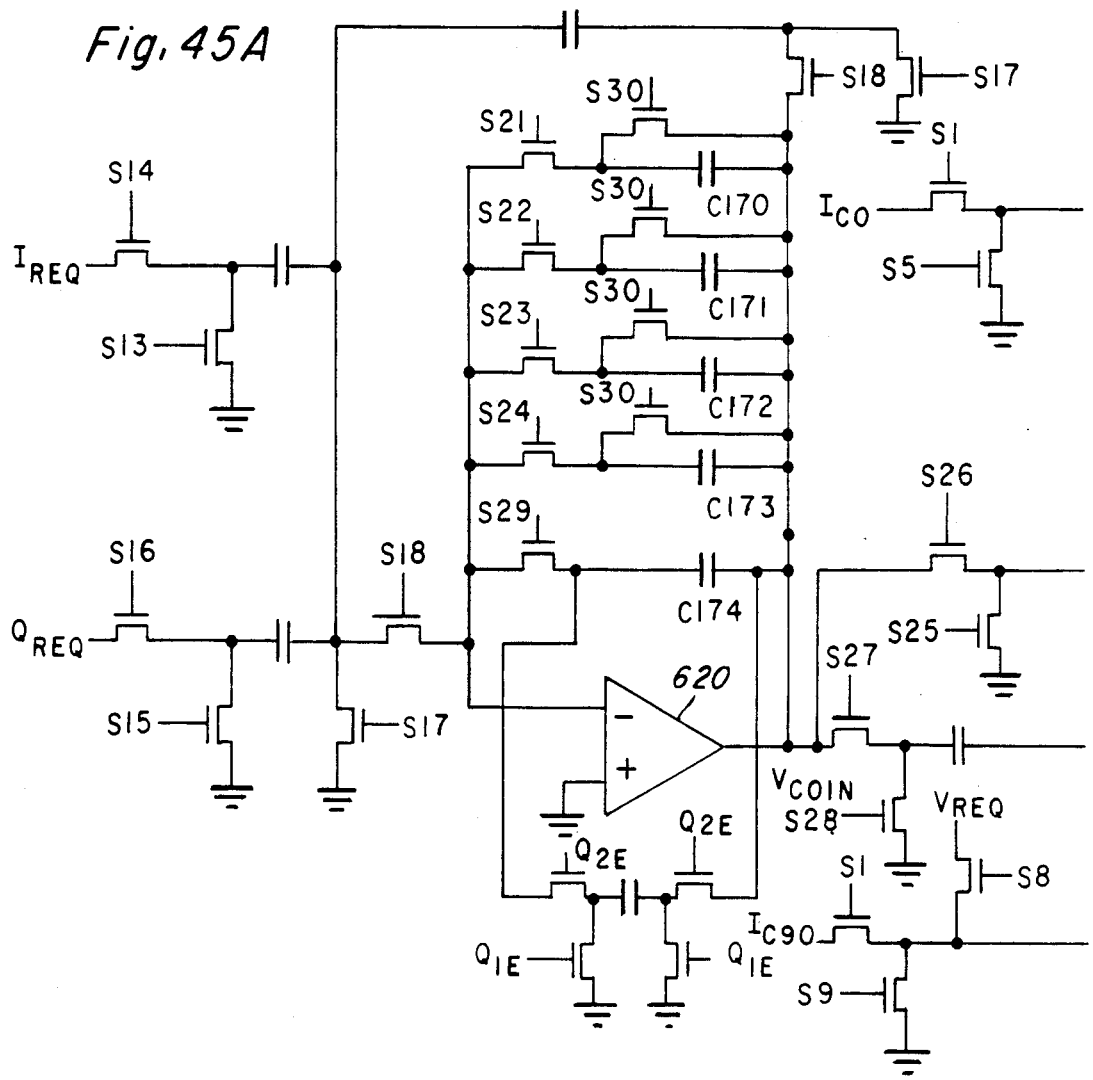

FIGS. 45A and 45B are schematic diagram of the adaptive equalizer.

Figure 46:
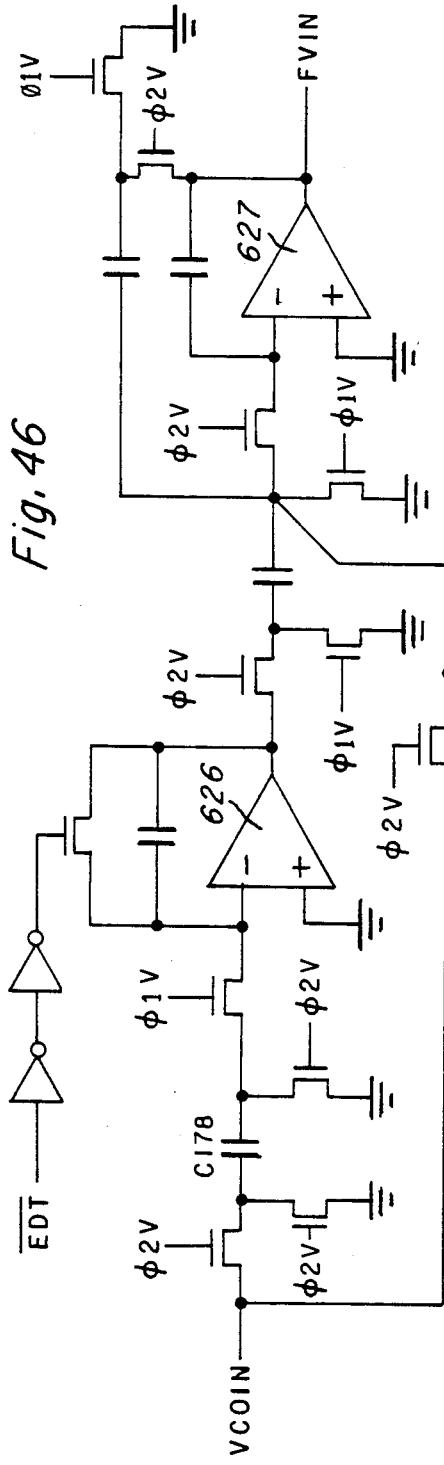

FIG. 46 is a schematic diagram of the development of the input signal for the AGC circuit.

Figure 47:
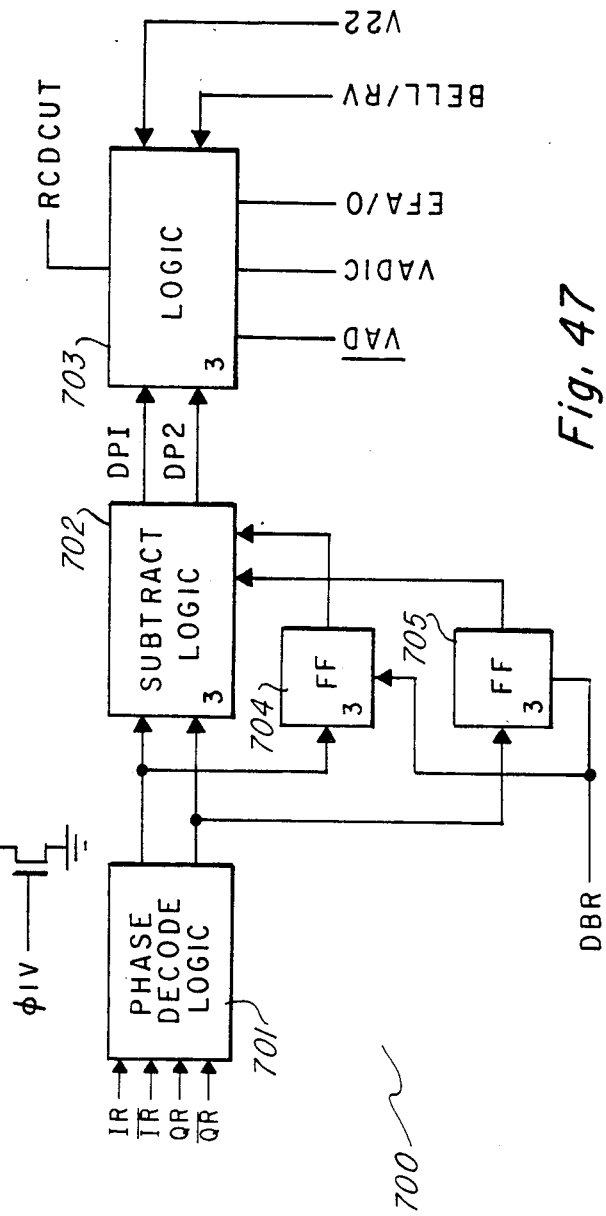

FIG. 47 is a block diagram of the baseband to digital converter.

Figure 48:
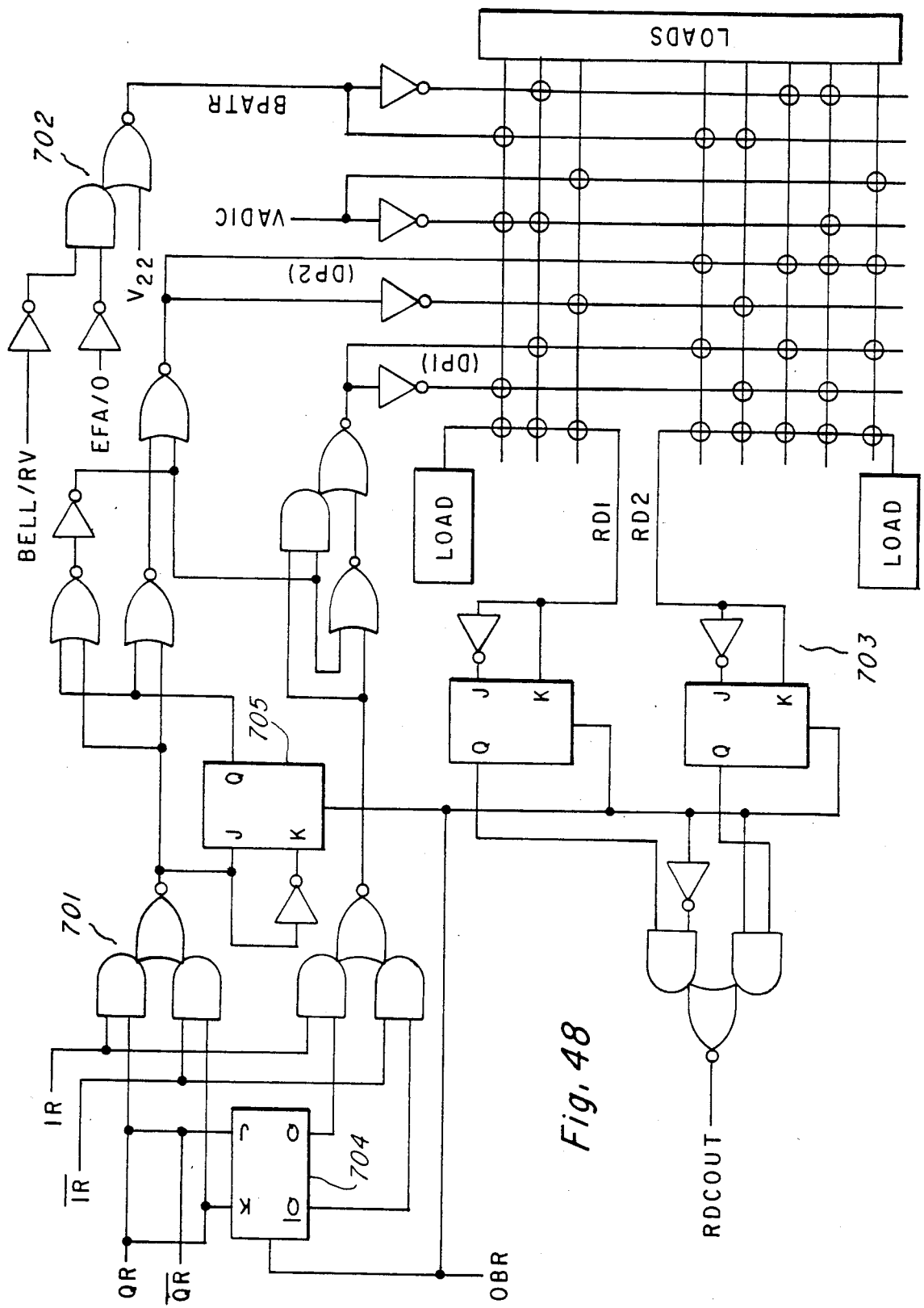

FIG. 48 is a schematic diagram of the baseband to digital converter.

Figure 49:
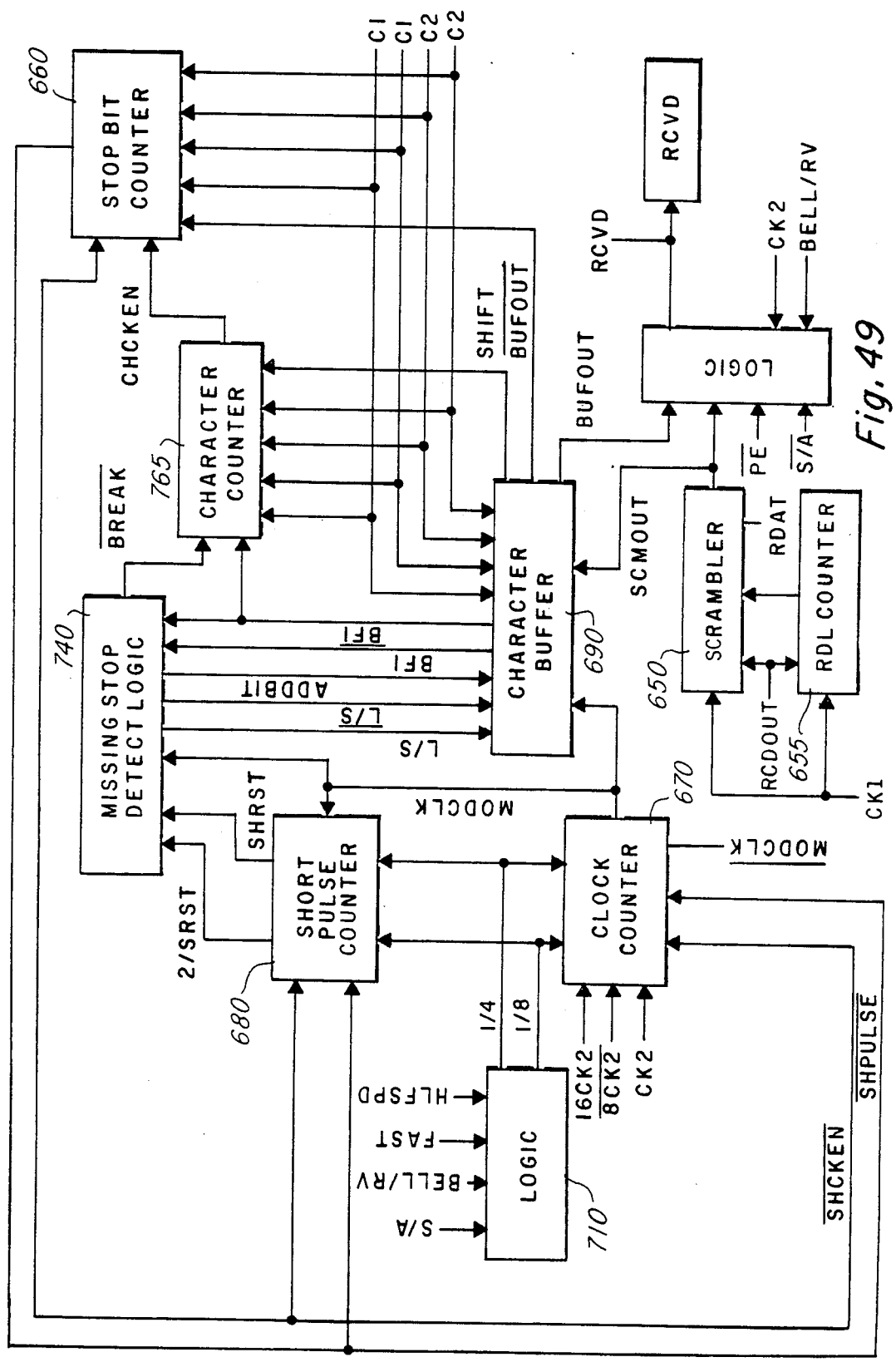

FIG. 49 is a block diagram of the receive buffer.

Figure 50:
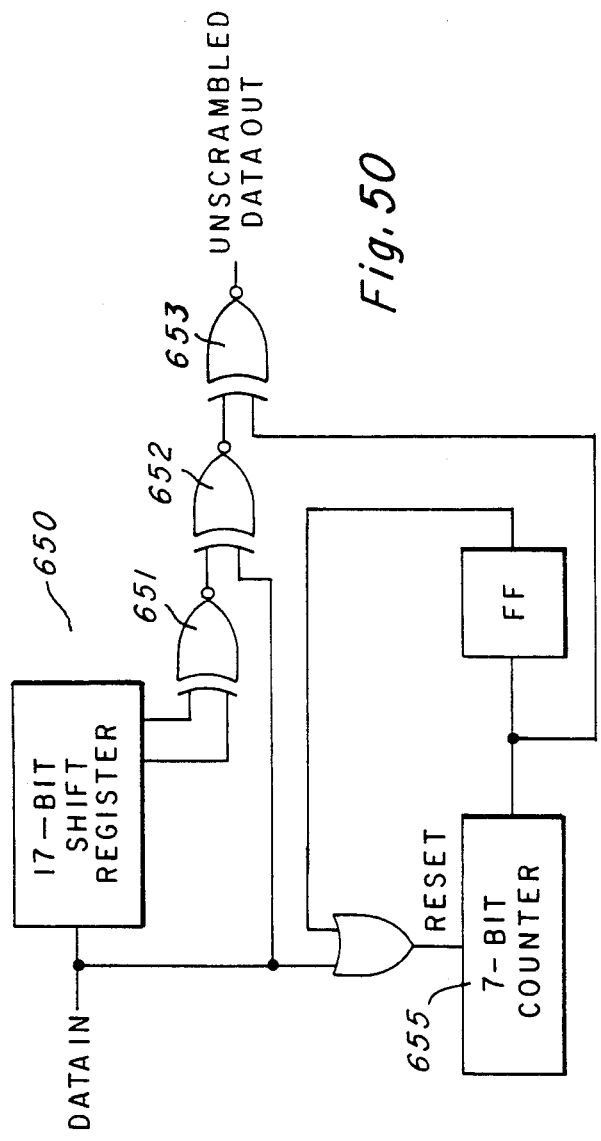

FIG. 50 is a block diagram of the scrambler and data loop recovery counter.

FIGS. 51A–51E form a schematic diagram of the receive buffer.

Figure 52:
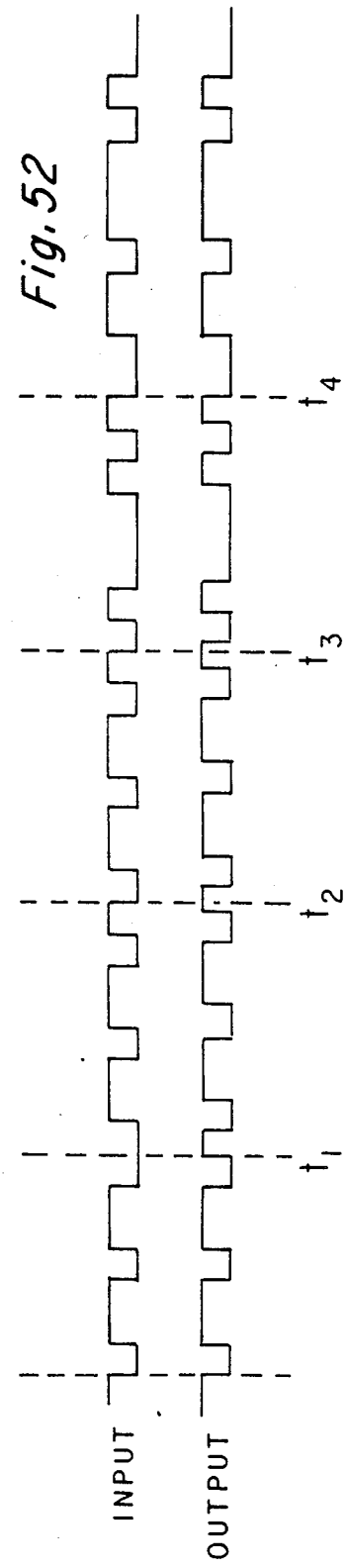

FIG. 52 illustrates an input waveform with stop bits removed and a corresponding output waveform with stop bits added.

Figure 1:
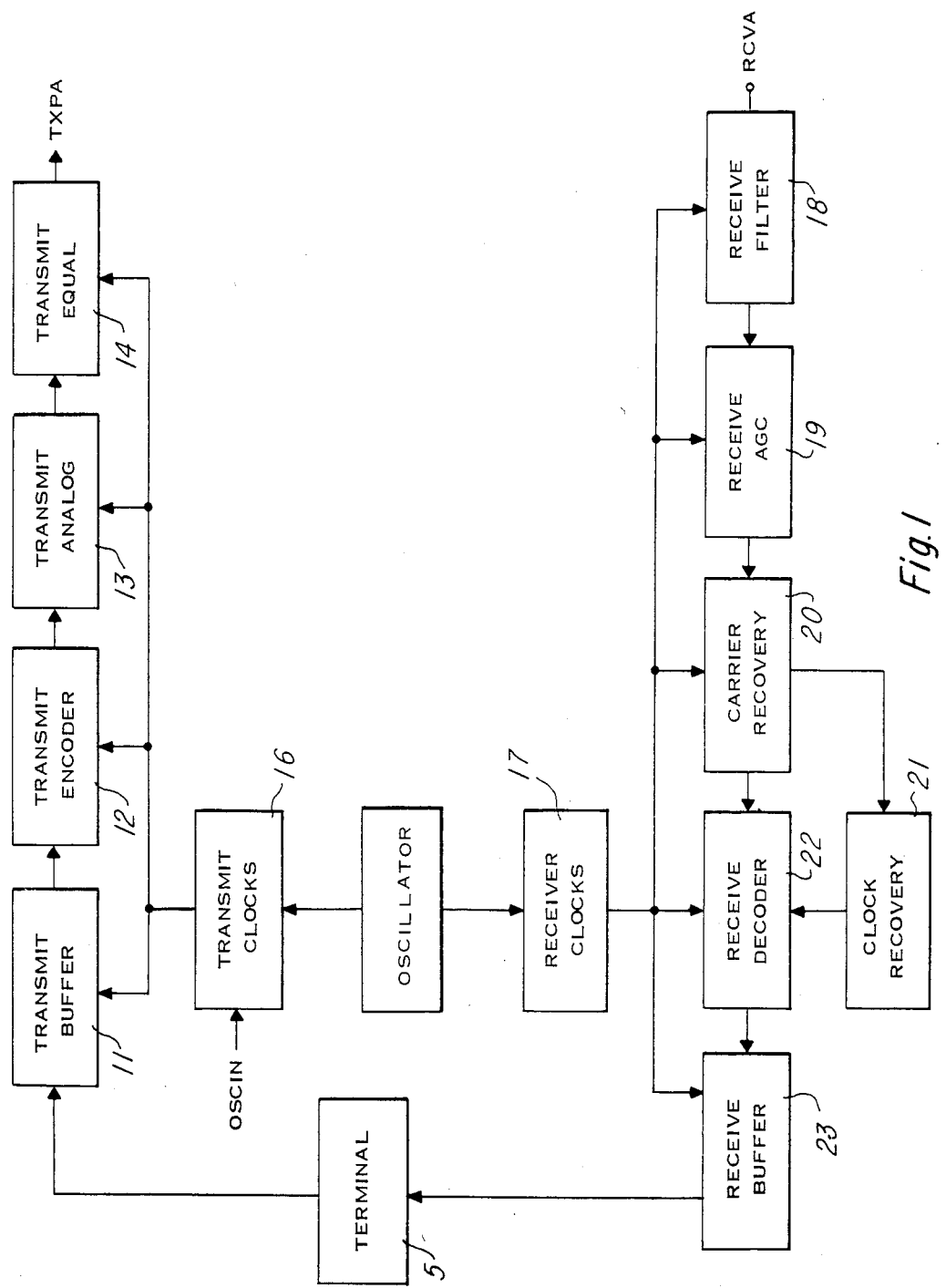
FIG. 1 is a block diagram of the bilateral digital data transmission system of this invention.

FIG. 1 is a block diagram of the entire system. Data terminal 5 is shown as the digital data handling hardware of this invention. In this preferred embodiment, terminal 5 is a Texas Instruments Incorporated Model 787 portable communications data terminal, fully described in Texas Instruments Manual #2265938–9701, copyright 1980. The digital data handling hardware could, of course, be any digital computer, terminal, or any other hardware source for receiving and/or sending out digital data.

Terminal 5 is shown connected to transmit buffer 11 whose output is shown connected to transmit encoder 12. Transmit encoder 12 sends encoded information to transmit analog 13 which sends a PSK modulated waveform into (in this preferred embodiment) a transmit equalizer circuit. The above circuits are clocked by transmit clocks generated from signal OSCIN.

PSK modulated waveform RCVA is received by receive filter 18 which is acted upon by receive AGC19 for adjusting gain of the input signal. Carrier recovery circuit 20 receives the filtered signal, splits it into baseband signals and adaptively equalizes the baseband signals to remove cross-talk between the transmitter and receiver transmission lines. The baseband signals are sent to clock recovery circuit 21 which recovers the clock used in the transmission for decoding the baseband signals in receiver decoder 22. The output of receive decoder 22 is shown entering receive buffer 23.

Figure 2:
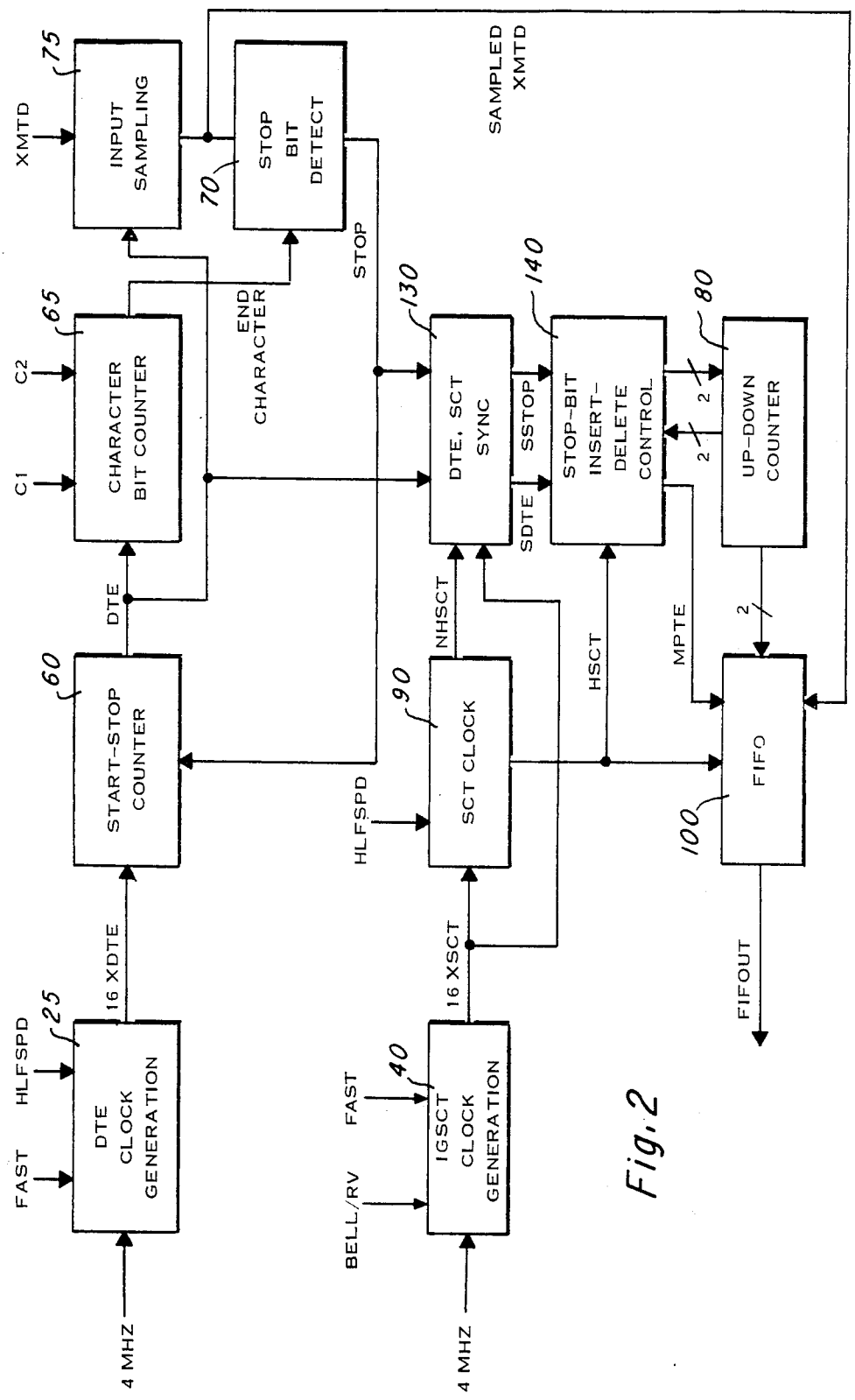
FIG. 2 is a block diagram of the transmit buffer of this invention.

Referring to FIG. 2, a block diagram of the transmit buffer 11 is shown. DTE clock generation 25 is shown having control signals FAST and HLFSPD and a clock input of 4 MHz. The output is 16X DTE which is input to start-stop counter 60. The output of start-stop counter 60 is signal DTE which is applied to character bit counter 65, to input sampling 75, and to DTE-to-SCT sync 130. Character bit counter 65 also has signals C1 and C2 for determining character length applied. Its output, signal ENDCHAR is sent to stop bit detect 70. Input sampling 75 has the input signal XMTD applied and its output goes to stop bit detect 70 and to FIFO 100. Stop bit detect 70 has output signal STOP which goes to DTE to SCT sync 130 and to start-stop counter 60.

SCT clock generation 40, having BELL/RV, FAST and 4 MHz inputs provides output clock 16XSCT which is applied to SCT clock 90 and to DTE-to-SCT sync 130. SCT clock 90 has control signal HLFSPD applied and its output signal NHSCT is applied to DTE to SCT sync 130. An output rom clock 90 is also applied to FIFO 100 and to stop-bit-insert-delete control 140.

DTE-to-SCT sync 130 provides output signals S STOP and SDTE which are applied to control 140. Control 140 also has signal 1/8 applied and provides output signals to UP/DOWN counter 80 and to FIFO 100. UP/DOWN counter 80 also applies signals to FIFO 100. FIFO 100 provides output signal FIFOUT, which is scrambled or not, depending upon the modem selection.

Transmit Buffer

FIGS. 3A and 3B schematically illustrate the data terminal equipment (DTE) clock generation circuit 25 of FIG. 2. An externally supplied oscillator square wave signal (at a frequency of 4.032 MHz in this preferred embodiment and hereafter referred to as 4 MHz) is applied through buffer circuit 26 which provides a "false" output after inverter 27 and a "true" output after inverter 28, the true output being applied to the input of clock generator circuit 33. Clock generator circuit 33 provides clocks 1 and 2 which are 180° out of phase. The true output from buffer circuit 26 is inverted through inverter 29 and applied as an input to NOR gate 31 and as an enabling signal on NOR gate 32. The output of inverter 29 is inverted through inverter 30, providing an input to NOR gate 32 and an enabling signal for NOR gate 31. NOR gates 31 and 32 are cross coupled with NOR gate 31 providing clock 1 and NOR gate 32 providing clock 2. Clocks 1 and 2 are used for timing DTE clock generation circuit 25, a pseudo-random shift register, which is made up of flip-flops FF10–FF18 by providing clock inputs to those flip flops. Flip flop 10 has its Q output connected to the D input of flip flop 11 and its Q and Q— outputs connected into programmed logic array (PLA) 38, as shown. The interconnections between the remaining flip flops are identical, with variations, of course, in the devices selected by the PLA 38. Exclusive OR circuit 34 provides the logical exclusive OR of flip flops 14 and 18 to provide the D inputs to flip flop 10. The pseudo-random shift register is connected in a well known manner and provides an output signal, IGDTE—, which is 16 times the desired operational frequency.

It should be noted throughout this discussion, a "—" following a designation of signal indicates the inversion of the signal, while on the drawings, an inversion is indicated by a bar over the signal designation. Signals FAST and HLFSPD, and their inversions select lines of the PLA and cause the counting to be controlled in a desired fashion to provide the desired functioning of circuit 25. The origin of signals FAST and HLFSPD is discussed later.

The SCT clock generation circuit 40 provides the transmit data clock and is similar to circuit 25. It has clocks 1 and 2 provided to flip flops FF20–FF27 from clock generation circuit 41 which is identical to the clock generation circuit 33 described above. The input to clock generator circuit 41 is the same as that to circuit 33, that is, it is the true output from the buffer circuit 26.

Flip flop 20 has its Q output connected to the D input of flip flop 21 and also connected into PLA 42. The remaining flip flops are interconnected in exactly the same way. Each of the flip flops has its Q— output connected into the PLA. The devices selected by the PLA are done so as shown in a conventional manner to get the desired output. In this particular embodiment, signal BELL/RV and its inversion, and signal FAST and its inversion are applied as selection inputs to PLA 42. Exclusive OR circuit 45 provides the exclusive OR output from flip flops FF26 and FF27. Exclusive OR circuit 44 provides the exclusive OR output of flip flops FF21 and FF22. These outputs, in turn, are exclusively ORed by exclusive OR circuit 43 whose output provides the D input to flip flop 20. OR gate 48 receives its inputs from the first two row lines of PLA 42 and OR gate 49 receives its three inputs from the next three lines of PLA 42. NOR gate 46 receives its four inputs from lines 3-6 of PLA 42. AND gates 51 receive their inputs from the clock 1 and OR gates 48 and 49, respectively. AND gates 51 and 52 provide inputs to cross coupled NOR gates 53 and 54. NOR gate 53 provides signal 16SCT— and NOR gate 54 provides signal 16SCT, which are 16 times the frequency of the desired transmitting input signal.

Inputs C1 and C2 shown on FIG. 3B indicate the number of bits in the particular character to be transmitted. That is, in combination, they provide a selection of 8, 9, 10, or 11 bits. Signals C1 and C2 are buffered through buffer circuits 61 and 62, which are identical to buffer circuit 26, with the two outputs and their inversions being applied as selection inputs to PLA 68 of character bit counter 65 shown in FIG. 3C. Toggle flip flops FF35-FF38 provide the counting mechanism. The count is established by addressing the associated PLA 68. Flip flop FF39 provides a "1" output on its Q terminal when a character of the correct bit length has been read in, clocking flip flop 70, the stop bit detect flip flop. The Q— output of stop bit detect flip flop 70 is a "0" when a "start" bit is received via the data input XMTD and XMTD—, the "start" bit also being a "0". A designation of "1" and "0" is completely arbitrary and in this preferred embodiment, a "1" represents a positive voltage and a "0" represents zero volts. These values may be referred to as "true" and "false" and "high" and "low", respectively.

The Q— output of stop bit detect flip flop 70 is a "0" and is gated out by the Q output of flip flop 39. The Q— output of flip flop 70 provides one input to NOR gate 63, enabling that gate for the reception of the output signal 16 DTE—, previously described. At the conclusion of the start bit, the Q output of flip flop FF39 goes to "0", thereby blocking any further transfer on the Q output of the stop bit detect flip flop 70, permitting continued entry of signal IGDTE— through gate 63.

PLA 68 is activated by signals C1 and C2 to provide a character o 8, 9, 10 or 11 bits. PLA68 provides the logical structure, as connected to flip flops FF35-FF38, to permit those flip flops to count to the selected number of bits. The Q output of flip flop FF39 provides the preset inputs to each of flip flops FF35-FF38 and provides one input to NOR gate 66, whose other input is provided by the signal DTE—. The output of NOR gate 66 provides the clock input to flip flop FF35 whose Q— output provides the clock input to flip flop 36. Flip flops FF37 and FF38 are interconnected in the same fashion. All of flip flops FF35-38 have their Q and Q— outputs connected as shown to PLA 68 to insure that the proper count is reached. The counting of the character bit counter is started by a 0 output from the Q terminal of flip flop FF39, together with a 0 DTE— signal, clocking flip flop FF35. The count continues until the predetermined character bit length is reached, at which time flip flop 39 goes high, providing clocking for stop bit detect flip flop 70.

As mentioned above, the 16 DTE— signal is passed through NOR gate 63 and causes the counting of toggle flip flops FF30-FF33, thereby dividing the input frequency of 16 DTE down to frequency DTE.

The modem of this invention is designed to operate synchronously and asynchronously at various frequencies, depending upon the system with which the modem is compatible. Providing a frequency of approximately 16 times the expected data rate enable the sampling of data near the midpoint of each bit. This is illustrated in FIG. 4 where the input data is shown as signal XMTD and the divided sampling signal is shown as DTE. DTE1 illustrates a possible shift of 29.5% from the center of the bit and DTE2 illustrates a 10.5% shift from the center. These shifts are the result of different input frequencies.

This is an acceptable deviation and signal DTE is used to clock input sampling flip flop 75 of FIG. 3C which has data signal XMTD applied to its J input and signal XMDT applied to its K input. The Q— output of flip flop FF39 is applied as one input to NOR gate 95 which is connected to the preset input of flip flop FF40 which is clocked by the STOP signal. The Q output from flip flop FF40 provides one input to NOR gate 96 whose other input is provided by signal DTE— from the Q output of flip flop 33 of start-stop counter 60, which also provides the J input to flip flop FF41. The output of NOR gate 96 provides the K input to flip flop 41 whose Q output is signal SDTE— and whose Q— output is SDTE.

The Q output of input sampling flip flop 75 provides an input to NOR gate 120 and to NOR gate 121. The other input to NOR gate 121 is the STOP signal. The Q— output of input sampling flip flop 75 provides one input to NOR gate 122 whose other input is provided by the STOP— signal. The output of NOR gate 121 provides the K input to flip flop FF48 and the output from NOR gate 122 provides the J input to flip flop FF48. Flip flop FF48 provides the SSTOP and SSTOP— signals on its Q and Q—outputs, respectively. The sampled DTE and STOP signals are generated therefore by flip flops FF41 and FF48, and associated circuitry, shown as DTE, SCT, SYNC130 in FIG. 2.

SCT clock generation circuit 41 is shown in FIGS. 3A and 3B. Clock generation circuit 41, which is identical to clock generation circuit 33, receives an input from oscillator buffer circuit 26, providing output clocks 1 and 2. Clocks 1 and 2 are provided as clocking inputs to dynamic flip flops FF20-FF27. These flip flops and PLA 42 are interconnected, with associated logic, to provide a pseudo random shift register for providing output signals 16 SCT and 16 SCT—, a frequency of approximately 16 times the expected input data frequency. The frequency is varied by input signal BELL/RV, and its inversion, being applied to PLA 42. Also, FAST input and its inversion may be applied to PLA 42. The Q and Q outputs of flip flops FF20-FF27 are connected to appropriate lines of PLA 42. Exclusive OR circuit 44 provides the exclusive OR function for the outputs of flip flops FF21 and FF22. Exclusive OR circuit 45 provides the exclusive OR function for the outputs of flip flops FF26 and FF27. The outputs of exclusive OR circuits 44 and 45 are inputs to exclusive OR circuit 43, whose output provides the D input to flip flop 20. The output of SCT clock generation circuit 40 is provided through appropriate logic circuits 46-54 as shown with signal 16 SCT being provided from NOR gate 54 and signal 16 SCT being provided from NOR gate 53.

Reference is now directed to FIG. 8 where SCT clock circuit 90 is shown in detail. Flip flops FF55-FF59 divide the input signal 16 SCT from the 16 SCT clock generation circuit 41 by 61, using four of the flip flops, or by 32, using all five of the flip flops. Signal 16 SCT clocks flip flop 55, whose Q output clocks flip flop 56 and so on through flip flop 58. Each of the Q— outputs of flip flops FF55 through FF58 provide inputs to NOR gate 132. Flip flop FF59 is clocked by signal SCTA and its Q input is provided by signal DBTA which is a 600 Hz clock. The Q— input of flip flop 59 has signal DBT— applied. AND gate 131 has signal HLFSPD and signal DBT— applied as inputs and provides the final output to NOR gate 132. NOR gate 132 provides an input to NOR gate 134 and through inverter 133 provides an input to NOR gate 135. Signal 16 SCT— provides the other input to each of NOR gates 134 and 135. NOR gate 134 provides output signal NHSCT and NOR gate 135 provides signal HSCT. The Q— output from flip flop FF58 provides an input to AND gate 137. Signal CSEL— is inverted through inverter 139 and provides the other inputs to AND gate 137. It also provides one input to AND gate 136 whose other input is provided by signal TCLK. AND gates 136 and 137 provide inputs to NOR gate 138 whose output is signal SCT.

FIGS. 3B and 3C detail the structure of FIFO 100. FIFO 100 is made up of three flip flops, FF50, FF51 and FF52, together with supporting logic circuitry. The sampled data input to FIFO 100 comes through NOR gate 120 as signal FIFOIN, inverted through inverter 119 and applied to the J input of flip flop FF52 and not inverted and applied to the K input of that flip flop. Signal FIFOIN also provides an input to each of exclusive OR circuits 105 and 108 and to AND gate 102. Flip flop FF52 is clocked by signal MDTE and its Q— output provides an input to exclusive OR gate 105. The other signals for this exclusive OR gate are signal B0 and its inversion. The output of exclusive OR gate 105 provides the J input to flip flop FF51 and, inverted through inverter 116, provides the K input. The Q— output of flip flop FF51 provides an input to exclusive OR gate 108 whose other inputs are provided by signal B1 and B1—. The output of exclusive OR gate 108 provides an input to the J terminal of flip flop FF50 and, through inverter 118, to the K input of that flip flop. Flip flop FF51 is clocked by the output of NOR gate 112 whose inputs are provided by AND gates 109, 110 and 111. Signals B1 and B0— provide the inputs to NOR gate 106 whose output provides one input to AND gate 111 and is inverted through inverter 107 to provide an input to AND gate 109. Signal MDTE is inverted through inverter 115 and provides an input to each of AND gates 110 and 111. The clocking of flip flop FF51 is directly dependent on the values of signals B1 and B0—.

Flip flop FF50 is clocked by circuit 113 which comprises a NOR gate having three AND gates input with signal MDTE— providing an input to two of those AND gates. Signal HSCT is inverted through inverter 114 and provides an input to two of the AND gates of circuit 113. Signal EMPTY provides an input to one of the AND gates and inverted through inverter 117 provides an input to another one of the AND gates of circuit 113 as shown. The output of inverter 117 also provides an input to AND gate 103. The other input to AND gate 103 is provided by the Q output of flip flop FF50. Signals B0 and B1 provide the inputs to NOR gate 101 and to the output which is the EMPTY signal and which applies an input to AND gate 102. AND gates 102 and 103 provide inputs to NOR gate 104 whose output is signal FIFOUT.

As indicated above, the transmitter buffer provides for various rates of transmission. If the incoming asynchronous data is too fast for the transmission capability of the buffer, stop bits may be removed. If the rate of asynchronous data in is too slow, stop bits may be added. This is accomplished through the interplay between FIFO100, up-down counter 80 and stop-bit insert-delete control 140.

First consider up-down counter 80 which is shown in FIGS. 3B and 3C. Up-down counter 80 comprises flip flops FF42, FF43, FF45 and FF46 and associated control circuitry. Each of the flip flops is preset by signal ETD- from the modem receiver circuit, to be described later. Flip flops FF42 and FF46 are clocked by the signal F UP. Flip flops FF43 and FF45 are clocked by the signal F DOWN. Exclusive OR circuit 86 provides the exclusive OR of signals B0 and B1. The output of exclusive OR circuit 86, and its inversion through inverter 91, provide inputs to exclusive OR circuits 83, 84, 87 and 88. The Q and Q— outputs of flip flops FF42, FF43, FF45 and FF46 provide the other inputs to each of the exclusive OR circuits 83, 84, 87, and 88, respectively. The outputs of exclusive OR circuits 83, 84, 87 and 88 provide the J input, and inverted, the K input to flip flops FF42; FF43, FF45 and FF46, respectively. Exclusive OR circuit 81 provides the exclusive OR function for the outputs of flip flops FF42 and FF43 to provide output signal B0 and, inverted through inverter 82, output signal B0—. Exclusive OR circuit 89 provides the exclusive OR of the outputs of flip flops FF45 and FF46 to provide output signal B1 and, through inverter 94, signal B1—.

FIG. 5 details stop-bit insert-delete control circuit 140. Sample stop signal SSTOP provides the J input to flip flop FF60 and the clock input to flip flop FF61. Signal SSTOP— provides the K input to flip flop FF60. The Q and Q— outputs of flip flop FF60 provide the J and K inputs of flip flop FF61, respectively. Signal HSCT provides the preset input for flip flop FF61. The Q output of flip flop FF61 provides one input to NOR gate 143 whose other input is provided by signal 1/8— from the receiver circuit. The Q output of flip flop FF61 provides the preset input for toggle flip flops FF63 and FF64, while the output of NOR gate 143 provides the preset input for toggle flip flop FF62. The Q— output of flip flop FF64 provides the clock input for flip flop FF63 whose Q— output, in turn, provides the clock input for flip flop FF62. The Q output of each of flip flops FF62-FF64 provide an input for NOR gate 144 whose output provides one input to NOR gate 145. The other input to NOR gate 145 is signal SSTOP— and whose output provides clocking for flip flop FF64.

OR gate 146 has the output of NOR gate 144 as one input and the J output from flip flop FF61 as its other input. The output of OR gate 146 provides one input to NAND gate 147 whose other input is provided by signal B1. The output of NAND gate 147 is signal DELETE— which is inverted through inverter 148 and provides one input to NOR gate 151 which is cross coupled with NOR gate 149. The output of NOR gate 151 provides one input to NOR gate 152 whose other input is provided by signal EMPTY, the output of NOR gate 152 being signal ADD— which is inverted and provides one input to exclusive OR circuit 153. The other inputs to exclusive OR circuit 153 are signals NHSCT, DELETE— and HSCT. The output of circuit 153 provides one input to OR gate 142 whose other input is signal SSTOP—. The output of OR gate 142, together with signal SDTE—, provide the inputs to NAND gate 141 whose output is signal MDTE, providing the clocking for toggle flip flop F60.

FIG. 9 illustrates the development of the F UP and F DOWN signals which control the operation of the UP DOWN counter 80. Signal MDTE is inverted through inverter 177 and provides one input to NOR gate 179. Signals B1 and B0— provide the inputs to AND gates 178. Signals S STOP and ADD— provide the inputs to AND gate 180. AND gates 178 and 180 provide the inputs to NOR gate 179 whose output is signal F UP.

Signal HSCT is inverted through inverter 181 and provides one input to NOR gate 182. Signal EMPTY provides another input to NOR gate 182. Signals S STOP and DELETE— inputs to AND gate 183 whose output provides another input to NOR gate 182. The output of NOR gate 182 is signal F DOWN.

FIFO 100, shown in detail in FIG. 3C, holds none, 1, 2, or 3 bits. Its contents are controlled by Up DOWN counter 80 and STOP-BIT-INSERT-DELETE control 140. Control circuit 140 receives the signal 1/8— from the receiver circuit, indicating that, when high, the circuit may provide an additional stop bit for every 8 characters. If the signal is low, then one stop may be provided for every four characters. When a stop bit is present, the extra stop bit may be added or a stop bit may be deleted, depending upon the contents of the FIFO 100. Control circuit 140 keeps track of when a stop bit was set, through its three toggle flop flops FF62-FF64. UP DOWN counter 80 is a gray code type counter which is controlled in its count by the state of signals F DOWN and F UP which in turn are controlled by the various signals shown in FIG. 9. If the incoming data signal rate is too high, then a stop bit will be inserted, at a point dependent upon the incoming rate. If the incoming data rate is too slow, stop bits will be removed. The UP DOWN counter 80 controls setting of FIFO stages and permits additions or deletions, depending upon the status of the FIFO.

FIG. 6 illustrates the application of external inputs OVSPD, S/A, PD, BELLRV. Also, 600 BPS input is applied through buffer circuit 171 which is identical to buffer circuits 26, (as are buffer circuits 172-175), providing a false output through inverter 164 to AND gate 166 and to NOR gate 163. The overspeed signal (OVSPD) is applied through buffer 172. Using the false output as an input to NOR gate 167 and through inverter 161 as an input to AND gate 162. The synchronous/asynchronous signal (S/A) is applied through buffer circuit 173, using the true output as an input to NOR gate 156 and through inverter 157 to NOR gate 158. Also, signal S/A provides an input to NOR gate 167. Signal PD is applied through buffer circuit 174, using its true output to provide one input to NOR gate 156 and the second input to NOR gate 160. The output from NOR gate 160 is signal PE. Externally applied signal BELL/RV is buffered through buffer circuit 175, using the true output to apply the final input to NOR gate 156 whose output is signal V22 and to NOR gate 159 whose output is signal VAD. Signal VAD also provides an input to AND gate 162 whose output provides an input to NOR gate 163. The output from NOR gate 158 provides another input to gate 163 and signal V22 provides the final input, the output being signal HLFSPD. The output from NOR gate 167 is signal FAST.

This logic simply provides the signals that are used to control various portions of the transmit buffer.

Referring now to FIG. 7A, an important selection circuit is shown with signal synchronous/asynchronous (S/A) being of prime importance. That is, when that signal is high, then a synchronous mode has been selected and all of the circuitry heretofore described is bypassed. As shown, signal S/A and signal XMTD provide inputs to AND gate 181 while signal S/A— and signal FIFOUT provide inputs to AND gate 180. AND gates 180 and 181 provide the inputs to NOR gate 182 whose output signals S DATA— either comes directly from XMTD when S/A is high or from FIFO 100 when S/A is low. Depending upon the input modem protocol selection, signal SDATA— will be scrambled or will be sent unscrambled through a 17 stage register made up of flip flops FF70-FF87. Signal PE, the output from NOR gate 160, is inverted through inverter 183 and is gated through NOR gate 184, providing an input to NOR gate 185 and to AND gate 186. Signal SDATA— provides the other input to NOR gate 185 and to AND gate 186 whose output provide the input to NOR gate 187. The output of inverter 183 provides an input to NOR gate 188 whose other input, on line 207, comes from the output of exclusive OR circuit 206. The output of NOR gates 187 and 188 provide the inputs to NOR gate 189 and to AND gate 190. Gates 189 and 190 provide the inputs to NOR gate 191. These series exclusive OR circuits then enable signal SDATA—, to be applied through inverter 193 to the J input of flip flop 70 and directly to the K input. The Q and Q— outputs of flip flop FF70 are connected to the J and K inputs, respectively, of flip flop FF71. The interconnection between the remaining flip flops FF72 through FF87 are exactly the same.

Exclusive OR circuit 206 provides the exclusive OR function of the outputs from flip flop FF84 and flip flop FF87. The output of exclusive OR circuit 206 is gated into the logic described above and the incoming data is scrambled in the pseudo random shift register formed by flip flops FF70-FF87, depending upon the state of signal PE, which is the pseudo random enable. If PE is high, the signal is scrambled by the contents of the 14th and 17th flip flop. If low, there is no scrambling. The reason for scrambling for some of the modem protocols is to prevent a long period of time without any signal transition that may disrupt the operation of phase lock loops used in the modem. In the unlikely event that such a long period of time without transitions occurs even using the scrambler technique, counter 208 is employed to compensate for such an eventuality. Counter 208 comprises flip flops FF88-FF95. Signals HLFSPD and its inversion are applied to exclusive OR circuit 194, together with signals DBT and SCTA to provide signal SCMCK at the output of exclusive OR circuit 194. Signal SCMCK provides the clock input to toggle flip flop FF88 whose Q output provides the clock input to toggle flip flop FF89 and so on through toggle flip flop FF94. The Q and Q— output of flip flop 94 provide the J and K inputs, respectively, for flip flop FF95. Flip flop FF95 is also clocked by signal SCMCK. The Q output of flip flop FF95 provides one input to NAND gate 192 whose other input is provided by the Q output of flip flop FF70 of the scrambler. The output of NAND gate 192 provides the preset input for toggle flip flops FF88–FF94. The Q— output of flip flop FF94 provides signal FIXT which is input to NOR gate 184 whose other input, as indicated earlier, is the pseudo random enable signal, inverted.

Counter 208 monitors data through the scrambler by looking at the Q output of flip flop FF70, the first of the flip flops in the chain. NAND gate 192 presets the flip flops FF88–FF94. If a continual string of marks (1's) from FF70 are present, the output of NAND gate 192 is a 0, permitting the counting up of flip flops FF88–FF94. When FF94 is set, then the signal FIXT causes an inversion of the next bit going into the scrambler. Also, the gate signal of flip flop FF95 changes to cause presetting of the counter. In this manner, when counter 208 fills with a series of 1's from the scrambler, the next bit to the scrambler is forced to be a space to conform with certain of the protocols for preventing a remote data loop back.

FIG. 7B illustrates the phase and code logic which involves circuitry for determining the particular phase for a given modem protocol. That is, two bits of data (dibit) select four different phases. This selection for the various protocols is set out below in Table 1.

TABLE 1

| Bell | | V22 | |
|---|---|---|---|
| Originate (1200 Hz) | | Originate (1200 Hz) | |
| Answer (2400 Hz) | | Answer (2400 Hz) | |
| Dibit | Phase (degrees) | Dibit | Phase (degrees) |
| 00 | +90 | 00 | +270 |
| 01 | 0 | 01 | +180 |
| 11 | +270 | 11 | +90 |
| 10 | +180 | 10 | 0 |
| RV | | | |
| Originate (2250 Hz) | | Answer (1150 Hz) | |
| Dibit | Phase (degrees) | Dibit | Phase (degrees) |
| 00 | +270 | 00 | +90 |
| 01 | +90 | 01 | +270 |
| 11 | +180 | 11 | +180 |
| 10 | 0 | 10 | 0 |

The current phase is added to the previous phase to cause a phase shift, or not. PLA198 receives inputs from logic circuits which in turn are input by the particular modem protocol employed. An answer/originate signal A/O is applied to AND gate 203 whose other input is BELL/RV—. Signal V22 is applied to one input or NOR gate 202 whose other input is supplied by the output of AND gate 203. Signal VAD is supplied directly to PLA198 and is inverted through inverter 199 and applied to PLA198. The output from NOR gate 202 is applied directly, and inverted through inverter 201 as well.

Circuit 196 is made up of a pair of AND gates input to a NOR gate. Signal HLFSPD— is applied to one of the AND gates and signal HLFSPD is applied to the other AND gate. The Q output of flip flop FF71 is applied to the other input of the one AND gate and the Q output from flip flop FF70 is applied to the other input of the other AND gate. The output of the NOR gate of circuit 196 is signal D1— which is applied directly to the PLA198 and, inverted as signal D1, is also applied to the PLA198. The Q output of flip flop FF70 is signal D2 and the Q— output is signal D2—, each of which is applied to PLA198. The output signal of PLA198 is AB1, dependent upon the various selections. Signal VAD selects devices in PLA198 and provides one input to a selection circuit, specifically to NOR gate 211 and to AND gate 213. Signal D1 provides another input to NOR gate 211 and one input to AND gate 212. Signal D2— provides the third input to NOR gate 211 and the other input to AND gate 212. The output from NOR gate 211 and AND gates 212 and 213 provide three inputs to NOR gate 214, whose output signal AB2 provides an input to two bit adder 221. The sum is represented by bits DIN1 and DIN2, and their inversions from Q and Q— outputs of flip flops FF91 and FF92, respectively.

In summary, the transmit buffer provides digital circuitry implemented in MOS for receiving asynchronous data and transmitting it in synchronous fashion. If the data received is synchronous, then the circuitry is bypassed. The user may select the particular mode of protocol desired. When selected, the dibit combinations are set, the data is scrambled or not, and the appropriate carrier frequencies are selected.

Transmitter

FIG. 10 illustrates pseudo random shift register 230 which is provided with clocks 1 and 2, 180° out of phase with each other, from clock generator circuit 232, which is identical to the clock generator circuit 33 of FIG. 3A, having an input from clock buffer 26. Flip flops FF101 through FF108, together with the PLA 231 and associated logic circuitry, form the pseudo random shift register 230. Inputs to PLA 231 are signals VAD and its inversion, and A/O and its inversion. Flip flops FF107 and FF108 have their outputs exclusively ORed through circuit 235. Flip flops FF102 and FF103 have their outputs exclusively ORed through exclusive OR circuit 234. Exclusive OR circuits 234 and 235 have their outputs exclusively ORed through circuit 233 which provides the J input to flip flop FF101. Clocks 1 and 2 clock the flip flops FF101–FF108. Output signals phi 1 and phi 1— are developed through selection circuit 236 and output signals phi 2 and phi 2— are developed through selection circuit 237. NOR gate 238 has inputs from the PLA 231 and its output, inverted, provides the preset inputs to the flip flops FF101–FF108. Signals phi 1 and phi 2, and their inversions, provide the clock signals for the switched capacitor circuits which are used in the transmitter and receiver circuits. They occur at a rate of 16 times the desired carrier frequency.

FIG. 11 illustrates a circuit for developing sine and cosine gating signals for the In phase and Quadrature phase analog channels to be described. Signals phi 1 and phi 2 are input to NOR gates 242 and 243, respectively, which are cross-coupled, the output of NOR gate 243 providing an input to AND gate 245. Select signals VAD and A/O are applied to exclusive OR circuit 241 whose output, inverted, provides the other input to AND gate 245 and which directly provides an input to AND gate 244. The outputs of AND gates 244 and 245 provide the inputs to NOR gate 247 whose output provides the J input to flip flop FF111 and, inverted, the K input of that flip flop. The Q output of flip flop FF111 provides the other input to AND gate 244 and clocks toggle flip flop FF112. The output of NOR gate 241 provides one input to OR gate 248 whose other input is provided by the signal phi 2—. The output of OR gate 248 provides one input to NAND gate 249 whose other input is provided by the signal phi 1—. Flip flop FF111 is clocked by the output of NAND gate 249. This clocking provides synchronization for flip flop FF111. The Q output of flip flop FF112 clocks toggle flip flop FF113 whose Q output clocks toggle flip flop FF114. The Q— output of flip flop FF112 clocks flip flop 116. The Q output from flip flop FF113 provides the J input to flip flop FF116 and the Q— output of flip flop 113 provides the K input to flip flop FF116 and clocks flip flop FF115. The Q output of flip flop FF114 provides the J input to flip flop FF115, and provides one input to circuit 251 and one input to circuit 252. Circuits 251, 252, 253 and 254 are identical to each other and are made up of a pair of two input AND gates whose outputs provide the inputs to a NOR gate. The Q— output of flip flop FF114 provides an input to circuits 251 and 252. The Q output of flip flop FF115 provides one input to circuit 253 and one input to circuit 254. The Q— output provides one input to each of circuits 253 and 254. Signals phi 1— and phi 2— each provide an input to circuits 251, 252, 253 and 254. The output of circuit 251 is cosine signal phi 2I. The output of circuit 252 is cosine signal phi 1I. The output of circuit 253 is sine signal phi 1Q and the output of circuit 254 is sine signal phi 2Q.

FIG. 12 illustrates a digital circuit for developing signals determinative of whether signals input to analog circuits should be inverted or not. Exclusive OR— type circuits 256-259 provide output signals phi 1LI, phi 2LI, phi 1LQ and phi 2LQ, respectively. Circuit 256 receives signals phi 1— and DIN1, and phi 2— and DIN1—.

Circuit 257 receives input signals phi 1— and DIN—, and phi 2— and DIN1.

Circuit 258 receives signals phi 1— and DIN2, and phi 2— and DIN2—.

Circuit 259 receives phi 1— and DIN2—, and phi 2— and DIN2.

If phi 1LI equals phi 1, and if phi 2L1 equals phi 2, then signal VXMT will be inverted. If phi IL1 equals phi 2, and phi 2L1 equals phi 1, then signal VXMT will not be inverted.

FIG. 13 illustrates the development of signals BBS and BBS— which are used in this transmitter circuit for putting a top notch in the square waves to cause square waves to look a little more like sine waves.

Signal DBT is applied to the K input of flip flop FF118, and inverted, applied to the J input of that flip flop. The clock is provided by signal SCTA, inverted, and the Q— output is applied to the input of inverter 262 whose output is signal BBS. The Q output of flip flop FF118 is inverted through inverter 261 to provide the signal BBS—.

Before proceeding with the discussion of the analog circuitry, FIGS. 14 and 15 should be referenced. Taken together with FIG. 11, the various digital signals developed are evident. Signals phi 1 and phi 2, applied in the circuitry of FIG. 11 are shown in FIG. 14 as non-overlapping clock signals. When transmitting at the high band frequency, signal A, the J input to flip flop FF111, is shown as the clock frequency divided by two. The clocking signal B to the flip flop F111 is shown as occurring at each of signals phi 1 and phi 2. The output of flip flop FF111, signal C, is shown at the same frequency as signal A, but displaced therefrom. In this portion of FIG. 14, the resultant waveforms come from the output of NOR gate 243. Following, the signals are developed with the NOR gate 243 output disabled to provide a low band frequency.

In the "transmitting low band" section of FIG. 14, signal B is shown to be the same as signal phi 2 and signal C is at one half the frequency of signal C when it is transmitting high band.

FIG. 15 continues following the signals through FIG. 11 with signal C, for the purpose of better illustration, being shown at evidently double its frequency of FIG. 14. In reality, it is being shown in expanded time scale. Signal D, the Q output of flip flop FF112 is shown at half the frequency of signal C; signal E, the Q output of flip flop FF113 is shown at half the frequency of signal D; signal F, the Q output of flip flop FF114 is shown at half the frequency of signal E; signal G, the Q output from flip flop FF115 is shown at the same frequency as signal F, but shifted with respect thereto; signal H, the Q output of flip flop FF116 is at the same frequency as signal E but shifted therefrom. The Q output of flip flop FF116, inverted, is signal CGT and the Q— output, inverted, is signal SGT. Signal CGT is used to form a top notch in the cosine signal and signal SGT is used to form a top notch in the sine signal. These will be described below.

As indicated above, four binary values (dibits) may be representative of four phases, those phases being dependent upon the modem protocol selected. Since four digital bits are represented by a single phase shift, the baud rate is one half of the bit rate. Typically, the baud rate is in the neighborhood of 600 while the bit rate is in the neighborhood of 1200 bps. Each pair of bits is used to select one of four possible phase shifts according to whether in answer or originate mode, or the particular modem protocol selected. Out of these selections comes four possible carrier signals, 1150 and 2250, and 1200 and 2400.

Turning now to FIGS. 16A and 16B, the transmit analog circuit 13 is shown. Reference voltage Vxmt is a voltage at which the switched capacitor circuits operate. This voltage is somewhat elevated from that used in the conventional MOS circuits heretofore described. In this preferred embodiment, Vxmt is plus 5½ volts and the MOS operating voltage is plus 5 volts. The initial circuitry to which reference voltage Vxmt, signal BBS and signal BBS— are applied, together with the various phase signals, provide level shifting, shaping and a first order filtering function. In referencing the field effect transistor components, the electrodes will means, interchangeably, the source and drain, with the third connection being the gate.

Voltage level Vxmt is applied to one electrode of transistor T2 which is gated by the signal phi 1LQ. The other electrode of transistor T2 is connected to one electrode of transistor T8 and to one terminal of each of capacitors C3 and C4. The other electrode of transistor T8 is grounded and it is gated by the signal phi 2LQ. The other terminal of capacitor C4 is connected to one electrode of transistor T4 whose other electrode is grounded and whose gate has applied to it signal BBS—. The other terminal of capacitor C4 is also connected to one electrode of transistor T6 which is gated by signal BBS and whose other electrode is connected to one terminal of capacitor C8 and to one electrode of each of transitors T12 and T10. The other terminal of transistor T10 is grounded and it is gated by signal phi 2. The other terminal of transistor T12 is connected to the negative input to operational amplifier 266 and to one terminal of capacitor C7. The positive terminal of operational amplifier 266 is grounded. Its output is connected, through capacitor C7, to its negative input. The output of operational amplifier 266 is connected to one electrode of transistor T14 which is gated by signal phi 1 and whose other electrode is connected to one electrode of transistor T16 whose other electrode is grounded and which is gated by signal phi 2.

The section just described in detail provides for shifting the voltage reference level to Vxmt and, for mixing, through the introduction of signals phi 1, phi 2, phi 2LQ and phi 1 LQ. Shaping is accomplished through the introduction of signals BBS and BBS— for notching the square wave input to cause that square wave to more closely resemble a sine wave. Filtering is accomplished through operational amplifier 266 and associated components, in a conventional manner, to produce the signal Qfout. This is the quadrature phase signal. The in phase signal development is shown above in a circuit that is identical to that descirbed, except that signals phi 1 LI and phi 2 LI are applied in place of phi 1LQ and phi 2LQ. The output signal is Ifout.

Referring again to signal Qfout, it is applied to two biquadratic filter sections, in series made up of operational amplifiers 267 and 268, and 269 and 272, respectively, and their associated circuits, as shown. The in phase section filter 270 is identical in structure to quadrature phase filter 271. The use of the in phase and quadrature phase technique is known in the prior art and is a comparatively straightforward method for providing resultant output signals Iout, mixed with the cosine of the carrier and Q out, mixed with the sine of the carrier.

Signal Iout is connected to one electrode of transistor T48 which is gated by signal phi 2I, with the other electrode connected to one terminal of capacitor C27 and one terminal of capacitor C28, as well as to one electrode of transistor T49. Transistor T49 is gated by signal phi 1I and its other electrode is grounded. The other terminal of capacitor C28 is connected to one electrode of each of transistors T46 and T47. Transistor T46 is gated by signal SGT and its other electrode is grounded. Transistor T47 is gated by signal CGT and its other electrode is connected to the other terminal of capacitor C27 where it is also connected to one terminal of capacitor C37 and to one terminal of transistor T51 which is gated by signal phi 2 and whose other electrode provides the negative input to operational amplifier 273.

Signal Qout is connected to one electrode of transistor T41 which is gated by signal phi 2Q and whose other electrode is connected to one terminal of capacitor C29 and to one terminal of capacitor C31. It is also connected to one electrode of transistor T42 which is gated by signal phi 1Q and whose other electrode is connected to ground. The other terminal of capacitor C29 is connected to one electrode of transistor T45 which is gated by signal CGT and whose other electrode is grounded. The one terminal of capacitor C29 is also connected to one electrode of transistor T44 which is gated by signal SGT and whose other electrode is connected to one electrode of transistor T43 which is gated by signal phi 1 and whose other electrode is grounded. Transistor T42 has one electrode grounded, is gated by signal phi 1Q and has its other electrode connected to the other electrode of transistor T41.

Signal PSKOUT is developed as an output of operational amplifier 272 and its associated circuitry. That is, capacitors C32–C36 are connected together at one end to one electrode of transistor T47 which is gated by signal phi 2 and whose other electrode is connected to the other terminal of capacitor C37 and to one electrode of transistor T48. The other electrode of transistor T48 is grounded and it is gated by signal phi 1. The other terminals of capacitors C32–C36 are connected to switches SW1–SW4, respectively. The other terminals of switches SW1–SW4 are connected to the negative terminal of operational amplifier 273. They are also connected to one terminal of capacitor C36 whose other terminal is connected to the output of operational amplifier 273. Switches SW1–SW4 are selectively activated by signals VLT, VHT, BLT and BHT, respectively. Signal VLT is the NOR function of signals VAD— and A/O—; signal VHT is the NOR function of signals VAD—and A/O; signal BLT is the NOR function of signals VAD and A/O; signal BHT is the NOR function of signals VAD and A/O—. By appropriate selections, the proper amount of capacitance is switched in and out of the circuit to adjust for the modem protocol selected and to thereby provide an appropriate PSKOUT signal. It should also be noted that the shape of PSKOUT is dependent upon signals VGT being applied to the cosine and signal SGT being applied to the sine of the carrier.

Simply switching capacitors in and out of a multiple mode circuit, such as that represented by operational amplifier 273 and its associated capacitors and switches to obtain desired filter characteristics may cause parasitic capacitance problems. Referring to FIG. 17, a circuit is illustrated which eliminates the parasitic capacitance problem. FIG. 17 illustrates an operational amplifier providing signal Vout with its positive terminal grounded and capacitor C placed across its output and its negative input. Its negative input is in series with transistor T51 which is gated by signal phi 2 and whose opposite electrode is connected to one terminal of capacitor K1C, one electrode of transistor T52 and one electrode of each of transistors T59, T60 and T61. The signal Vin is applied to one electrode of transistor T55 which is gated by signal phi 1 and whose other electrode is connected to one electrode of transistor T54, to the other terminal of capacitor K1C and to one terminal of each of capacitors K2C, K3C and K4C. The other terminals of capacitors K2C, K3C and K4C are connected to the other electrode of transistors T61, T60 and T59, respectively. Transistors T59, T60 and T61 are gated by signals M4, M3 and M2, respectively. Connected to a voltage reference between each of capacitors K4C and transitor T59, K3C and transistor T60, capacitor K2C and transistor T61 are transistors T56, T57 and T58. They are gated by signals M4—, M3— and M2—, respectively. Note the similarity of the circuit of FIG. 17 with that of FIG. 16A at the output. It is evident that, for example, switch SW1 is equivalent to the combination of transistors T56 and T59 with signals M4— and M4 being applied, respectively, as gate signals. Without transistors T56–T58, the problem occurs when one or more of the capacitors are switched out of the circuit. A switching transistor used may have a very high off resistance, but still have a small capacitance between its terminals. This capacitance is in series with the capacitor that is switched out. The combination of these two capacitors is seen in parallel with the other capacitors that are switched into the circuit. This results in an effective capacitance that is larger than desired. Resulting filter response will be skewed from the desired response. This problem is magnified by the number of capacitors that are switched out of the circuit. When a capacitor is switched out of the circuit as shown in FIG. 17, then the appropriate transistors T56-T58 are gated and the switched out capacitors are connected to the reference voltage. Now the switched out capacitors appear as stray capacitance between the reference voltage and the stray insensitive nodes of the stray insensitive switched capacitor filter. Therefore, the switched out capacitors no longer skew the filter response.

This switching arrangement is used throughout the switched capacitor circuitry of this invention.

Signal PSKout may now be sent directly to the transmission line. However, it has been determined that both magnitude and phase are distored by transmission through a telephone line which is commonly used as the transmission line. To compensate for this distortion, further filtering is performed. In this preferred embodiment, the signal PSKout is applied to a biquadratic filter made up of operational amplifiers 274 and 275 and associated circuitry as shown in FIG. 18. All of the switches SW6-SW23 are of the type described with reference to FIG. 17. Input capacitors C38 and C39 are switched into the circuit by signal ALOT which is the NOR combination of an analog loop back signal and a test signal. These capacitors provide for switching in the proper amount of gain for testing purposes. The capacitor between the output of the filter and switches SW6 and SW7 that receive the ALOT signal is selected from capacitors C59-C62 by selection of switches SW8-SW11, activated by signals VLT, VHT, BLT, and BHT, respectively. In a similar manner, capacitors C47-C50 are selected by switches SW16-SW19, respectively, activated by signals VLT-BHT, as above, and are placed in the circuit between the input and output of operational amplifier 274. Still another bank of parallel capacitors C43-C46, switched by switches SW12-SW15, respectively, are connected between the output of operational amplifier 274 and the input of operational amplifier 275. Further, another bank of capacitors C51-C54, switched by switches SW20-SW23 is across the output of operational amplifier 275 and its negative input. Capacitors C55-C58 are connected in series with capacitors C47-C50, respectively, to the output of operational amplifier 275 whose output signal is VO2T.

This filter described above is for magnitude equalization of the telephone line signal magnitude deterioration. At this point, signal VO2T could be transmitted directly down a telephone line. However, it has been found that the phase is distorted as well as the magnitude and in this preferred embodiment, signal VO2T is input to another biquadratic filter having banks of capacitors and switches as described above, for compensation of phase distortion.

FIG. 19 illustrates this particular arrangement with signal VO2T providing an input to a quadratic filter made up of operational amplifiers 276 at the input and 277 at the output, and associated circuitry as shown. Signal VO2T is the input signal from the output of the magnitude equalization filter of FIG. 18. Capacitors C67-C69 are selectively switched into the circuit through switches SW25-SW27 through selection signals VHT, BHT and LBANDT. Signal LBANDT is the negation of the NOR function of signals BLT and VLT—. One terminal of each of capacitors C64, C65 and C66 is connected in series with capacitors C67, C68 and C69, respectively. The other terminals of capacitors C64-C66 are connected together to one electrode of each transistors T78 and T79. Transistor T79, gated by signal phi 2 has its other electrode grounded. Transistor T78 is gated by signal phi 1 and is connected to one terminal of each of capacitors C82-C89 and to the output of operational amplifier 277. The other terminal of capacitor C82 is connected to switch SW36 which is activated by signal L band T—. The other terminal of switch 36 is connected to one terminal of each of switches 28-31 which are activated by signals VLT, VHT, BLT, and BHT, respectively. Capacitors C71-C74 are selected by switches SW28-SW31, respectively. Capacitor C75 is connected in parallel with the combination of switches and capacitors, from the output of operational amplifier 276 to the negative input. The positive input is grounded. The other terminal of capacitor C83 is connected between switch SW28 and capacitor C71. The other terminal of capacitor C84 is connected between switch 30 and capacitor C73. Another bank of parallel capacitors, C77-C81 is positioned between the output of operational amplifier 276 and the input of operational amplifier 277. Switches SW32-SW35, activated by signals VLT, VHT, BLT, and BHT, respectively, are connected to switch capacitors C77-C80, respectively. Still another bank of parallel capacitors C85-C89 are located across the output of operational amplifier 277 and the negative input. The positive input is grounded. Capacitors C85-C89 are selected by switches SW37-SW40 with signals VLT, VHT, BLT and BHT being the respective activating signals. Capacitors C90-C93 are connected in parallel, with one terminal of each being tied together back to the circuit input, the other terminals being connected between switches SW37-SW40 and capacitors C85-C88, respectively. The output signal TXALB is now ready for transmission down the telephone line, having been adjusted for both magnitude and phase distortion.

The waveforms shown in FIG. 20 generally describe the transformation from digital to analog signals. Signal DIN1 is shown as a series of digital bits. The bit pattern shown is 1, 0, 1, 1, 0, 0. The shaper input illustrates the desired waveform mentioned above where the top of the digital waveform is notched. Note that in the series of two 1's and two 0's, that there is a notch between the two 1's and between the two 0's rather than an uninterrupted level. Signal PSK out is the filtered, analog equivalent of digital signal DIN1 before being compensated for amplitude and phase deterioration.

Receiver

Signal RCVA is received at the other end of the transmission line and represents signal TXPA after transmission and attendant distortion. Signal RCVA is received in the receive filters Section 18 shown in FIG. 1. Certain control signals are utilized in the receive filters. For an understanding of the origin of those signals, please refer first to FIG. 21. Pseudo random shift register 290 is shown being made up of PLA 300, flip flops FF121-FF127 and associated logic. A 4 MHz clock is applied to clock generator circuit 293 which is identical to clock generator circuit 33 described earlier. Clocks 1 and 2 from clock generator circuit 293 are used to clock dynamic flip flops FF121-FF127. The Q output of the flip flop FF121 provides the D input to flip flop FF122 and so on. All of the Q and Q— outputs of the flip flops provide inputs to PLA 300. The preset terminal of flip flop FF121 is grounded and signal R20 applies the preset input to the remaining flip flops FF122-FF127. Clock signal CK1 from clock generator circuit 293, in addition to providing the input clock to the flip flops also provides an output signal FRCK1. The Q outputs of flip flops FF126 and FF127 provide the two inputs to AND gate 285 and the Q— outputs from those flip flops provide the two inputs to AND gate 286. AND gates 285 and 286 provide the inputs to NOR gate 287 whose output provides one input to NOR gate 289. Signals VAD—, L band— and ALT provide the inputs to NOR gate 288 whose output provides one input to AND gate 291. Signal R20 provides the other input to NOR gate 289 and the other input to AND gate 291. The output of NOR gate 289 and the output of AND gate 291 provide the inputs to NOR gate 292 whose output provides the D input to flip flop FF121.

The selected lines of PLA 300 provide signals S11-S13, R11-R13, S21-S23, R21-R24.

FIG. 22 illustrates a simple circuit wherein signals R21-R24 provide the inputs to NOR gate 302 whose output is inverted by inverter 303, providing output signal R20. R20 then is a 1 whenever any of signals R21-R24 is one. Signal R20, as indicated above, provides the preset to six of the flip flops and gating to two gates.

Figure 21:
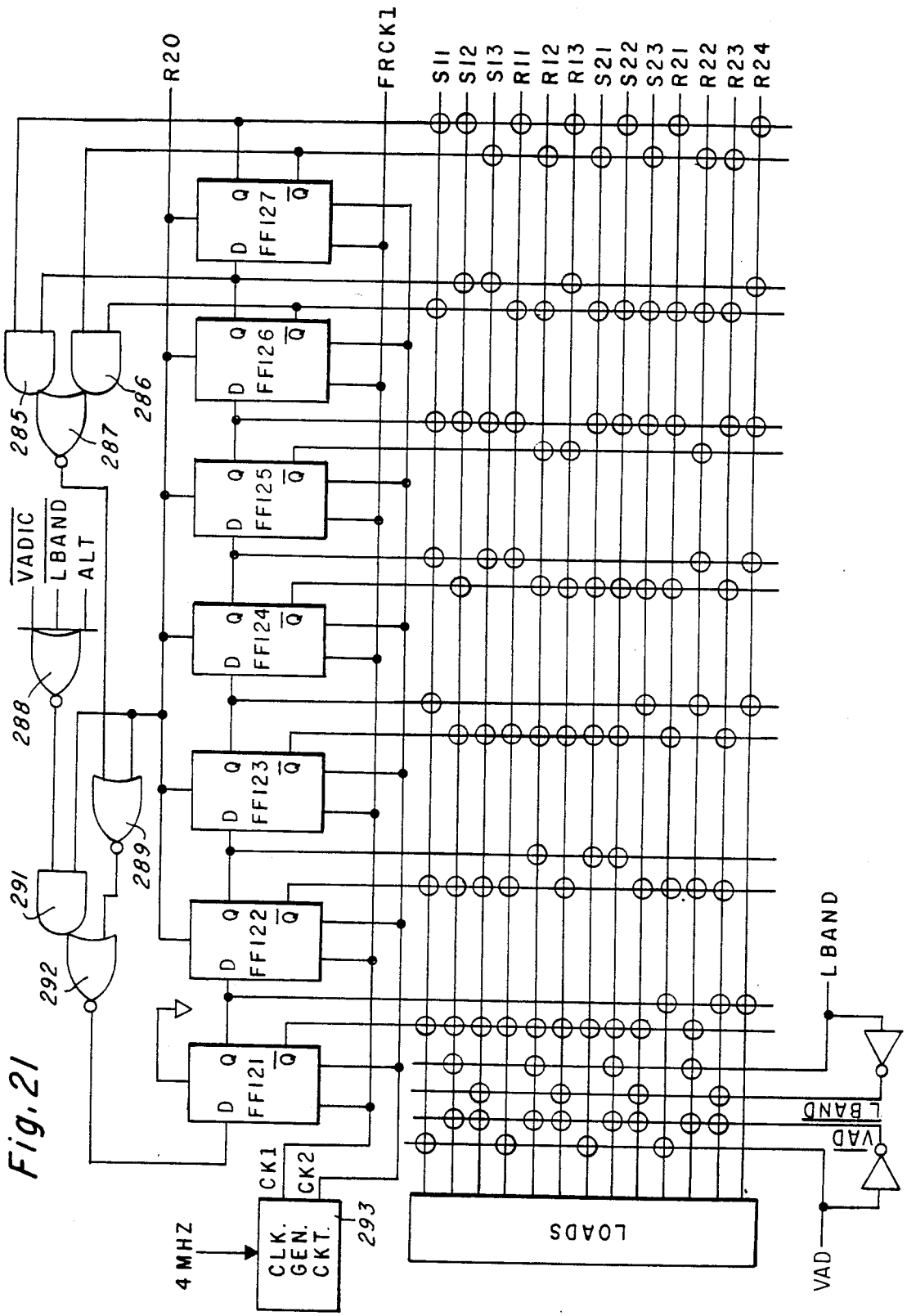

FIG. 23 illustrates the development of signal theta 7. Signals S11-S13 and S21-S23 provide the inputs to OR gate 294. Signals R11-R13 and R20 provide the inputs to OR gate 295. The outputs of OR gates 294 and 295, together with signal FRCK1 from FIG. 21 provide the two inputs to each of AND gates 296 and 297, respectively. These two AND gates provide inputs to cross coupled NOR gates 298 and 299 whose output is inverted through inverter 301, providing output signal theta 7.

FIG. 24 illustrates the development of signals ALT and phi 3 and phi 4. Signal theta 7 clocks toggle flip flop FF129 whose Q output clocks toggle flip flop FF128. The Q output of flip flop FF 128 is signal ALT. The Q—outputs of flip flops FF128 and FF129 provide the inputs to NOR gate 306 whose output is applied to NOR gate 309, and through inverter 307, to NOR gate 308. NOR gates 308 and 309 are cross coupled with the output of NOR gate 308 providing a gate signal for transistor T91. The output from NOR gate 309 provides the gate signal for transistor T92. The one electrode of transistor T91 is connected to voltage VDD and the other electrode of T91 is connected to one electrode of T92, the other electrode of T92 being connected to ground. A connection between the electrodes of transistors T91 and T92 provides signal phi 3.

The circuitry developing signal phi 4 is identical to that for developing phi 3 except that the input signals are signal ALT and Q— from flip flop FF129.

FIG. 25 illustrates the development of signals phi 7 and phi 8. Signal theta 7 is inverted through inverter 311 and provides one input to NOR gate 314. The output of inverter 311 is inverted through inverter 312, providing one input to NOR gate 313. NOR gates 313 and 314 are cross coupled, with NOR gates 314 providing output signal phi 7 and NOR gate 313 providing output signal phi 8.

FIG. 26 illustrates the input to the receiver section of the modem. Input signal RCVA is impressed on continuous anti-alias filter 18A. Filter 18A is made up of series resistor R1 which is in series with the parallel combination of resistor R2 and capacitor C101. The other end of resistor R2 provides the positive input to operational amplifier 281. The other terminal of capacitor is connected to the negative input to comparator 281. The positive input of comparator 28 is tied to AC ground, through capacitor C102. The output of comparator 281 is tied back to its negative input and provides the output signal CAAF.

Signal CAAF provides the input to samples anti-alias filter 18B.

Signal CAAF is applied to one electrode of transistor T81 which is gated by signal phi 7 and whose other electrode is connected to one terminal of capacitor C103 and to one electrode of transistor T82. Transistor T82 is gated by signal phi 8 and its other electrode is grounded. The other terminal of capacitor C103 is connected to one electrode of transistor T83 and one electrode of transistor T80. Transistor T80 is gated by signal phi 8 and its other electrode is grounded. Transistor T83 is gated by signal phi 7 and its other electrode is connected to one negative input of operational amplifier 282. The positive input of operational amplifier 282 is grounded and its output is connected through capacitor C104 to its negative input. Its output is also connected to one electrode of transistor T84 which is gated by signal phi 7 and whose other electrode is connected to one terminal of capacitor C105 and to one electrode of transistor T85. Transistor T85 is gated by signal phi 8 and its other electrode is connected to ground. The other terminal of capacitor C105 is conected to one electrode of transistor T86 and one electrode of transistor T87. Transistor T86 is gated by signal phi 7 and its other electrode is grounded. Transistor T87 is gated by signal phi 8 and its other electrode is connected to the negative terminal of operational amplifier 283 and also is connected, through capacitor C109 to the input of sampled anti-aliasing filter 18B. The positive input of operational amplifier 283 is grounded and its output provides signal RCVIN. Its output is also connected through capacitor C108 to its negative input and through capacitor C107 to the negative input of operational amplifier 282. The output of operational amplifier 283 is also connected to one electrode of transistor T89 which is gated by signal phi 7 and the other electrode is connected to one electrode of transistor T88 and through capacitor C106 to the one electrode of transistor T80. Transistor T88 is gated by signal phi 8 and its other electrode is grounded.

In summary, the development of signal RCVIN comes about by filtering through a continuous and a sampled low band pass filter combination. These filters act as anti-aliasing filters to prevent high frequency signals from entering.

Signal RCVIN provides an input to PSQ receive filter 18C. Also, signals LBANDR and LBANDR— provide input signals. Also input are signals BLR, BHR, VLR and VHR, as shown, as are the output signals from NOR gates 316-319. Signals VAD and EFA/0 provide the inputs to NOR gate 316. Signals VAD and EFA/0— provide the inputs to NOR gate 317. Signals VAD— and EFA/0— provide the inputs to NOR gate 318. Signals VAD— and EFA/0 provide the inputs to NOR gate 319. Control signals SM0-5 and LG1-5 also provide inputs to PSK receive filter 18C.

Referring now to FIG. 27A and FIG. 27B, the development of signals SM0-5 and LG1-5 is shown. Signals SM0 and 6/1 are input to OR gate 321 whose output provides one input to NOR gate 322. Signal LOW6 provides the other input to AND gate 322, whose output provides one input to AND gate 325. The other input to NOR gate 325 is signal DOWN1—, from the automatic gain control circuit. The output from NOR gate 325 is signal M DOWN1. An identical circuit made up of OR gate 324, AND gate 326 and NOR gate 327 having signals SM5, 6/1 for OR gate 324, signal LG5 and the output of OR gate 324 as input for AND gate 326 and finally signal UP1 and the output of AND gate 326 for NOR Gate 327 to develop signal M UP 1. Circuits 328-333 are identical, each being made up of two 2-input AND gates, the outputs of which provide the inputs to a NOR gate. Signal M UP 1 provides one input to each of circuits 328-333. Signal M DOWN 1 provides one input to each of circuits 328-333. The output of circuit 328 provides the K input to flip flop FF131 and, inverted, the J input to that flip flop. The Q output of flip-flop FF131 provides another input to circuit 329. The Q— output provides another input to circuit 330. The output of circuit 329 provides the K input to flip flop FF132. NOR gate 336 provides the J input to flip flop FF132. One input to NOR gate 336 is provided by the output from circuit 329. The other input to NOR gate 336 is provided by NOR gate 334 which has three inputs. One input is provided by the Q— output of flip flop FF131, another input is provided by the Q output of flip flop FF132, the third input is provided by the Q— output from flip flop FF133. The Q output of flip flop FF132 provides another input to circuit 328. It also provides another input to circuit 330. Circuit 330 provides the K input to flip flop FF133 and, inverted, provides the J input to that flip flop. The Q output of flip flop FF133 provides the another input to circuit 329. The Q output of flip flop FF133 provides another input to circuit 328. Signal STEP and signal 6/1 provide inputs to NOR gate 337, the output of which clocks flip flops FF131-FF133. Signal 6/1 provides the preset for those three flip flops.

Signals DOWN and SM0 provide inputs to AND gate 361. Signals SM5 and UP provide the inputs to AND gate 362. Signal 6/1 provides an input to OR gate 363 whose other two inputs are provided by the outputs of AND gates 361 and 362. The output of NOR gate 363 is NORed with the STEP signal, NOR gate 338 providing the clock signals for flip flops FF134-FF136.

The output of circuit 331 is connected to the J input of flip flop FF134 and, through an inverter, to the K input. The Q output of flip-flop FF134 is connected to the input of circuit 333 and the 2- output is connected to the first AND gate of circuit 332.

The output from circuits 332 is connected to the J input of flip flop FF135. It also provides one input to NOR gate 341, whose other input is provided by NOR gate 339. The inputs to NOR gate 339 are provided by the Q output from flip flop FF134, the Q— output from flip flop FF135, and the Q output from flip flop FF136. The Q— output of flip flop FF135 is also connected to the input of circuit 331 and to the input of circuit 333. The output of circuit 333 is connected to the J input of flip flop FF136 and, inverted, to its K input. The Q output of flip flop FF136 is connected to the input of circuit 331 and the Q— output is connected to the input of circuit 332.

Flip flops FF131-FF133 and associated logic described form part of a counter for counting either up or down in 1DB increments, depending upon the output of the automatic gain control circuit to be described later. The output of this counter is realized through NOR gates 342-347 which produce output signals SM0-SM5. The inputs to NOR gate 342 are the Q— outputs of flip flops FF131, FF132 and FF133. The inputs to NOR gate 343 are the Q output of flip flop FF131 and the Q— outputs of flip flops FF132 and FF133. The inputs to nor gate 344 are the Q outputs of flip flops FF131 and FF132 and the Q— output of flip flop 133. The inputs to NOR gate 345 are the Q outputs of each of flip flops FF131-FF133. The inputs to NOR gate 346 are the Q output from flip flop FF131 and the Q outputs from each of flip flops FF132 and FF133. The inputs to NOR gate 347 are the Q— outputs from flip flops FF131 and FF132 and the Q output from flip flop FF133.

Flip flops FF134-FF136 and the associated logic circuitry form part of a second counter which counts in 6DB increments, either up or down, depending upon the inputs from the automatic gain control circuit.

The output of the 6DB counter is represented by signals LG1-LG5 and LOW6. Signals LG1 and LG2 come from NAND gates 352 and 353, respectively; signal LG3 comes from inverter 354; signals LG4 and LG5 come from NOR gates 355 and 356, respectively; signal LOW6 comes from NOR gate 357.

In addition, the STEP signal mentioned above is generated from NAND gate 376 whose inputs are signals Phi UP from the AGC and the output of OR gate 375. Inputs to OR gate 375 are signals UP and DOWN from AGC circuit 19, and the output from NOR gate 373, inverted. The inputs to NOR gate 373 are the output from NOR gates 339 and 348. The inputs to NOR gate 348 are the Q— outputs of flip flops FF134 and FF136 and the Q output of flip flop FF135.

NAND gate 352 has inputs Q— from each of flip flops FF-134 and 136. NAND gate 353 has inputs from the Q outputs from flip flops FF135 and 136. Inverter 354 inverts the output from Q— of flip flop FF136. NOR gate 355 has inputs from the Q output of flip flop FF134 and the Q outputs of flip flop 136. NOR gate 356 has inputs from the Q output of the flip flop FF135 and the Q— output of flip flop FF136. NOR gate 357, which provides output signal LOW6, has inputs from the Q output of flip flops FF134, FF135, and FF136.

This second counter counts up and down in 6DB increments, depending upon the signaling from AGC circuit 19. Therefore, depending upon the adjustment required, the increments of change will be up or down in either 1 or 6 DB steps.

FIG. 28 illustrates the development of signal 6/1 and signal EDT. Signal XORAGC, from the AGC circuit, is inverted and provides one input to AND gate 366. The other input to AND gate 366 is signal LG5, inverted. AND gate 366 provides one input to cross coupled NOR gate 368 whose output is signal 6/1 and which is an input to NOR gate 369. When signal 6/1 is high, the 6DB counter is activated in exclusion of the 1DB counter. Another input to NOR gate 368 is the output from NOR gate 369. Signal SM5 is inverted and applied as one input to NOR gate 367. Signal LG5 is inverted and applied as another input to NOR gate 367 and finally, signal UP1— (from AGC circuit) is applied as an input. The output of NOR gate 367 provides one input to NOR gate 369. Another input to NOR gate 369 is provided by signal BSRST from the 6DB increment counter. Finally, a power up circuit provides the fourth input to NOR gate 369. Signal MKEDT— is applied as one input to NOR gate 371 and the output of NOR gate 368, signal 6/1 is applied as the other input. The output of NOR gate 371 is signal EDT.

FIGS. 29A-29E, when placed together as indicated, form a schematic of the receive filter. The telephone line, which is the ordinary transmission line over which a phase shifted signal is transmitted, has a pair of lines, one low band and one high band. For example, a low band frequency may be in the order of 1200 bps with a high band being in the order of 2400 bps. If the low band is received, there will be high band pickup. In addition, the telephone lines distort the signal in amplitude and phase. The purpose of the receive filter is to remove the unwanted high band or low band interference and to compensate for distortion in the telephone line. It will be remembered that on the transmitter end, an equalization circuit is used to minimize distortion. On this receive end, the distortion is further minimized by the receive filter.

The receive filter of FIGS. 29A-29E is made up of seven sections, each section being a biquadratic filter similar to those discussed earlier. The difference in one biquadratic filter from another is in its transfer function. Also, in these particular filter sections, it will be noted that capacitance may be switched in and out of the circuit to adjust frequency response for the modem protocol and the gain determined by the AGC control 19.

Figure 29A:
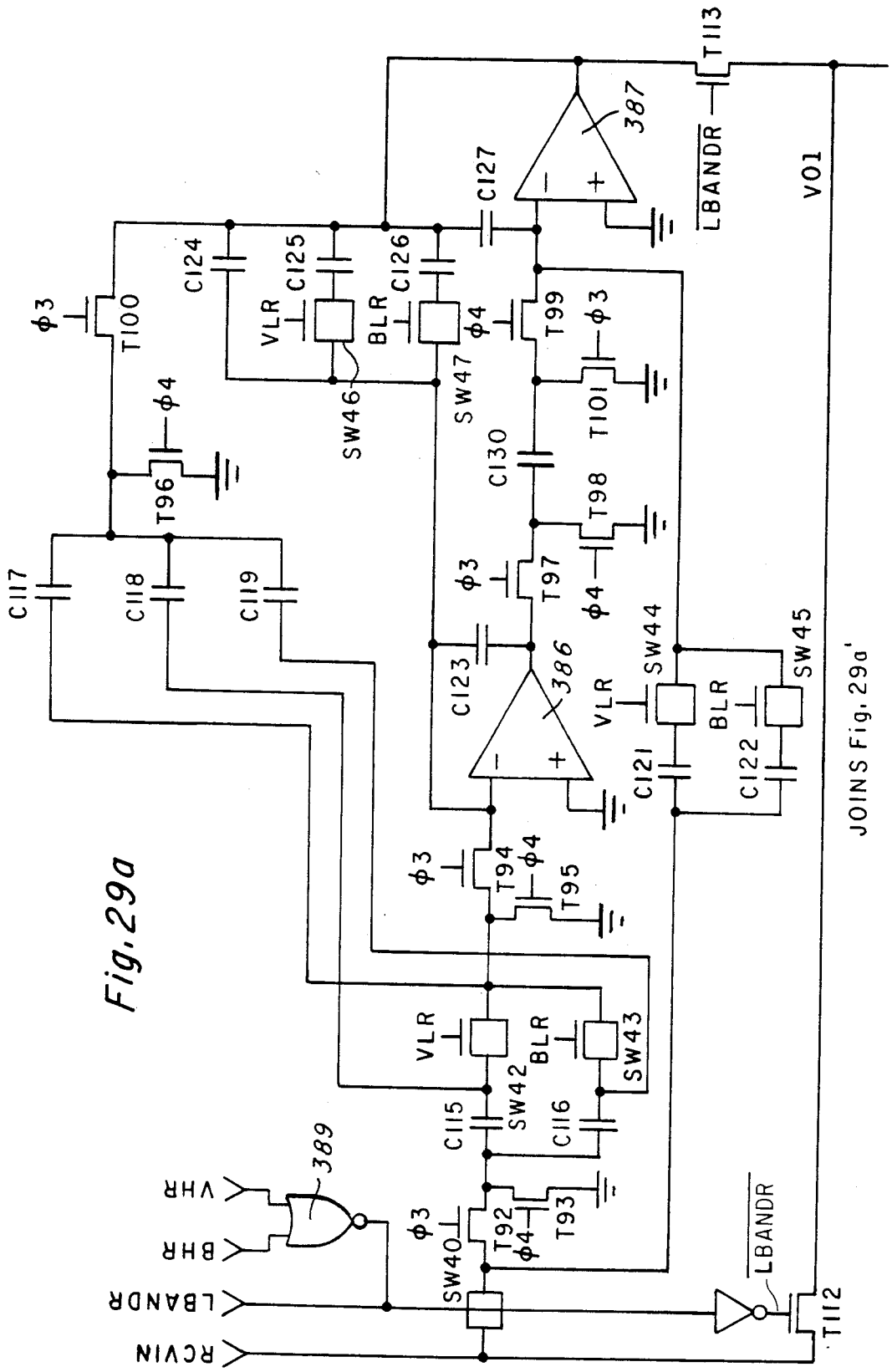
Figure 29A:
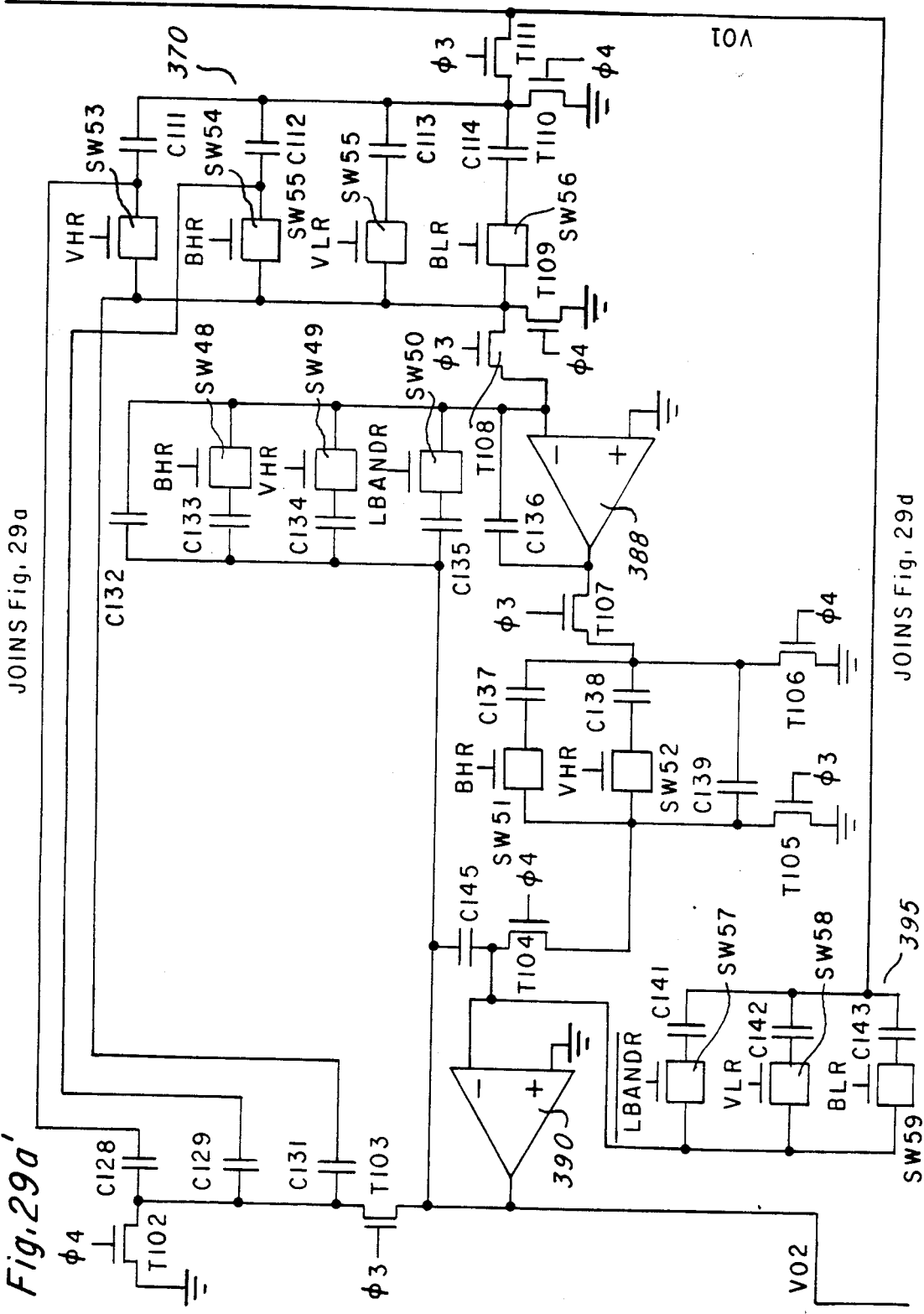

Turning first to FIG. 29A, signals BHR and VHR are shown as inputs to NOR gate 389 with the resultant signal LBANDR, which is used throughout this filter. Switch SW40, which is identical to the switch of FIG. 17, is controlled by signal LBANDR to isolate the filter when desired. Signal RCVIN is switched into the circuit through switch 40. Section one provides for selective introduction of capacitors C117-C119 through switches 42 and 43 to the input of operational amplifier 386. The introduction of capacitors C125 and C126 by switches SW46 and SW47, activated by signals VLR and BLR, respectively, to the input of operational amplifier 387 vary the capacitance depending upon protocol.

The output signal from operational amplifier 387 is V01 which proceeds, through transisor switch T111 into the second section of the filter which is made up of operational amplifiers 388 and 390 and the associated circuitry. Capacitor switch network 370 includes four capacitor switch circuits in parallel: switch SW53, activated by signal VHR, and capacitor C111; switch SW54, activated by signal BHR, and capacitor C112; switch SW55, activated by signal VLR, and capacitor C113; switch SW56, activated by signal BLR, and capacitor C114. This grouping will be used as an example for further discussion of the filter and provides a variable capacitance input to operational amplifier 388, dependent upon the protocol. Signals VHR, BHR, LBANDR, switch in capacitors C133, C134, and C135 by switches SW48, SW49 and SW50, respectively. Capacitors C141-C143 are switched in by signals LBANDR—, VLR, and BLR, through switches SW57, SW58, and SW59, respectively. These capacitor banks provide additional, selectable, capacitance to the operational amplifier 390, whose output is signal VO2.

Signal VO2 is switched into the third section of the filter as shown in FIG. 29D. Signal VO2 enters through transistor T115 with a capacitor-switch arrangement (identical to capacitor switch circuit 395 of FIG. 29A) being positioned across the two operational amplifiers 391 and 392 of the biquadratic filter of this section three. Positioned between amplifiers 391 and 392 is another capacitor switch network 398 identical to capacitor switch network 395 except for values of capacitance. Finally, still another similar capacitor switch network 397 provides capacitance to be added to fixed capacitance at the input to operational amplifer 391. The output from operational amplifier 392 is signal VO3 which, as shown, is introduced into the fourth section of this filter.

Signal VO3 is switched into section four through transistor T116. This section has capacitor switch network 377, similar to capacitor switch network 370, except for the capacitor values, connected to the input of operational amplifier 394. Another such network 376 is connected from the input of operational amplifier 393 to the output of differential amplifier 394. Still another similar network 375 is connected between the output of operational amplifier 393 and the input of operational amplifier 394. Additional capacitance to the input of operational amplifier 393 may be switched in through signals BHR, VHR, VLR and BLR in a network similar to that previously described for network 370. The output of this fourth section is signal VO4 which is shown entering the fifth section in FIG. 29E.

Signal VO4 is shown entering through transistor T117 to provide an input to the section made up of operational amplifiers 401 and 402, and the associated switches and capacitors as shown. Connected to the input of operational amplifier 402 is a capacitor switch network 382 similar to 370, except for the capacitor values. Likewise, capacitor switch network 383, similar to network 370, is connected from the input of operational amplifier 401 to the output of operational amplifier 402. Connected between operational amplifiers 401 and 402 is another similar network 385. Finally, similar network 384 is connected to the input of operational amplifier 401. The output from operational amplifier 402 is signal VO5 shown entering the sixth stage of the filter in FIG. 29B.

Signal VO5 enters the sixth stage through transistor T118, the sixth stage being made up of operational amplifiers 403 and 404, and associated switches and capacitors. It should be noted that in this section, capacitors are switched in and out of the circuit in similar capacitor switch networks as discussed earlier, but with the switches being activated by signals SM0-SM5 from the 1DB step counter of FIG. 27A. Capacitor switch network 406 has six capacitors, each switched in by switches activated by signals SM0-SM5, respectively. This network serves as an input to operational amplifier 403. also connected to that input is capacitor switch network 381, again similar to capacitor switch network 370. Connected across operational amplifier 403 is capacitor switch network 380, similar to network 370. Similar network 379 is connected between operational amplifiers 403 and 404. Switch capacitor network 378 is connected across operational amplifier 804. Switch capacitor network 407, controlled by signals SM0-SM5, similar to network 406, is connected to the input of operational amplifier 404. The output of operational amplifier 404 is signal VO6. It can be seen that the response of this filter is dependent not only on the protocol, but also on the automatic gain control circuit 19 which controls the counter providing signals SMO-0-SM5.

Figure 29B:
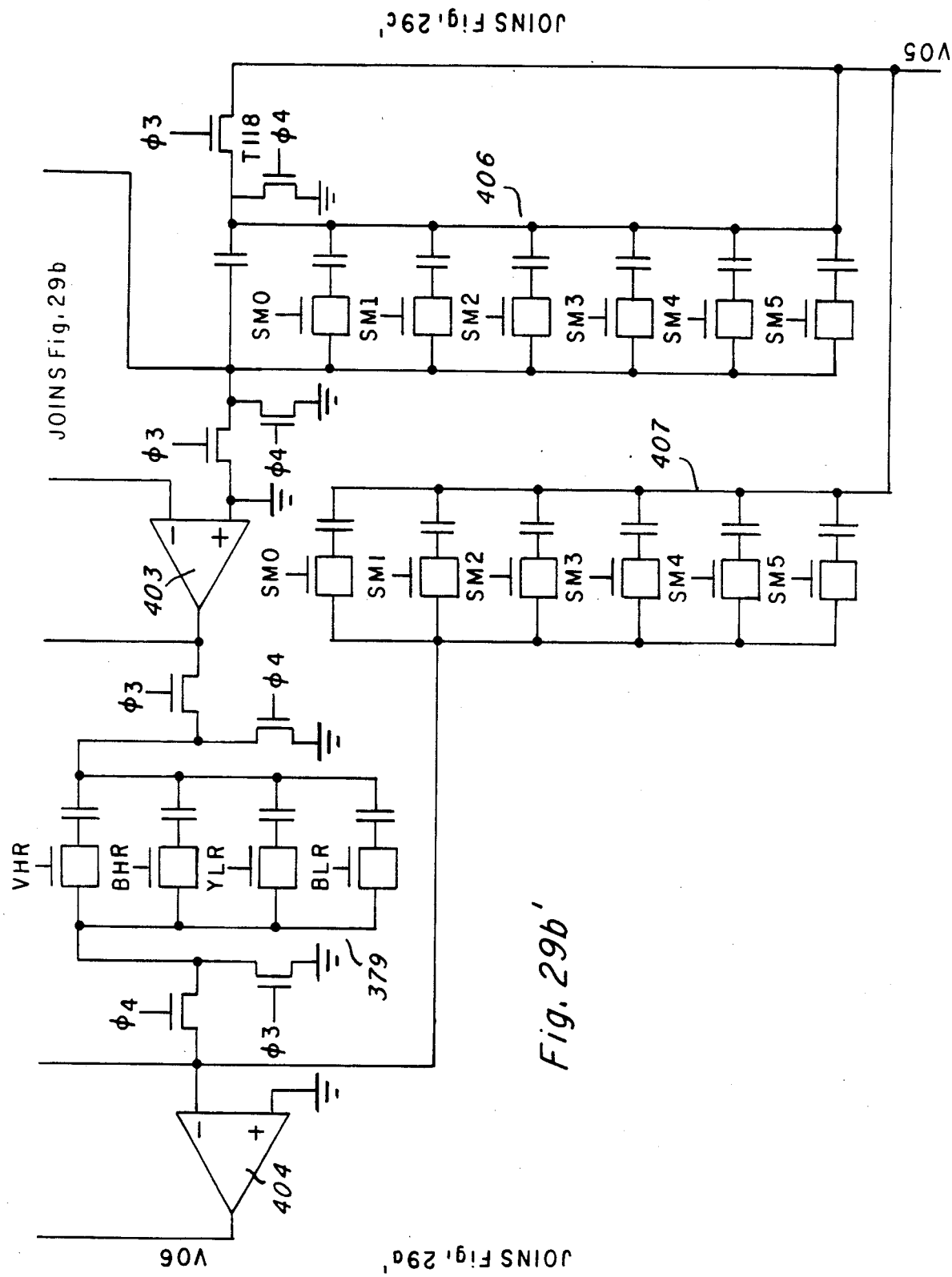
Figure 29C:
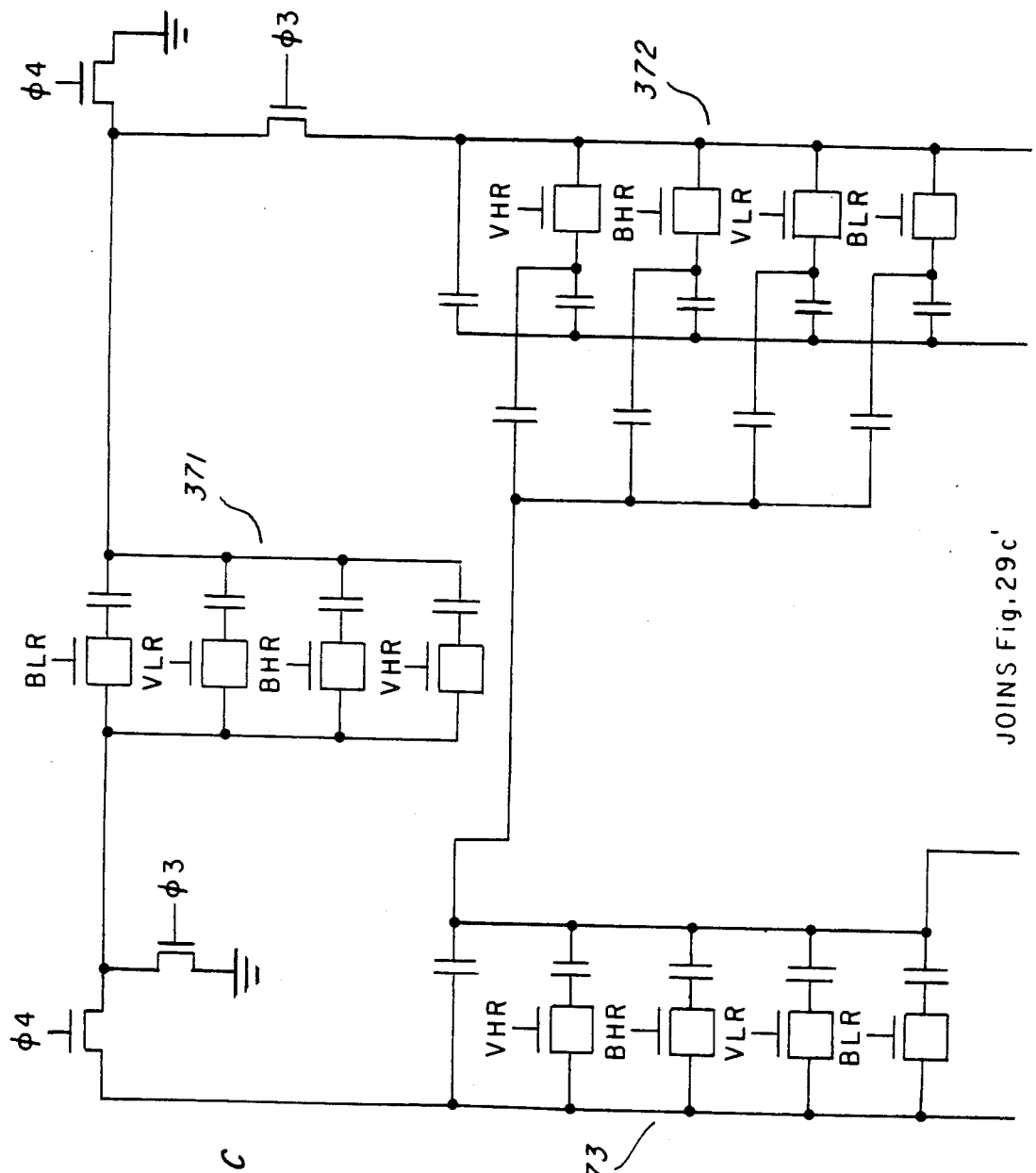

FIG. 29C illustrates the seventh and final section of this receive filter with signal VO6 being introduced into the filter by way of capacitor switch network 410. Network 410 is made up of five capacitors switched in by signals LG1-LG5, respectively, to the input of operational amplifier 408. A similar network 411 is connected between the input to network 410 and the output of operational amplifier 409. Switch capacitor network 373, similar to network 370, is across operational amplifier 408. Network 374, similar to network 370, is connected between operational amplifiers 408 and 409. Capacitor switch network 372, also similar to network 370, selectively adds to the capacitance of network 373. Network 371, similar to network 370, is connected, through transistor switches, to one side of each of networks 373 and 372. This section gain is controlled by signals Lg1-LG5, from the counter controlled by the AGC circuit 19, in addition to other gain components. The output signal FRCV has now been filtered and is now ready for phase shifting.

FIG. 30, in block form, illustrates the automatic gain control and associated circuits. RCV filter 18A, 1DB steps 18B and 6DB steps 18C represent the seven step receive filter described above wherein receive filter 18A represents the first five sections, 1DB steps 18B represents the sixth section, and 6DB steps 18C represents the seventh section. The 1DB steps and the 6DB steps are controlled by logic 19E, the logic shown in FIGS. 27A and 27B that provides signals SM0-SM5 and LG1-LG5. Count 19D represents the counters for the 1DB and 6DB increments, also described in detail with respect to FIGS. 27A and 27B.

The remainder of the automatic gain control system to be described is the rectifier 19A, filter 19B and comparator 19C. In this preferred embodiment, rectifier 19C is a negative rectifier so that if the incoming signal is above the voltage reference level, it is inverted. If the incoming signal is below that reference, it is not inverted. The rectified signal is filtered and then a comparison is made to determine whether the signal is too high or too low in magnitude. Depending upon that determination, an UP or DOWN signal is generated for use in the counters of FIGS. 27A and 28B.

FIG. 31A illustrates the rectifier circuit made up of comparator 405 and operational amplifier 406, and associated circuitry as shown. In fact, the capacitors and transistor switches shown in connection with operational amplifier 406 provide a first order filtering function so that the output signal RECTD from operational amplifier 406 is rectified and somewhat filtered. From there it goes into section 19B shown in FIG. 31A being made up of operational amplifiers 407 and 408, forming a biquadratic section, together with the supporting circuitry shown. The output from operational amplifier 408 is signal BIFIL.

The comparison circuitry 19C, for comparing the input signals with a standard and for causing the adjustment of those signals is shown in FIGS. 31A, 31B, and 31C. FIG. 31A illustrates clock phi 4 as one input to NOR gate 423. The other input is signal 6/1. NOR gate 422 has 6/1— and the Q output from flip flop FF143 applied. The output of NOR gates 422 and 423 are applied as inputs to NOR gate 424. This logic arrangement determines whether clock phi 4 or the output of flip flop FF143 will be used to clock flip flop FF144 which in turn clocks flip flop FF145. FIG. 28 illustrates the generation of signal 6/1 which is turned on by a lengthy carrier detect signal to speed up the automatic gain control. In either event, the Q output of flip flop FF145 provides one input to NOR gate 426 and the —Q output of that flip flop provides one input to NOR gate 427 with the other input for both of those gates being provided by the Q— of flip flop FF144. The outputs from NOR gates 426 and 427 provide inputs to latch circuit 428 which provide output signals phi DOWN and phi UP. The outputs also provide inputs to latch signal 429 whose output signals are phi DOWNA and phi UPA.

Signal BIFIL, shown in FIG. 31B, is gated to the negative input of comparator 409 by signal phi DOWNA through transistor T123 or to the positive terminal of comparator 409 by signal phi UPA through transistor T124. Also tied to the negative input of comparator 409 is signal SM0, gated through transistor T122 by the output of NOR gate 432, or signal LOW6 gated through transistor T121 by the output of NOR gate 431. Signal phi UPA— is applied to both NOR gates 431 and 432. Signal 6/1 is applied to NOR gate 432 and signal 6/1— is applied to NOR gate 431.

An identical circuit is connected to the positive terminal of comparator 409, except that signal phi DOWNA— is substituted for phi UPA—. Also, the signals applied are SM5 or LG5. These two circuits then determine the output of comparator 409 which is tied directly to latch circuit 411, whose other input is phi DOWN and inverted to latch circuit 412 whose other input is phi UP. Signal UP1 or UP1— is high from latch circuit 412 and signal DOWN1 or DOWN— is high from signal 411, depending upon the states of those latches. The AND OR gate combination of AND circuits 413 and 414 and NOR circuit 415 provide signal XORAGCOUT which is input to NAND gate 416. The STEP—signal (the inversion of STEP signal of FIG. 27B) clocks flip flop FF150 whose Q output provides the other input to NAND gate 416. The output of NAND gate 416 provides the preset input to four toggle flip flops FF146–FF149 and also provides one input to NOR gate 418. Flip flops FF146–FF149 count and decide whether the gain changes detected are a long enough period to effect the change. The outputs of these flip flops, as shown, are applied to NOR gates 417 and 419. NOR gate 417 presets flip flop FF150 and NOR gate 419 provides another input to NOR gate 418. The third input to NOR gate 418 is signal phi UPA and the output clocks flip flop FF146 which in turn clocks flip flop FF147 and so on. The output from NOR gate 419 also provides one input to NAND gate 420 and one input to NAND gate 421. Signal MUP1 (from FIG. 27A) provides the other input to NAND gate 420, whose output is the signal UP—. Signal MDOWN1 (from FIG. 27A) provides the other input to NAND gate 421 whose output is signal DOWN—.

The AGC circuit provides signals to increase or decrease the amplitude of the incoming signal if it is evident that a long enough period is involved and that the magnitude is significant. The signals developed above are used in the circuitry for causing the actual amplitude changes in the receive filter 18..

FIG. 32 is a block diagram of the digital voltage controlled oscillator used in the data recovery loop of the receiver. Divider 450 is shown having a 4 MHz input. Also, a protocol is input. Its end count signal RP6 is sent to variable divider 470 which provides divider 450 with reset signal VCLSR. The output of variable divider 470 provides an input to fixed divider 500 whose outputs are the mixer clocks for the cosine and sine functions. Fixed divider 500 also provides clock signals phi 52, phi 54 and phi 58 to count control 520. The six bit A/D converter 480 has loop error voltage FVIN input and provides six bits out to the count control 520. Count control 520 provides signals D, E and F to the variable divider 470 in response to the 6 bit input from the A to D converter 480.

To complete the demodulation of the incoming signal, it must be split into two phases and next described will be that phase shifting circuitry. The control signals utilized in the phase shifter circuitry and not heretofore identified are described in FIGS. 33-35.

FIG. 33 illustrates three flip flops FF151-FF153, with flip flop FF151 being clocked by phase phi 5 and the Q output of the flip flops clocking the succeeding flip flops. AND gate 430 receives the Q outputs from flip flop FF151 and signal LBANDR, inverted. AND gate 431 receives the Q output from flip flop FF152 and signal LBANDR. AND gates 430 and 431 provide the two inputs to NOR gate 432 whose output signal is CK125.

In FIG. 34, it is seen that signal CK125 is the input signal to the circuit, shown directly clocking flip flop FF157 and, inverted, clocking flip flop 154. The Q output from flip flop 154 provides clocking for flip flop FF155 and connects to the J input of flip flop 157. The Q output from flip flop FF155 provides the J input to flip flop FF156 and the Q—output from flip flop FF155 provides the K input to flip flop FF156. The J and K inputs to flip flop FF157 are provided by the Q and Q—outputs of flip flop FF154, respectively. The Q—output of flip flop 155, inverted, provides the control signal W127. The Q—output of flip flop FF156, inverted, provides control signal W128. The Q output of flip flop FF157, inverted, provides signal CGR. Signal CGR, inverted, provides signal SGR.

FIG. 35 illustrates the development of timing signals used in the phase shifting network. AND-NOR circuits 434-437 are made up of two input AND gates which provide the inputs to a NOR gate. Signal W128 provides one AND gate input to circuit 434 and one AND gate input to circuit 435. Signal W128—provides one input to circuit 434 and one input to circuit 435. Signal W127 provides one input to circuit 436 and one input to circuit 437. Signal W127—provides one input to each of circuits 436 and 437. Signal phi 5—provides one input to each of circuits 434-437. Likewise, signal phi 6—provides provides one input to each of circuits 434-437. The outputs from circuits 434-437 are clock signals phi 5S, phi 6S, phi 5C, and phi 6C, respectively.

Figure 36A:
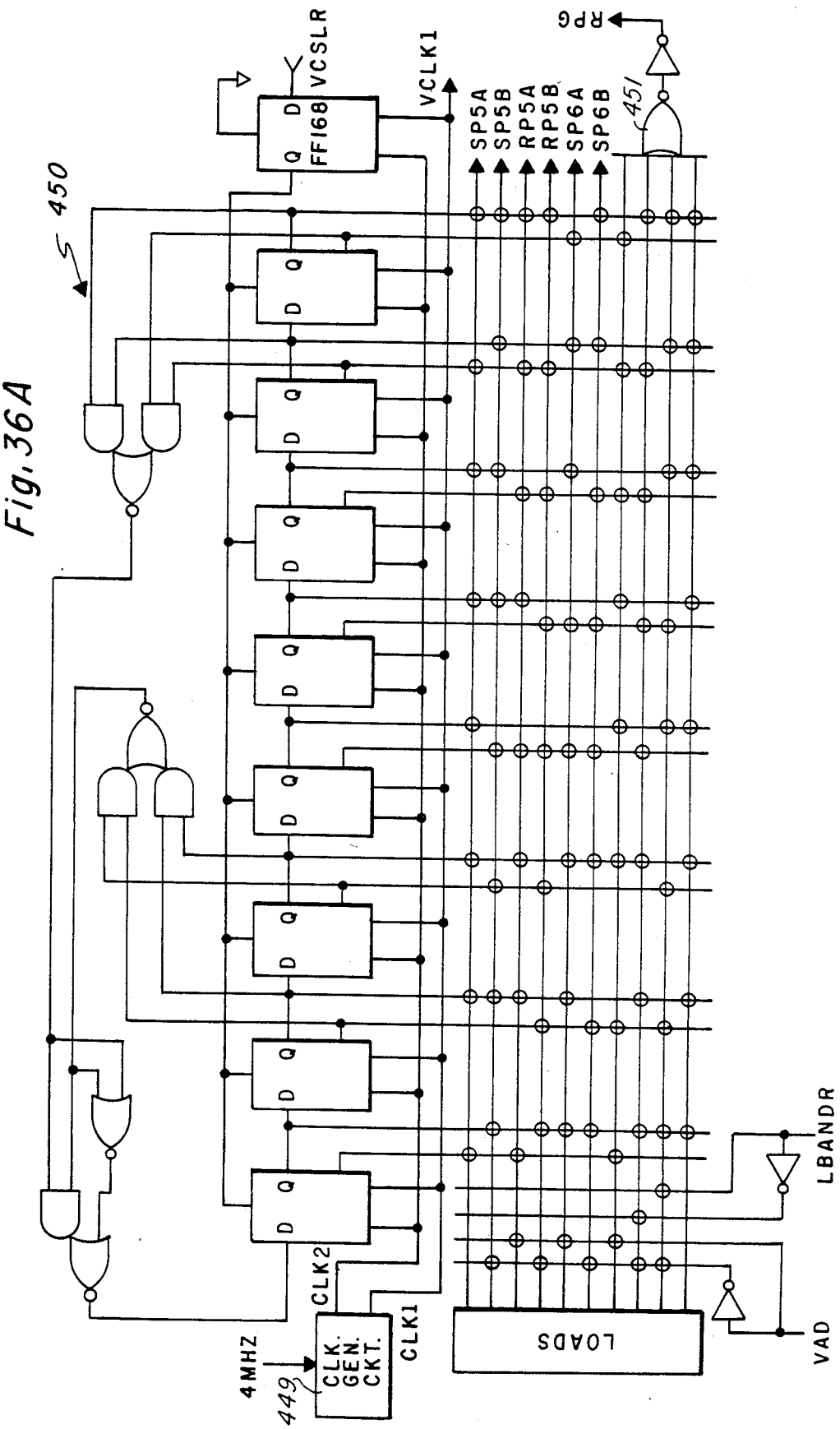

FIG. 36A illustrates pseudeo random shift register (divider) 450 for providing a fixed count for the digital voltage controlled oscillator of the receiver circuit. Clock generator circuit 449, identical to clock generator circuit 33, provides clocks 1 and 2, for clocking the eight flip flops, making up the shift register, as well as a ninth flip flop that resets the eight flip flops when signal VCLSR is received. Signals VAD and VAD—, and LBANDR and LBANDR—provide control for the PLA of shift register 450. The output signals from the PLA are SP5A, SP5B, RP5A, RP5B, SP6A, SP6B, and through NOR gate 451, the remaining four lines of the PLA, combined and inverted provide signal RP6.

FIG. 36B illustrates the development of digital voltage controlled oscillator clock signals phi 5 and phi 6. Input signals SP5A and SP5B are input to OR gate 452, and input signals RP5A and RP5B are inputs to OR gate 457. The outputs from these two OR gates provide inputs to each of AND gates 453 and 456 which are clocked by signal VCLK1, all from the pseudo random shift register 450. The outputs of AND gates 453 and 456 provide inputs to cross coupled NOR gates 454 and 455, respectively, with the output of NOR gate 455 being inverted to provide signal phi 5.

Signal phi 6 is generated as shown in a nearly identical manner. Signal RP6 provides one input directly to AND gate 463. Signals SP6A and SP6B provide inputs to OR gate 461 which provides an input to AND gate 462. Both AND gates 462 and 463 receive their second inputs from signal VCLK1. The output of NOR gate 458, which is cross-coupled with NOR gate 459 whose inputs, respectively, come from AND gates 462 and 463, provides clock signal phi 6. Clock signal phi 5 is the input in FIG. 32 for developing various other clock signals.

FIG. 36C illustrates signals VCLK1 and RP6 as inputs to AND gate 464. Signal Q168 from flip flop FF168 of FIG. 36A provides one input to NOR gate 466, which is cross coupled with NOR gate 467, whose input is provided by AND gate 464. The output of NOR gate 466 is inverted and provides signal PSETX.

Figure 36D:
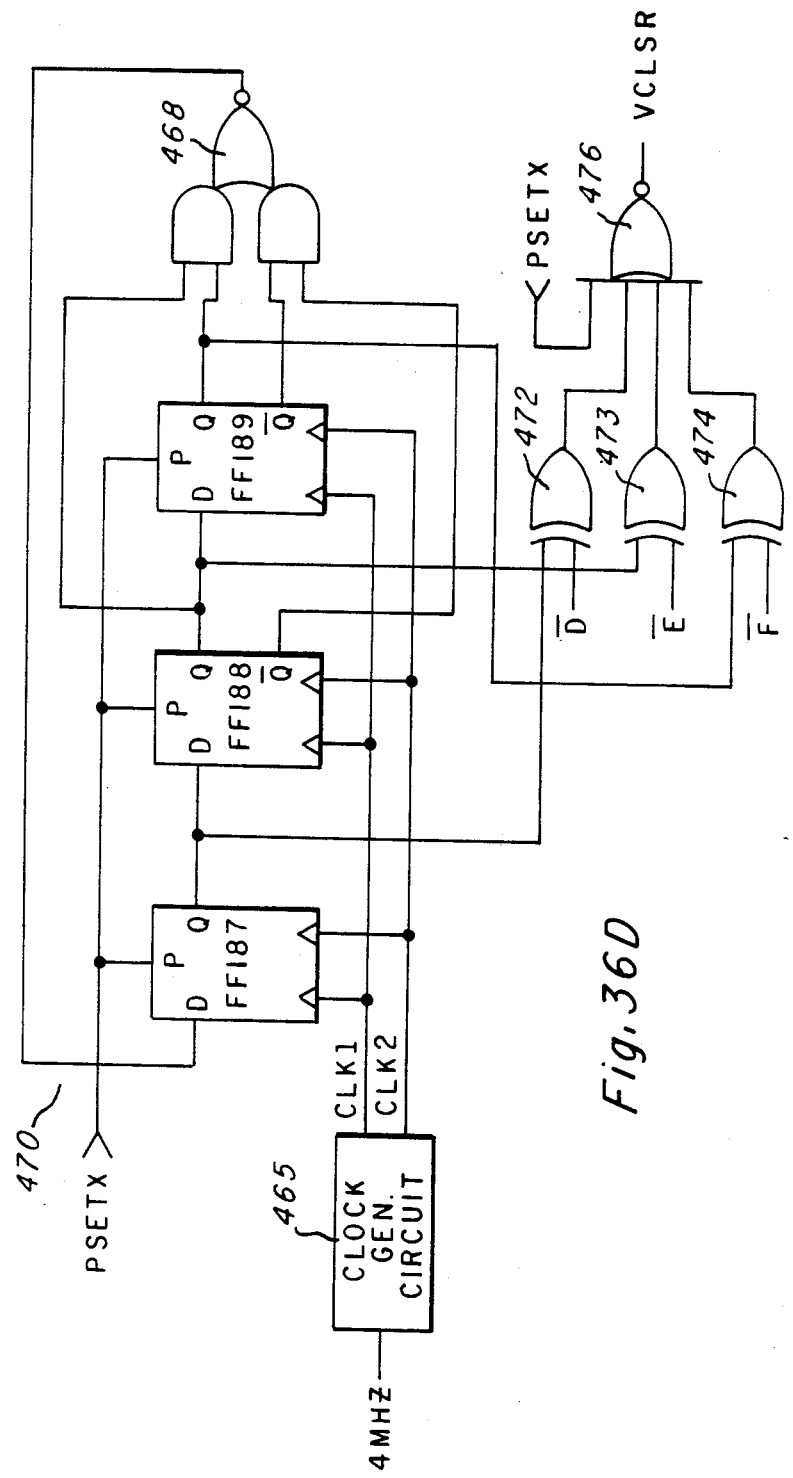

FIG. 36D illustrates the digital voltage controlled oscillator three bit divider made up of flip flops FF187, FF188, and FF189. A 4 MHz input into clock generator circuit 465, identical to clock generator circuit 33, provides output clocks 1 and 2 for clocking the flip flops FF187-FF189. Exclusive OR circuit 468 provides the exclusive OR function of the Q and Q—outputs of flip flops FF188 and FF189, respectively, for providing the D input to flip flop FF187.

The Q outputs of flip flops FF187, FF188, and FF189 provide one input to each of exclusive OR circuits 472, 473 and 474, respectively. The other input to each of exclusive OR circuits 472-474 are provided by signals D—, E—, and F—, respectively. The development of these signals follows. The output of each of these exclusive OR circuits 472-474 provide inputs to NOR gate 476 with one additional input being signal PSETX from FIG. 36C. The output of NOR gate 476 is signal VCLSR which is applied to the D input of flip flop FF168 of shift register 450, for presetting the eight flip flops forming that shift register.

Figure 37A:
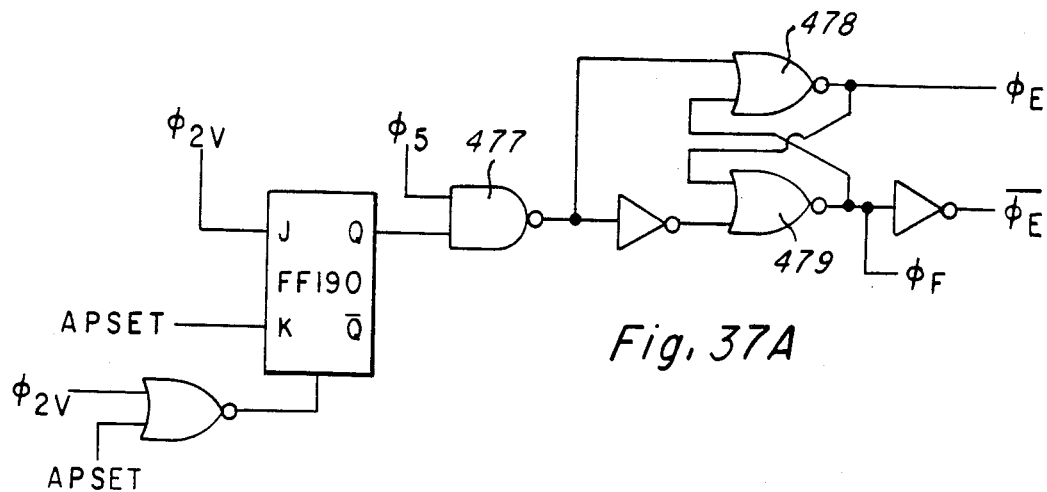

FIG. 37A illustrates the development of signal phi E, phi F, and phi F—for use in the analog to digital converter used in this receiver circuit. Signals APSET and phi 2V provide inputs to flip flop FF190 and NOR gate 467. The output of NOR gate 467 is inverted and clocks flip flop FF190 whose Q output provides one input to NAND gate 477. The other input to NAND gate 477 is signal phi 5. The output from NAND gate 477 provides one input to NOR gate 478 and, inverted, provides one input to NOR gate 479. NOR gates 478 and 479 are cross-coupled with NOR gate 478 providing output signal phi E and NOR gate 479 providing output signal phi F, and inverted, phi F—.

Figure 37B:
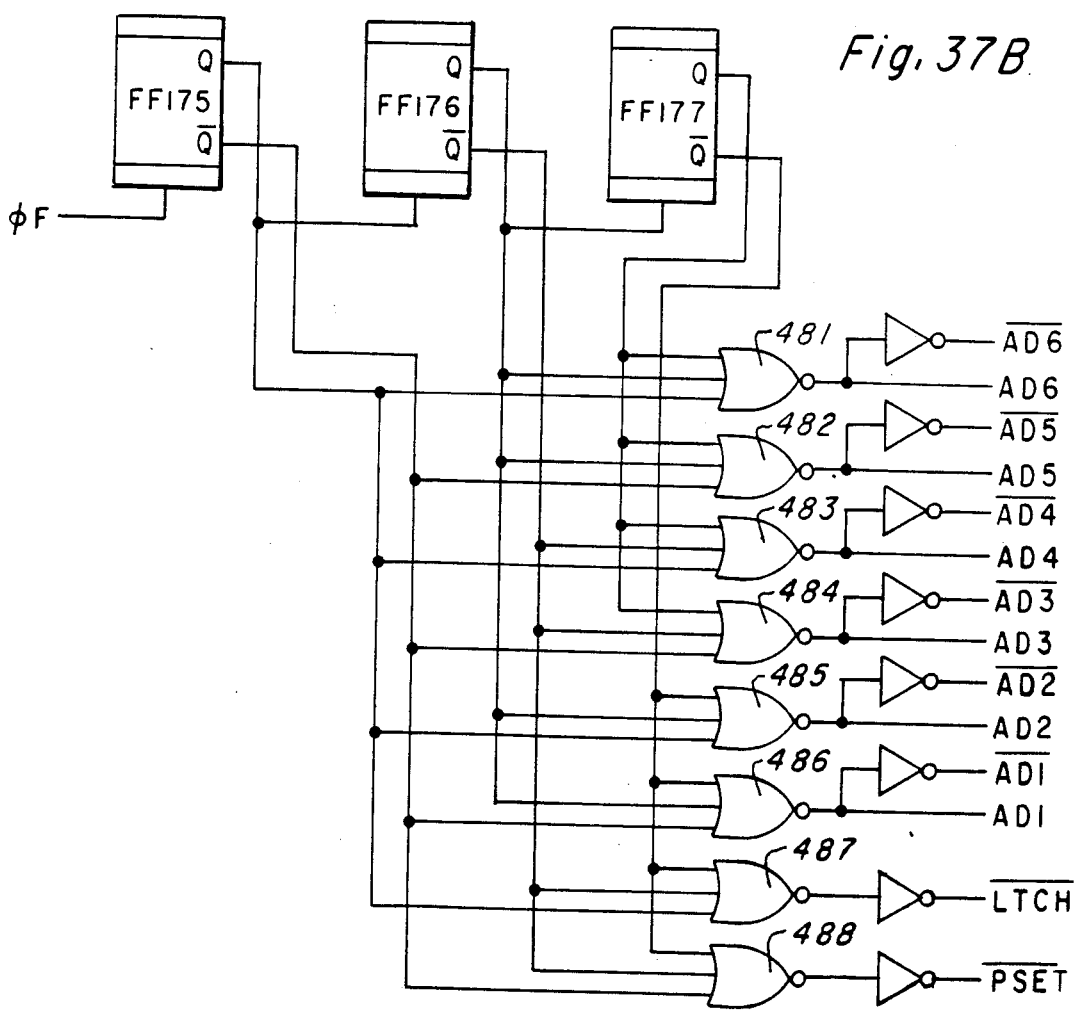

FIG. 37B illustrates toggle flip flops FF175, FF176 and FF177 with flip flop FF175 being clocked by signal QF—, flip flop FF176 being clocked by the Q output of flip flop FF175 and flip flop FF177 being toggled by the Q output from flip flop FF176. The Q and Q—outputs from flip flops FF175-FF177 are combined in NOR gates 481-488 so that NOR gates 481-488 each represent a count of the combination of the three flip flops. The outputs of NOR gates 481-486 are signals AD6 and, inverted, AD6—through AD1 and AD1—, respectively. The output from NOR gate 487 is inverted to provide signal LTCH—. The output of NOR gate 488 is inverted to provide signal PSET—.

Figure 37C:
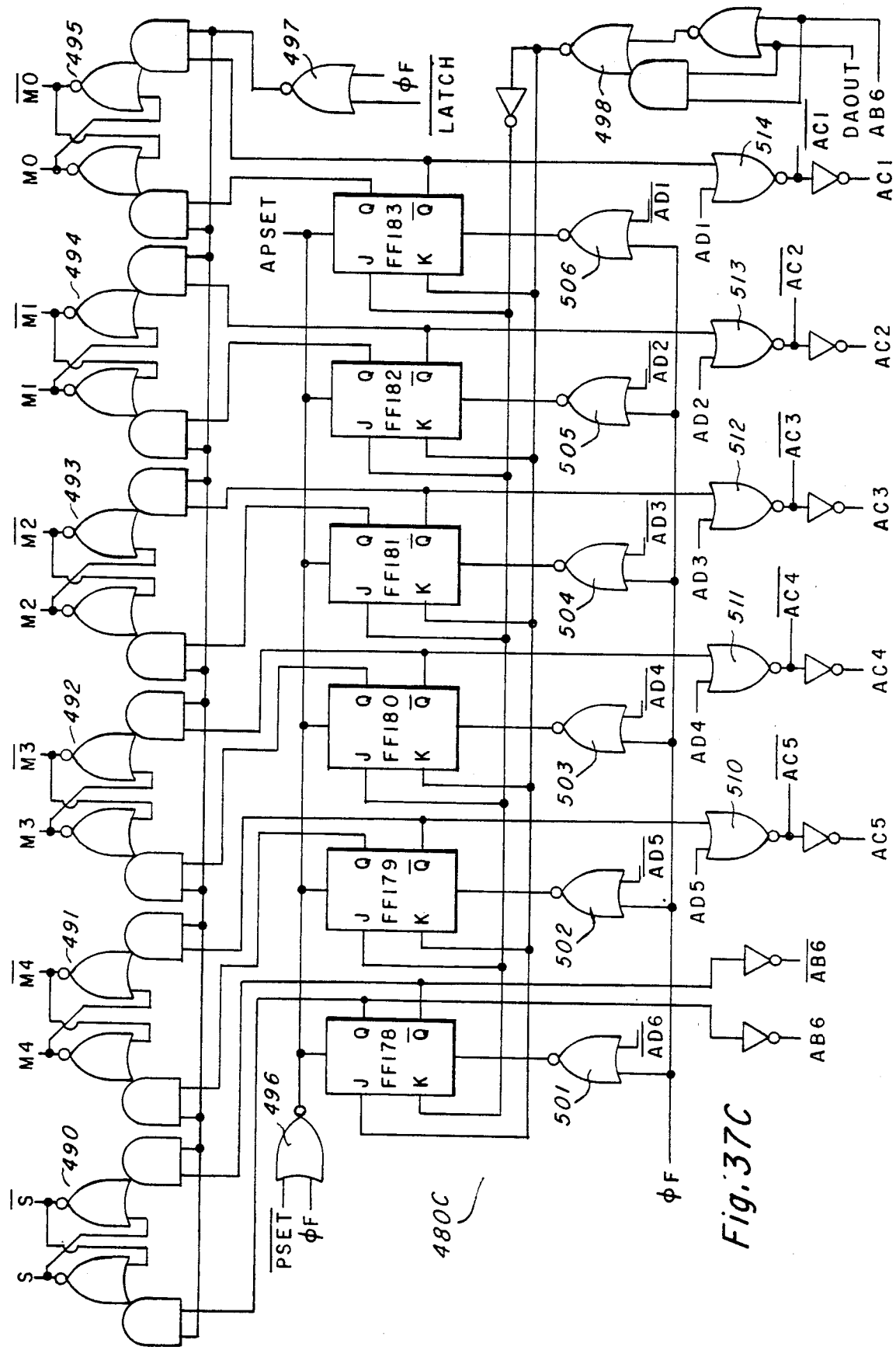

FIG. 37C illustrates flip flops FF178-FF183 for storing a 6 bit binary representation of the analog voltage present. These flip flops are clocked by the output from NOR gates 501-506 whose inputs are provided by signals phi F, and AD6—through AD1—, respectively. The Q output of flip flop FF178 is inverted to provide signal AB6 and the —Q output is inverted to provide signal AB6—. The Q—output of flip flops FF179-FF183 are NORed with signals AD5, AD4, AD3, AD2 and AD1, respectively, to provide signals AC5—through AC1—. These signals are all inverted to provide signals AC5-AC1.

Signals AB6 and DAOUT (from FIG. 37D) are exclusively ORed in circuit 498 and provide the K inputs to flip flops FF178—FF183, respectively, and inverted, provide the J inputs to those flip flops.

Signals PSET— and phi F are input to NOR gate 496 whose output signal is APSET which, as indicated above, provides an input to the circuit of FIG. 37A and also provides the present input to flip flops FF178-FF182.

Signal LATCH— and signal phi F provide inputs to NOR gate 497 whose output provides an input to each of latch circuits 490, 491, 492, 493, 494 and 495, providing output signals S and S—, M4 and M4—, M3 and M3—, M2 and M2—, M1 and M1—, M0 and M0—, respectively. If flip flop FF178 is set, then S=1 and S—=0, and so on. These output signals then represent the contents of the flip flops mentioned.

FIG. 37D illustrates a capacitive divider network which is used for a successive approximation of a digital value of the input signal.

As shown, signal VADH which, in this preferred embodiment is approximately +1 volt, and signal VADL, approximately —1 volt, provide the input the voltage references. Capacitors C160, KC160, K²C160, K3C160, K4C160 are selected by signals AC1, AC2, AC3, AC4, and AC5, respectively, from the K bit counter circuit of FIG. 37B. Another bank of equal size capacitors are activated by the inversions of the signals mentioned above. In one case, the voltage is to be added, and in the other case, voltage is to be subtracted. The constant K is equal to 2 and therefore, if C160 =1, then K⁴C160 =16.

since the capacitors are connected in parallel, they are additive and therefore the incoming voltage is divided by increments of 1/31, 2/31, 3/31, and so on. A comparison with voltage FVIN, the voltage on which the A to D conversion is done, is made through comparator 515 with the output signal DAOUT used to gate the exclusive OR circuit 498 of FIG. 37C. Therefore, the six flip flops FF178-FF183 count until a comparison is made. Then, on the seventh count from FIG. 37B, the contents of the flip flops are gated out into the latch circuits 490-495. On the eighth count, the flip flops are preset.

FIG. 38A and FIG. 38B combine to illustrate the development of signals D—, E—, and F—in circuit 520. FIG. 38A illustrates signals M2 and S, M1 and S, M0 and S, and their inversions, combined in exclusive OR gates 516, 517 and 518, respectively. The output from circuit 516 provides one input to NOR gate 526 whose other input is provided by signal phi 58. The output of circuit 516, inverted, provides one input to NOR gate 519 whose other input is provided by signal phi 52—. The output of circuit 517 provides one input to NOR gate 521 whose other inputs are provided by the output from NOR gate 519 and signal phi 54. The output of circuit 517, inverted, provides one input to NOR gate 524 whose other input is provided by signal phi 54—.

The output of circuit 518 provides one input to NOR gate 522 whose other inputs are provided by the outputs from NOR gates 519 and 524, and signal phi 52. The output from NOR gates 526, 521, and 522 provide the three inputs to NOR gate 523 whose output is signal L/S.

In FIG. 38B, signal L/S is seen as an input to PLA 525, both directly and inverted. Signals S and S—, M3 and M3—, M4 and M4—all are input signals to the PLA 525. The output signals from PLA 525 are signals D—, E—and F—which are the gating signals for exclusive OR circuits 472-474 of FIG. 36D.

FIG. 39A and FIG. 39B, joined as shown, schematically illustrate the phase shifter, mixer, summing and general filtering circuits for providing output base band signals IC0 and IC9. Signal FRCV, the output of operational amplifier 409 shown in FIG. 29C provides the input to these circuits. Operational amplifier 442 has its positive terminal grounded and its negative terminal receives inputs from various combinations of capacitance based on the selected protocol and also to form an all-pass filter that does not affect the signal magnitude, only the phase, so that the phase shift between the outputs from operational amplifiers 442 and 443 is 90 degrees.

The output of operational amplifier 442 is input to buffer filter 446 whose output is signal PS0. Operational amplifier 443 inputs buffer filter 447, and its output is signal PS9. Signals PS0 and PS9 enter identical mixer circuits, except for the application of gate signals for the 0° and 90° conditions. In FIG. 39A, for example, signal PS0 is shown gated by signal phi 6C through transistor T140. Signal SP9 is shown gated through transistor T133 by signal phi 6S. In FIG. 39B, signal PS0 is shown gated by signal phi 6S and signal PS9 by signal phi 5C. An examination of these circuits will illustrate their identity except for the phase of the gating signals. The mixing circuit shown in FIG. 39A store charge on capacitors C152-C154, and C156 and C157. Transistor T132, when gated by signal phi 6 transfers the charge from those capacitors to capacitor C155, thereby summing the signals. Operational amplifier 444, with the associated capacitors, provides a first order filter to produce output signal IC0, the in-phase I channel signal. In like manner, operational amplifier 445 provides output signal IC9, the quadrature phase, Q channel signal.

FIG. 40 is a schematic diagram of buffer filter 446 (identical to buffer filter 447). The output of operational amplifier 442 provides the input to buffer filter 446 through capacitor C150, switched through T130 by signal phi 7, which is exactly four times the frequency of phi 3 and phi 4, to avoid any beating of frequencies. Operational amplifier 440 and its associated capacitors and switches provides a switched low pass filter. Operational amplifier 441 and its associated circuitry, including resistor R5, provides a continuous filter whose output is signal PS0. PS0 provides the input to the mixer circuits described above.

FIG. 42A illustrates the development of clock signals phi C and phi D. The clock generator circuit 531 which is identical to clock generator circuit 33, receives a 4 MHz input providing clocks 1 and 2 out to clock flip flop FF191 whose Q and Q— output are used to clock flip flop FF192. The Q output of flip flop FF192 clocks toggle flip flop FF193. The Q output of flip flop FF193, inverted, is signal phi C and the Q— output, inverted, is phi D.

FIG. 42B illustrates the development of clock signals P68 and P58. As shown, signal phi 58 directly provides one input to a cross coupled NOR gate, and inverted, provides one input to the other cross-coupled NOR gate with the NOR gates providing output signals P68 and P58, respectively.

The clock pulses that were used in the transmission of the data to the receiver must be recovered so that accurate timing of the incoming data is assured. As in the transmission process, it is necessary that the data be clocked as close to the center as possible. A clock recovery loop is necessary to extract from the incoming data the clock used in the original transmission of the data. Following is a detailed description of the circuitry in the clock recovery loop.

Turning first to FIG. 41, the generation of signals phi 5I, phi 6I, phi 5Q and phi 6Q is shown. Signal IR and signal DBR are applied as inputs to exclusive OR gate 530 which gates signal phi 5— through transistor T135 and, inverted, through transistor T137. Exclusive OR circuit 530 also gates phase phi 6— through transistor T136 and, inverted, through transistor T138. The connection between transistors T135 and T138, inverted, provides signal phi 5I. The connection between transistors T136 and T137, inverted, provides the signal phi 6I. Signals QR and DBR are combined in exactly the same way as described for signals IR and DBR, and as shown, to provide signals phi 5Q and phi 6Q. Signals IR and QR are illustrated in connection with the equalizer circuit to be described, and signal DBR is an output of the clock recovery loop circuit to be described below.

FIG. 42A and 42B are simple circuits illustrating the development of other conrrol signals for use in the clock recovery loop to be described.

FIGS. 43A and 43B, joined as indicated, provides a schematic diagram of the clock recovery loop circuit for recovering the clock signal used in the transmission from the data transmitted. As indicated above, accurate recovery of the clock is essential for satisfactory data identification.

Base band signals IC0 and IC9 from FIGS. 39A and 39B are received by a low band pass filter made up of operational amplifier 541 and its associated circuitry. Signal IC0 is switched in by signal phi 5I for charging capacitor C158 Signal phi 6I gates a transistor switch to ground from that capacitor. In a similar manner, signal IC9 is gated in through a transistor switch by signal phi 5Q to charge capacitor C154. Signal phi 6Q gates transistor switch connected to capacitor C157 and to ground. The other terminal of each of capacitors C157 and C158 are connected together to one terminal of capacitor C159, at which point the low pass filter becomes common to both IC0 and IC9. Signal phi 5 gates a transistor switch between the one terminal of capacitor C159 and the negative input to operational amplifier 541. Signal phi 6 gates a switch to ground from the one terminal of capacitor C159. The output of the first low pass filter from operational amplifier 541 is signal SUMIN. Signal SUMIN follows two parallel paths, one through an integrator circuit and the other through a by pass of the integrator circuit. The latter path specifically is gated by signal phi C through a transistor switch to one terminal of capacitor C167 and, from that one terminal, by signal phi D through a transistor switch to ground.

Signal SUMIN is gated in to the integrator circuit by signal P58 to charge capacitor C161. Both sides of capacitor C161 are selectively grounded by signal P68. Signal P58 switches into the negative terminal of operational amplifier 542. The output of this integrator is the output of operational amplifier 542. When signal EDT is high, indicating no energy detected, it gates a transistor across operational amplifier 542 to disable it. Signal FILOT is switched by signal phi C to charge capacitor C165 which is connected to the previously mentioned capacitor C167 to sum the two signals providing signal SUMOT.

The integrator circuit is relatively slow with respect to the entire phase lock loop for recovering the transmitted clock. If the output of operational amplifier 542 became railed, that is, its output equal either one of its inputs, then the phase lock loop would not operate. In the circuit thus far described, by providing the output signal SUMIN from operational amplifier 541 and summing it with the output signal FILOT, the low pass filter over rides the output of the integrator, even when the integrator is railed. Forming an analog divider at the output of operational amplifier 542, to divide the output by 5, in this preferred embodiment, the output of the low pass filter is capable of over-riding that of the integrator. In this case, the phase lock loop will lock. Then the integrator circuit is free to adjust itself relatively slowly to reduce the DC output of the low pass filter to zero, allowing the loop to free run in the absence of an input signal without losing lock. The divide by 5 circuit is a first order filter that receives the output of operational amplifier 542 and includes operational amplifier 543, and includes operational amplifier 543, and associated circuitry. The capacitors are selected to divide so that the first order filter has a gain of 1/5.

Voltage reference VCRL2 (minus one volt in this preferred embodiment with respect to the system references) is applied through the transistor switches as shown by way of gating signals phi C and phi D and in combination with capacitor C170, and in combination with the input signal SUMOT sets the center frequency of the voltage controlled oscillator made up of operational amplifiers 544 and 545, comparator 546, flip flop FF195 and associated capacitors and transistor switches as shown.

The voltage controlled oscillator (VCO) of this invention is a dual-integrator VCO in which, during any given cycle of oscillation, one half of the circuit is integrating toward the threshold voltage, while the other half is idle with its integrating capacitor fully discharged awaiting the next cycle. This is achieved through flip flop FF195, a toggle flip flop receiving its clock input from the output of comparator 546 signal CL16. The Q output of flip flop FF195 is connected to the gates of transistors T144 and T141. The Q— output of flip flop FF195 is connected to the gate of transistor 145 and transistor T140. Transistor T141 is connected across operational amplifier 545 and its feedback capacitor C167. Transistor T140 is connected across operational amplifier 544 and its feedback capacitor C166. Therefore, if flip flop FF195 is set and Q is high, then transistor T144 is turned on and transistor T141 is turned on. By turning on transistor T141, operational amplifier 545 is removed from the circuit. Therefore, the operational amplifier 544 and its associated components provide the VCO. The output of operational amplifier 544 passes through transistor T144 to the positive input of comparator 546. The negative input of comparator 546 is voltage reference VCRL3 (minus 3 volts in this preferred embodiment). The output of operational amplifier 544 ramps downward and when it reaches 25 volts, the comparator output toggles flip flop FF195 so that Q becomes high, in whch case transistor T145 is gated on as its transistor T140. When transistor T140 is gated on, operational amplifier 544 is out of the circuit. Operational amplifier 545 comes into the circuit with its output connected through transistor T145 to comparator 546. The operation repeats as indicated above.

This dual-integrator VCO provides for a very fast VCO operation which otherwise would be limited by the speed of the operational amplifier. By immediately starting the other operational amplifier ramping, the delay ordinarily encountered is eliminated and a very fast VCO results.

AND NOR gates 547, 548 and 549, as shown, provide output signals CK1 and CK2, 8XCK2— and 16XCK2, respectively. Signal HLFSPD and signal HLFSPD— are input to each of circuits 547-549. Signal CL16 from comparator 546 is inverted and applied to gate 549.

The Q output of flip flop FF195 clocks toggle flip flop FF196 which provides signal CL8 on its Q output and clocks flip flop FF197. Flip flop FF197 provides signal CL4 on its Q output and clocks flip flop FF198 and flip flop FF200. Flip flop FF198 provides signal CL2 on its Q output and clocks flip flop FF199. The Q output of flip flop FF195 provides an input to circuit 548. The Q output of flip flop FF196 provides an input to circuit 458. The Q output from flip flop FF198 and the Q— output from flip flop FF200 provide inputs to circuit 547, as shown. The Q output of flip flop FF200 is signal DBR which, inverted, is signal CL—. These signals, as will be shown, are used in the equalization circuit to be described.

Figures 44D, 44E:
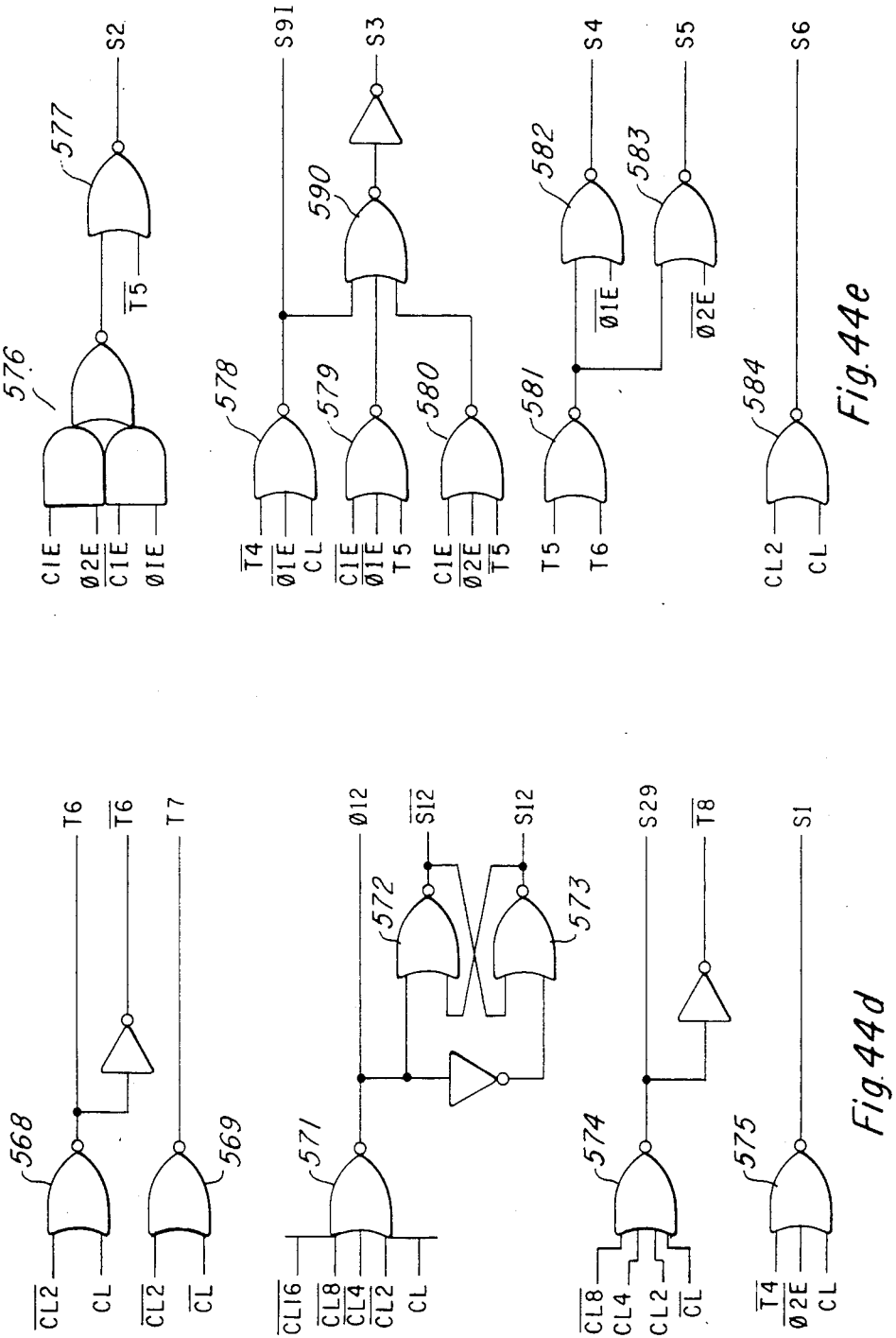

FIGS. 44A-44H are simple logic circuits illustrating the generation of timing and gating signals used in the equalizer circuit to be described. FIG. 44A illustrates equalizer signal IEQ connected to the K input of flip flop FF201 and, inverted, to its J input. The Q output from flip flop FF201 and the Q— output are connected to the J and K inputs of flip flop FF202 and provide signals CIE and CIE—, respectively. The Q output of flip flop 202 is connected to the J input of flip flop 203 and provides signal C2E. The Q output of flip flop 203 provides signal C3E.

Signal QEQ is connected to the K input of flip flop FF204 and, inverted, to its J input. The Q and Q— outputs of flip flop 204 are connected to the J and K inputs of flip flop 205 and provide signals S100 and S100—, respectively. The Q output of flip flop FF205 is connected to the J input of flip flop FF206 and provides signal S200. The Q output of flip flop FF206 provides signal S300.

FIG. 44B illustrates the generation of signals phi IE and phi IE—, and phi 2E and phi 2E—. Input signals CL16 and CL16— are connected to NOR gates 566 and 567, respectively. The output of each of NOR gates 566 and 567 is inverted four times and cross-coupled to each other. After the four inversions, signals phi IE and phi 2E are provided from NOR gates 566 and 567, respectively.

In FIG. 44C, it can be seen that NOR gates 561-564 all have three inputs in combinations of CL2, CL4 and CL8, and their inversions, to provide output signals S21, S22, S23, and S24, respectively. In addition, signal T4 is provided by inverting signal S24. Four input NOR gate 567 has inputs CL—, CL2, CL4, and CL8, and provides output signals T5 and, inverted, T5—.

FIG. 44D illustrates signals CL2— and CL as inputs to NOR gate 568, which provides output T6 and, inverted, T6—.

Signals CL2— and CL— provide inputs to NOR gate 569 whose output is signal T7.

NOR gate 571 receives signals CL, CL2—, CL4—, CL8— and CL16—. Its output is signal phi 12, which provides an input to NOR gate 572, and inverted, to NOR gate 573 which is cross coupled to NOR gate 572. The outputs from these NOR gates are signals S12— and S12.

NOR gate 574 receives inputs signals CL—, CL2, CL4 and CL8—, and provides output signals S29, and inverted, signal T8. NOR gate 575 has input signals CL, phi 2E and T4 to provide output signal S1.

FIG. 44E illustrates NAND NOR gate circuit 576 with s input signals CIE, Q2F, QIE, arranged as shown, to provide an input to NOR gate 577 whose other input is T5— and whose output signal is S2.

NOR gate 578 receives signals T4—, QIE—, and CL— to provide output signal S9I. It also provides an input to NOR gate 590. NOR gate 579 receives signals CIE—, QIE— and T5—. Gate 579 provide an input to NOR gate 590. NOR gate 580 receives signals CIE, Q2E— and T5— to also provide an input to NOR gate 590. The output of NOR gate 590 is inverted to provide signal S3.

NOR gate 581 receives signals T5 and T6 and its output provides an input to NOR gate 582 and an input to NOR gate 583. The other input to NOR gate 582 is phi 1E— and the other input to NOR gate 582 is phi 2E—. The output of NOR gate 582 is signal S4 and the output of NOR gate 583 is signal S5. NOR gate 584 receives signals CL and CL2 and provides output signal S6.

In FIG. 44F, AND NOR gate circuit 585 receives signals S100, S100—, Q2E, Q1E as inputs and its output provides one input to NOR gate 586 whose other input is provided by signal T5—. The output of NOR gate 586 is signal S8.

NOR gate 587 receives input signals S100—, phi 1E—, T5—, and provides one input to NOR gate 589. NOR gate 588 receives input signals S100, phi 2E—, T5— and its output provides another input to NOR gate 589. Signal S9I also provides an input to NOR gate 589 whose output, inverted, is signal S9.

NOR gate 591 receives input signals T78— and phi IE— to provide output signal S17.

NOR gate 592 receives signals T78— and phi 2E— to provide output signal S12. NOR gate 593 receives input signals T8— and phi 1E— to provide output signal phi 1V.

NOR gate 594 receives input signals T8— and phi 2E— to provide output signal phi E—.

FIG. 44G illustrates the production of other signals utilized in the equalization circuit. NOR gate 595 receives input signals T7 and S29 to provide output signal T78— which also provides inputs to NOR gates 601-604. AND OR gates 596-599 receive signals as shown. That is, circuits 596 and 597 receive combinations of signals X, Q1E and Q2E. Circuits 598 and 599 receive combinations of signals Y, Q1E and Q2E. The output from circuit 596 provides an input to each of NOR gates 601 and 602. The output of NOR gate 597 provides an input to each of NOR gates 602 and 605. The output of circuit 598 provides an input to each of NOR gates 603 and 607. The output of circuit 599 provides an input to each of NOR gates 604 and 608. Signal T6— provides the other input to each of NOR gates 605-608. The outputs provided from NOR gates 601-608 are signals S13-S16 and S25-S28, respectively.

FIG. 44H illustrates the production of signals X and Y and their inversions, as shown. Circuit 609 receives signals C2E, C3E, CL4 and CL4— and provides an input to AND NOR circuit 611. Further, inverted, circuit 609 provides an input to AND NOR circuit 612. AND NOR circuit 610 receives signals S2, S3, CL4 and CL4— and its output provides an input to each of AND NOR circuits 611 and 612.

Signals CL8 and CL8— are each input to circuits 611 and 612. The output of circuit 611 provides an input to a similar AND OR circuit 613. The output of circuit 612 provides an input to a similar AND OR circuit 614. T8—, S29 and S1 provide the other inputs to circuit 613. T8—, S29 and phi 1E— provide the other inputs to circuit 614. The output of circuit 613 is X—, and inverted, is X. The output of circuit 614 is Y—, and inverted, is Y.

These control signals are generated to serve as timing, gating and general control functions in the equalizer circuit, a description of which follows.

FIG. 45 is a schematic diagram of the adaptive equalizer used in this invention. Its use is highly beneficial because it greatly reduces noise that is cross-coupled between the send and receive channels of the telephone line transmission. Ideally, the I channel would be mathematically represented by a single cosine term with a single constant. The Q channel would be represented by a single sine term with a single constant. However, because of the cross-coupling, there is intermixing of various sines and cosines, theoretically an infinite number. This adaptive equalizer effectively eliminates four of these large, unwanted constants.

The circuits for IC0 and IC9 are identical. The description therefore will be restricted to IC0. IC0 is switched in by the signal S1 and stored on capacitor C178 and then sent into comparator 621 and its associated circuitry, an integrator circuit. It is clipped by comparator 622 and its output is signal IR which approximates a digital signal, having had the original IC0 analog signal input squared off. However, IC0 is also introduced directly by signal S12— into the comparator and gated out by signal S12 as analog signal IEQ. Signal IEQ is input to flip flop FF201 of FIG. 44A to develop signals C1E-C3E and CIE—. The signals are used in the development of other timing signals, including S2, S3, X and Y. It will be noted that X and Y in turn are used in development of signals S13 and S14, S21-S24, S25 and S26. The switches turned on by these various signals determine the sign of the error constant to be stored (S13 and S14) and the length of time stored. When signal IEQ is gated out via signal S12 to flip flop FF201, the summation phase is ended. Next, analog signal IREQ, the output from comparator 621, is fed back and inverted or not by signals S13 and S14. This is the beginning of the learning phase. Signals S21-S24, in sequential time, store the error constants in capacitors C170-C173. These capacitors are relatively large with respect to other capacitors in this system. This ends the learning phase with the various error voltages stored in capacitors C170-C173, with the proper sign. The summation phase begins again with the contents of the capacitors being summed with the output of operational amplifier 620 and with voltage VREQ. In this preferred embodiment, VREQ is two volts below the system reference of 5.5 volts. This sum is integrated and sent out as a digital signal IR.

As this process is iterated, the error signals become smaller until the values set in capacitors C170-C173 remain the same, the system having adaptively equalized itself.

Between the learning and summing phases, signals phi 1E and phi 2E, together with capacitor C174, provide an interim signal VCOIN which enters the circuit shown in FIG. 46.

As indicated above, the Q channel is handled in exactly the same manner as described for the T channel. Both signals IR and QR, output from comparators 622 and 624, respectively, are held in sample and hold circuits as shown and are gated out by signal S12—.

Signal S30 gates a transistor switch across each of capacitors C170-C173. Signal S30 is high if either signal VAD or EDT— is high. That is, if there is no energy detected in the receiver, the storage capacitors are shorted out. Also, in the VAD mode, the capacitors are shorted out because the equalization is not used.

FIG. 46 illustrates signal VCOIN as the input to an integrator circuit which includes operational amplifier 626 and also as bypassing that integrator circuit. The circuit illustrated here is much like the circuit described in FIG. 43A. Signal VCOIN is gated into the integrator by way of signal phi 2V and stored on capacitor C178. Note that signal EDT— activates the switch across operational amplifier 626 so that if no energy is detected, the integrator is disabled. The output of operational amplifier 626 is gated by signal phi 2V and is signal VCOIN in the bypass. These two signals are summed and enter a first order filter made up of operational amplifier 627 and associated circuits. The output of amplifier 627 is signal FVIN which is the error signal that is the voltage which is to be digitized in the analog to digital converter shown in FIG. 37D.

Receive Buffer

The receive buffer 23 of FIG. 1 essentially reverses the operations of the transmit buffer 11, described earlier. One major difference is that if, in the transmission, there has been an addition of stop bits, an adjustment is not necessary in the receive buffer. Only if stop bits have been removed, is it necessary for the receive buffer to compensate for such action taken at the transmission end. Therefore, there is no logic in the receive buffer for removing additional stop bits. Referring first to FIG. 47, combining circuit 700 is shown in block form. Phase decode logic 701 receives signals IR, IR—, QR and QR—. The output of phase decode logic 701 is input to flip flops 704 and 705 and subtract logic 702. In the transmit encoder section 12, an adder was employed (FIG. 7D) to add the current phase shift to the preceding phase shift. In the receive mode, the current phase shift must be subtracted from the prior phase shift. The output of the subtract logic, signals DP1 and DP2 go into logic 703. The output is signal RCDOUT.

FIG. 48 illustrates the components discussed in FIG. 47. It will be noted that the details of FIG. 48 are very similar to those shown in FIG. 7D for the transmit function.

FIG. 49 is a block diagram of the receive buffer, except for the circuit 700 just described. Signal RCDOUT, from circuit 700, is shown as an input to scrambler 650 and RDL counter 655.

FIG. 50 illustrates circuits 650 and 655 in somewhat more detail, illustrating, in addition, exclusive OR circuits 651, 652 and 653.

Figure 51B:
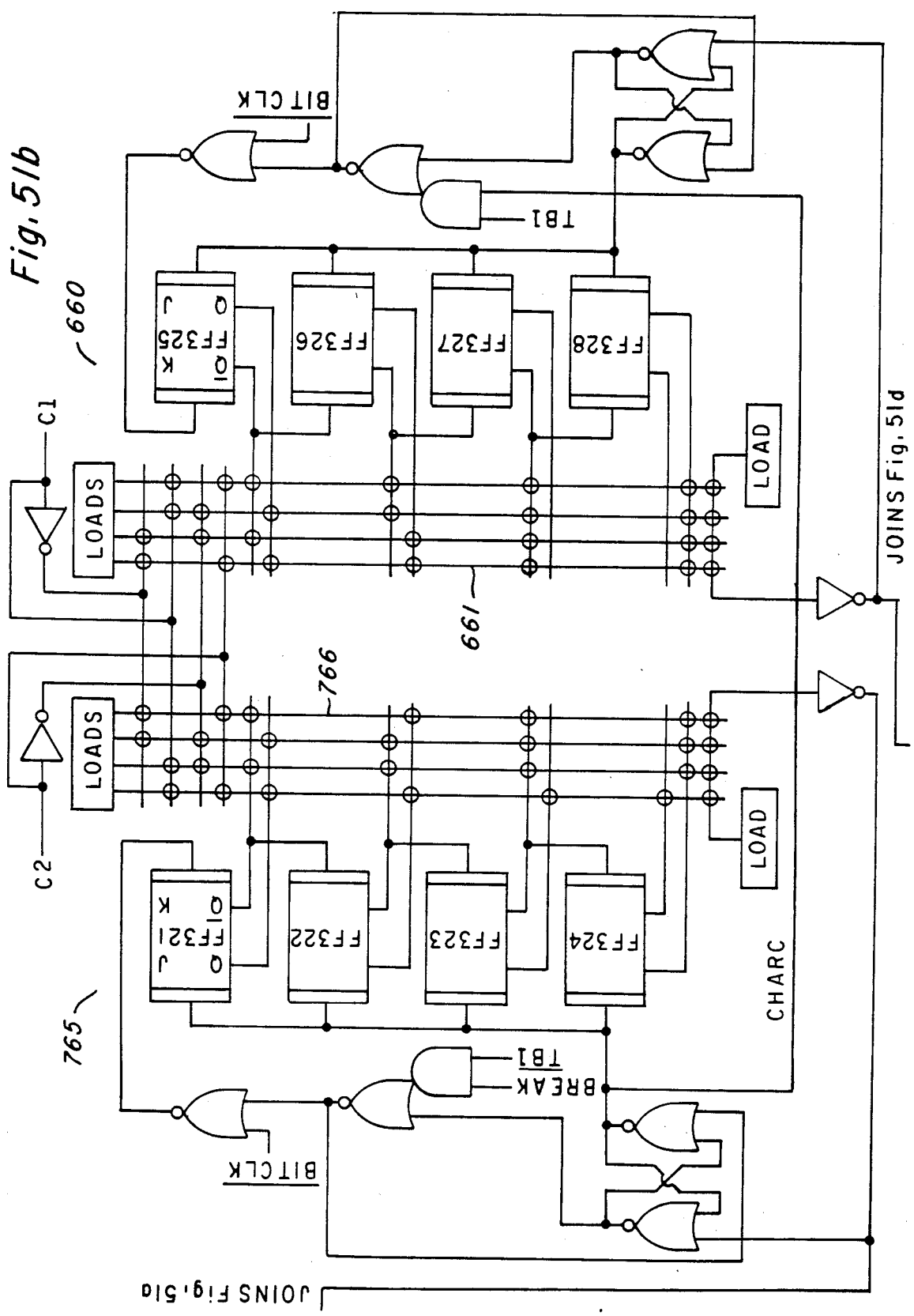
Figure 51C:
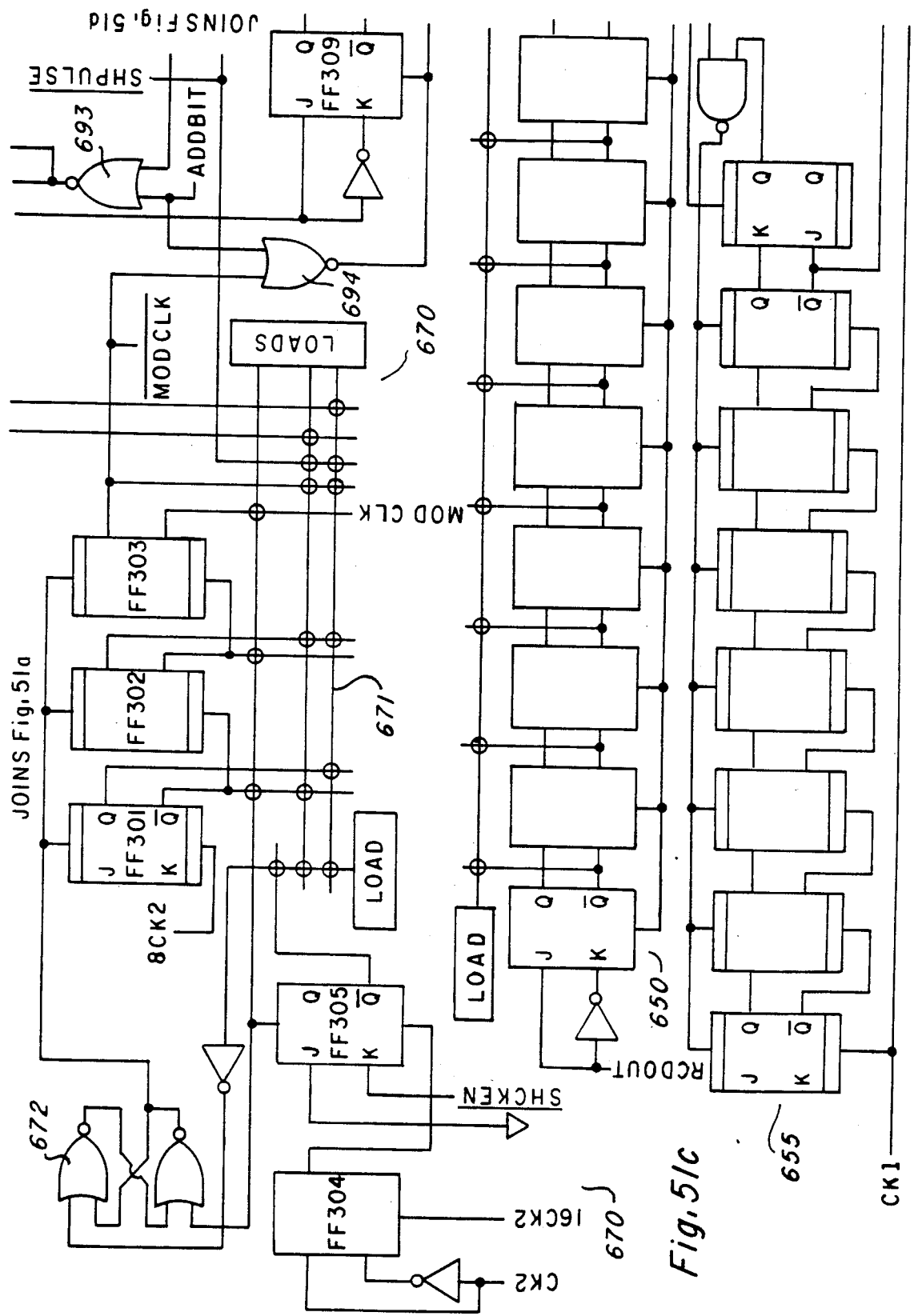
Figure 51E:
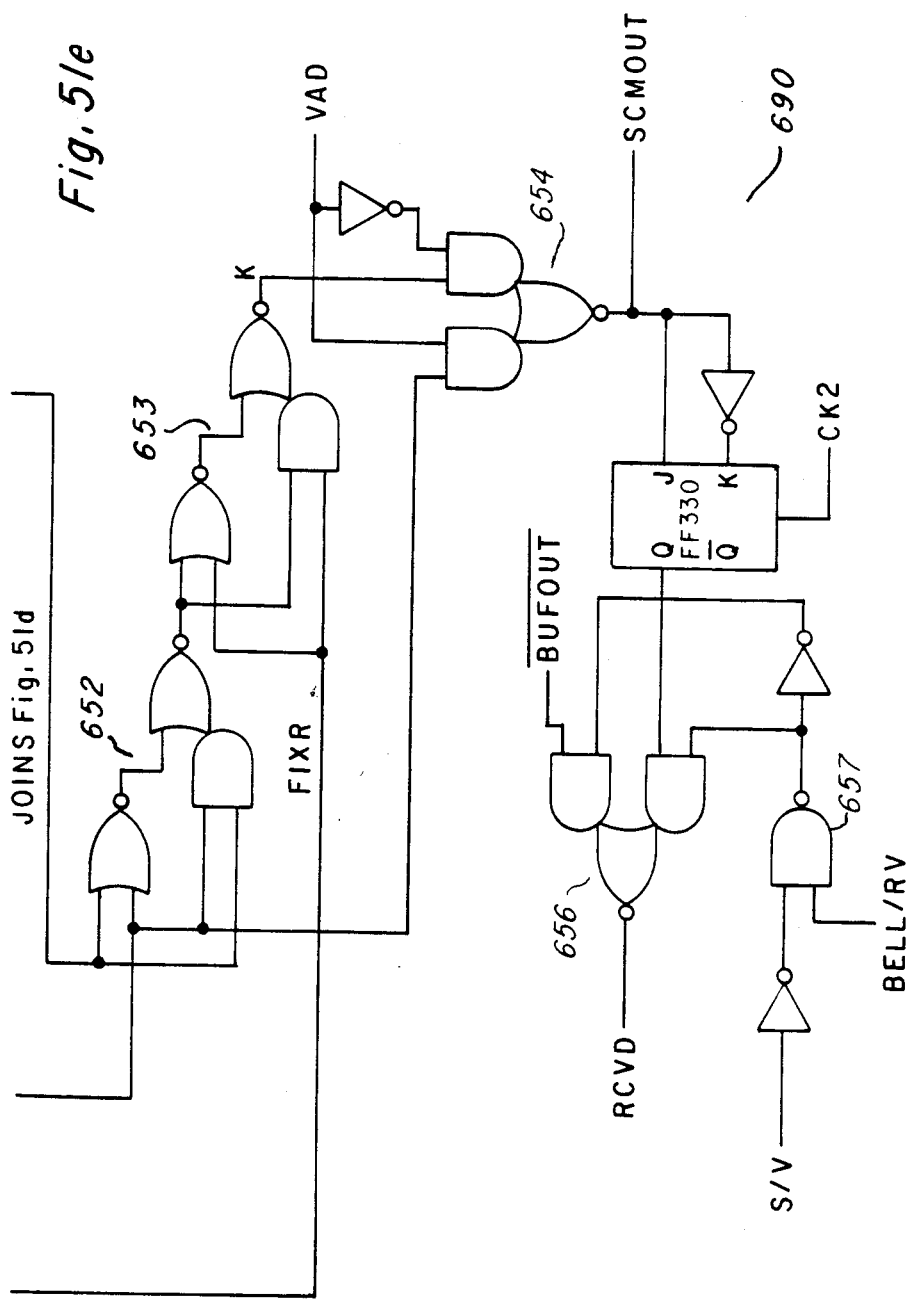

The detail of these circuits is shown in FIGS. 51C, 51D and 51E, joined as shown. Scrambler 650 is shown being made up of 17 flip flops with stages 14 and 17 being combined in the same fashion as in the transmitter circuit shown in FIG. 7. In the case of the receiver, of course, the scrambled data is unscrambled by the operation of the circuit 650.

PDL counter 655 is similar to PDL counter 208 shown in FIG. 7A. Again, this is a simple reversal of the action taken in the transmitter.

Special attention is called to the signal RCDOUT in FIG. 51D being applied to the exclusive OR circuit 652 shown in FIG. 51E. Exclusive OR circuit 652 provides an input to exclusive OR circuit 653, along with signal FIXR from PDL counter 655. The output from exclusive OR circuit 653 provides an input to AND NOR gate 654 whose output is signal SCMOUT. This signal sets flip flop 330 whose output is one input to AND NOR gate 656. The output of NAND gate 657 provides an input, inverted, and direct, to circuit 656. The inputs to AND gate 657 are S/A inverted, and BELL/RV. The output signal from 656 is RCVD, the output from the receive buffer 23 to terminal 5. The circuitry described permits the bypassing of the entire receive buffer 23 when the conditions are proper, such as total synchronization transmission. Also, any protocols not requiring scrambling and stop bit removal may avoid the receive buffer through this circuit described.

In those protocols where stop bits have been removed, it is necessary in the receive buffer 23 to reinsert stop bits so that the message may be understood. The stop bits were removed originally because the rate from the digital apparatus source to the modem transmitter was higher than the transmission speed on the telephone line and therefore stop bits had to be removed to enable the signal to be sent. As indicated, on the receive end, the stop bits must be reinserted. Virtually all of the remaining circuits in the receive buffer 23 not previously described are required for the stop bit insertion procedure. Signal SCMOUT from the output of circuit 654 is input to character buffer 690 shown in FIG. 51A directly to the J input and inverted to the K input which serves as a special purpose first stage for the character buffer register of flip flop FF307. Signal SCMOUT provides one input to AND NOR gate 692 with its other inputs coming from the Q output of flip flop FF307 and signals LS and LS— from missing stop detect logic 740. The output of circuit 692 is connected to the J input of flip flop FF309, and inverted to its K input. Flip flop 309 is the first flip flop of eleven flip flops forming a register with flip flop 311 being the eleventh flip flop.

Character counter 765 counts incoming bits to determine that the character has been completed. The length of the character is determined by signals C1 and C2 shown in FIG. 51D which are set to the same values as signals C1 and C2 at the transmitter end. The clock signal for character buffer 690, from NOR gate 694, is inverted and provides signal BIT CLK—, which is an input to the character counter 765. Character counter 765 is a register assembly made up of flip flops FF321–FF324 and PLA 766. The output from PLA 766 is inverted and is an input to a pair of cross-coupled NOR gates which condition an input gate and preset the flip flops FF321–FF374. Signal TB1— from the Q— output of flip flop 309 of the character buffer 690 and signal BREAK from missing stop detect logic 740 are input along with signal BIT CLOCK- to the counter 765. Signals C1 and C2 provide inputs to PLA 766 for governing the count of flip flops FF321–FF324 to indicate when a particular character length has been reached.

When the completed character is indicated, output signal CHCKEN (character clock enable) from character counter 765 provides clocking for flip flops FF314 and FF315 of missing stop detect logic 740.

When the full character has been received in the character buffer 690, the missing stop detect logic 740 checks to determine whether there is a missing stop bit. The action is started through the clocking of flip flops FF314 and FF315. Flip flop FF314 has signal TB1, the Q output of flip flop FF309, applied to the J input and its negation from Q— to the K input. When the end of character is indicated, then flip flop FF314 is set if TB1 is high, indicating a stop bit. If low, the Q output from flip flop FF314 will be 0, indicating no stop bit. To determine that the absence of a stop bit is actually that occurrence and not a data break, it is necessary that the end of the next character be examined also. At the end of the next character, the contents of flip flop FF314 are transferred into flip flop FF315 and NOR gate 744 receives the Q— output from flip flop FF314 and the Q output of flip flop FF315. If there was indeed a missing stop bit, then the Q— output from flip flop FF314 and the Q output of flip flop FF315 will both be 0 and the output from NOR gate 744 will be high. That will set flip flop FF312 until cleared by signal MODCLK, generated by the clock counter 670 and shown in FIG. 51C. Then signal ADDBIT goes high. Signal ADDBIT provides one input to NOR gate 694 whose other input is signal MODCLK—. As indicated earlier, the output of NOR gate 694 clocks flip flops FF309 through FF311.

Signal ADDBIT also provides one input to NOR gate 693 of character buffer 690. The output of NOR gate 693 forces the output of the character buffer to appear high as indicated by signal BUFOUT—.

Also, signal M from the Q output of flip flop FF313 is high and is input to cross-coupled NOR gate 696 shown in FIG. 51C. Together with signal BUFOUT—, and through NAND gate 697, signal SHPULSE— (short pulse enable) goes high. This enables the short pulse counter 680 and also inputs the clock counter 670 to provide a short pulse. Signal SHCHEN— output from cross-coupled NAND gates 742 of missing stop detect logic 740 goes high and presets flip flops FF316–FF319 of short pulse counter 680.

Also, cross-coupled NAND gate 741 of missing stop detect logic 740 causes signal LS to go high when a stop bit is to be added. Signal LS gates the Q output of flip flop FF307 of character buffer 690 into circuit 692. Flip flop FF307 acts as an extra stage in the character buffer for the insertion of a stop bit if necessary. It should be noted that flip flops FF307 and FF308 are gated by MODCLK while the flip flops in the character buffer 690 are gated by MODCLK but disabled by ADDBIT so that those flip flops do not shift when a stop bit is added, only flip flops FF307 and FF308. FF308 serves as a special final stage in the buffer register. The clock counter 670 is made up of cross coupled NOR gate 672, flip flops FF301–FF303, FF304 and FF305, and PLA 671. Ordinarily, flip flops FF301–FF303 free run. When the short count is enabled, the PLA causes a reset of the flip flops after a specified count. There is a reset after seven counts in normal mode and six counts in the over-speed mode.

Stop bit counter 660 counts stop bits and is shown in detail in FIG. 51B. It is the mirror image of character counter 765 with slightly different inputs. It has one input from counter 765, one from signal TB1 and one from signal bit CLK—. The output from counter 660 enables cross-coupled NOR gate 696 to be set by signal M.

FIG. 52 illustrates an input series of characters with a stop bit missing at time T1. At the output, a 3/4 size bit is inserted. This illustration is of an over-speed protocol so that a 3/4 pulse is added rather than a 7/8. At time T2, the stop bit is shortened as shown in the output waveform. At time T3, it is again shortened as shown and at time T4 it is shortened again with the input and output signal now being in phase.

To summarize the operation of the receive buffer, FIG. 47 illustrates the reconstruction of a single digital train signal RCDOUT. FIG. 49 is a block diagram of the remainder of the receive buffer. Scrambler 650 and PDL counter 655 reverse the operation of counterparts in the transmit buffer. When the transmission is such that the receive buffer is to be utilized, the scrambler output MCMOUT goes into the character buffer 690. Bits in the character are counted by counter 765, dependent upon the state of control signals C1 and C2. At the end of the character, missing stop detect logic 740 determines whether a stop bit is missing. If a stop bit is evidently missing, then the next character is read into the character buffer and again the absence or presence of a stop bit is detected. If it is not missing, then the presumed missing stop pulse from the previous detection is indeed a missing stop pulse and not a break in the transmission. A pulse must be inserted through the interaction of short pulse counter 670. A short pulse is inserted into the end of the first character in the character buffer in a special flip flop, designed for that purpose. The stop bits must be shortened to get the incoming pulse train in phase with that as modified by the inclusion of a stop bit. The stop bits must be narrowed as indicated in FIG. 52. The total number of stop bits, narrowed, is determined by the particular transmission protocol. In the example in FIG. 52, a total of four stop bits is involved.

Mode of Operation

The precise circuitry and details of operation have been given in the detailed description above. The generalities of the operation are described below.

First, refer to FIG. 1. The origin of digital data, shown here as terminal 5, provides a serial train of digital data into the transmit buffer 11. The transmit buffer 11 is a circuit that allows variable speed asynchronous data to be transmitted synchronously. In the case of synchronous transmission from terminal 5 to terminal 7, the transmit buffer is not used. Each character, made up of 8-11 bits, is preceded by a start bit and followed by one or two stop bits in the most widely accepted protocols. The bits in each character are transmitted at a fairly narrow data rate but the character rate can be varied widely.

In normal 1200 BPS operation, a buffer is designed to accept data from digital source 5 at the rate of 1180 to 1204 BPS to transmit it over the telephone line at a constant BPS. If that constant BPS is higher than the BPS rate of the digital data source, then stop bits must be added. If it is lower, stop bits must be deleted.

As soon as the start bit occurs, the circuit starts counting bits and as it receives each bit, it synchronizes the bit with the transmit data clock 16. Transmit buffer 11 employs a scrambler which is used to insure that the transmitted carrier is phase shifted often enough for the receiving modem to remain in lock. If raw data is transmitted directly, then particular, regular bit patterns (e.g., alternating mark-space data) may result in transmitting a carrier with zero degree phase shifts. After a few milliseconds of this transmission, the receiving modem would lose lock and be unable to demodulate the data. With the scrambler, the actual pattern resulting in a constant carrier is quite complex and the probability of transmitting it by accident is significantly reduced. Also included (and not shown in FIG. 2) is RDL counter 208 shown in FIG. 7A. A remote loop back operation for testing may be initiated by a signal dependent upon the number of consecutive ones. The RDL counter counts to 128, and if such a count is reached, then the next bit is inverted to avoid locking in the RDL loop. As mentioned above, stop bits are either added or deleted through circuits described in detail earlier.

The corrected digital data goes into the transmitter which has an encoder, a modulator and a transmitter filter. The encoder translates the data to be transmitted into phase shift information to be used by the modulator. Typically, the baud rate is 600 if the data is at a rate of approximately 1200 BPS. This is accomplished through two bits that provide information for four phase PSK transmission. Two bits are required for each change of phase.

The dibit encoder is completely data independent for any particular pair of bits, the encoder must be signaled as to the particular protocol being used. Once it has been advised, the circuit generates the proper phase shift information. This circuit is shown in FIG. 7B, providing output signals DIN1 and DIN2, and their inversions.

These signals are input to FIG. 12 to provide appropriate clocking signals. The next circuit is the transmit modulator. The details are shown in FIGS. 16A and 16B with signal PSK out as the modulated analog output signal.

Signal PSKOUT is then filtered by a transmit filter which is made up of a voice band filter to reject out of band signals and an equalizer filter that predistorts the signal to account for distortion in phase and amplitude in the telephone line. The filter is actually formed in two sections. Signal TXPA results.

FIG. 1 illustrates signal REVA being received by the modem receiver. The input filter acts as an antialiasing filter and prevents high frequency signals from entering the demodulator. Details of this and successive input filters are shown in FIG. 26 and FIGS. 29A-29E. These filters are intended to compensate for telephone line distortion. They do not compensate for cross-talk between the transmit and receive lines.

Receive AGC19 is the automatic gain control circuitry for adjusting gain as described in detail.

Carrier recovery 20 and clock recovery 21 have been described in great detail and provide the necessary data and accurate clocking for the receive decoder 22.

Receive decoder 22 includes the equalizer described in FIG. 45 to essentially remove the cross-talk that is not removed by the incoming filters. The output of receive decoder 22 is a dibit code which is received by receive buffer 23 and recombined to provide a binary train of pulses. If that train is of a protocol that did not require removing stop bits, then the receive buffer is essentially bypassed except for unscrambling, in some cases. If the transmission is synchronous, the receive buffer is bypassed. Otherwise, stop bits are added and made of shorter duration to maintain frequency. Finally, the digital data receiver 7 receivers the demodulated digital data.

The operation described is, of course, greatly dependent on the filters employed. The Z domain transfer functions of critical ones of those filters are given below:

The format is: A B C
D E F for the equation $\dfrac{V_{out}}{V_{in}} = \dfrac{A + BZ^{-1} + CZ^{-2}}{D + EZ^{-1} + FZ^{-2}}$

PSK TRANS BASE BAND FILTER
FIG. 16B
TF(2) =
−.13553719   0.0              0.0
1.0          .944903581       0.0 Stage #1
FIG. 16B
TF(4) =
−.2840427033D+00   .5520951888D+00   −.2840427033D+00
.1000000000D+01    −.1933781048D+01  .9497505052D+00
Stage #2
FIG. 16A
TF(6) =
−.4258555133D+00   .9484647959D+00   −.5286198746D+00
.1000000000D+01    −.1905102369D+01  .9114134902D+00
Stage #3

PSK TRANS EQ FILTER BELL LOW BAND MODE
FIG. 16A
TF(2) =
−.086279225  0.0              0.0
1.0          −.595691383      0.0 Stage #1
FIG. 18
TF(4) =
−.2646669607D+00   .3618425363D+00   −.2646669607D+00
.1000000000D+01    −.1488313818D+01  .8019414370D+00
Stage #2
FIG. 19
TF(6) =
−.6685998343D+00   .1477479369D+01   −.1000000000D+01
.1000000000D+01    −.1477285528D+01  .6684059933D+00
Stage #3

PSK TRANS EQ FILTER VAD LOW BAND MODE
FIG. 16A
TF(2) =
−.083558325  0.0              0.0
1.0          −58099688        0.0 Stage #1
FIG. 18
TF(4) =
−.2657807309D+00   .3493649127D+00   −.2657807309D+00
.1000000000D+01    −.1443617288D+01  .7679271456D+00
Stage #2
FIG. 19
TF(6) =
−.5820271682D+00   .1455284920D+01   −.1000000000D+01
.1000000000D+01    −.1455325188D+01  .5820674361D+00
Stage #3

PSK TRANS EQ FILTER VAD HIGH BAND MODE
FIG. 16A
TF(2) =
−.11695736   0.0              0.0
1.0          −.41351744       0.0 Stage #1
FIG. 18
TF(4) =
−.5671077505D+00   .1065800262D+01   −.5671077505D+00
.1000000000D+01    −.1316617280D+01  .5778779748D+00
Stage #2
FIG. 19
TF(6) =
−.5469988675D+00   .9660245151D+00   −.1000000000D+01

-continued

.1000000000D+01    −.9660249151D+00  .5469988675D+00
Stage #3

PSK TRANS EQ FILTER BELL HIGH BAND MODE
FIG. 16A
TF(2) =
−.08798177   0.0              0.0
1.0          −.5588154898     0.0 Stage #1
FIG. 18
TF(4) =
−.6079027356D+00   .1123270375D+01   −.6079027356D+00
.1000000000D+01    −.1056720361D+01  .5457683457D+00
Stage #2
FIG. 19
TF(6) =
−.7320830543D+00   .1306764903D+01   −.1000000000D+01
.1000000000D+01    −.1306764903D+01  .7320830543D+00
Stage #3

Figure 29E:
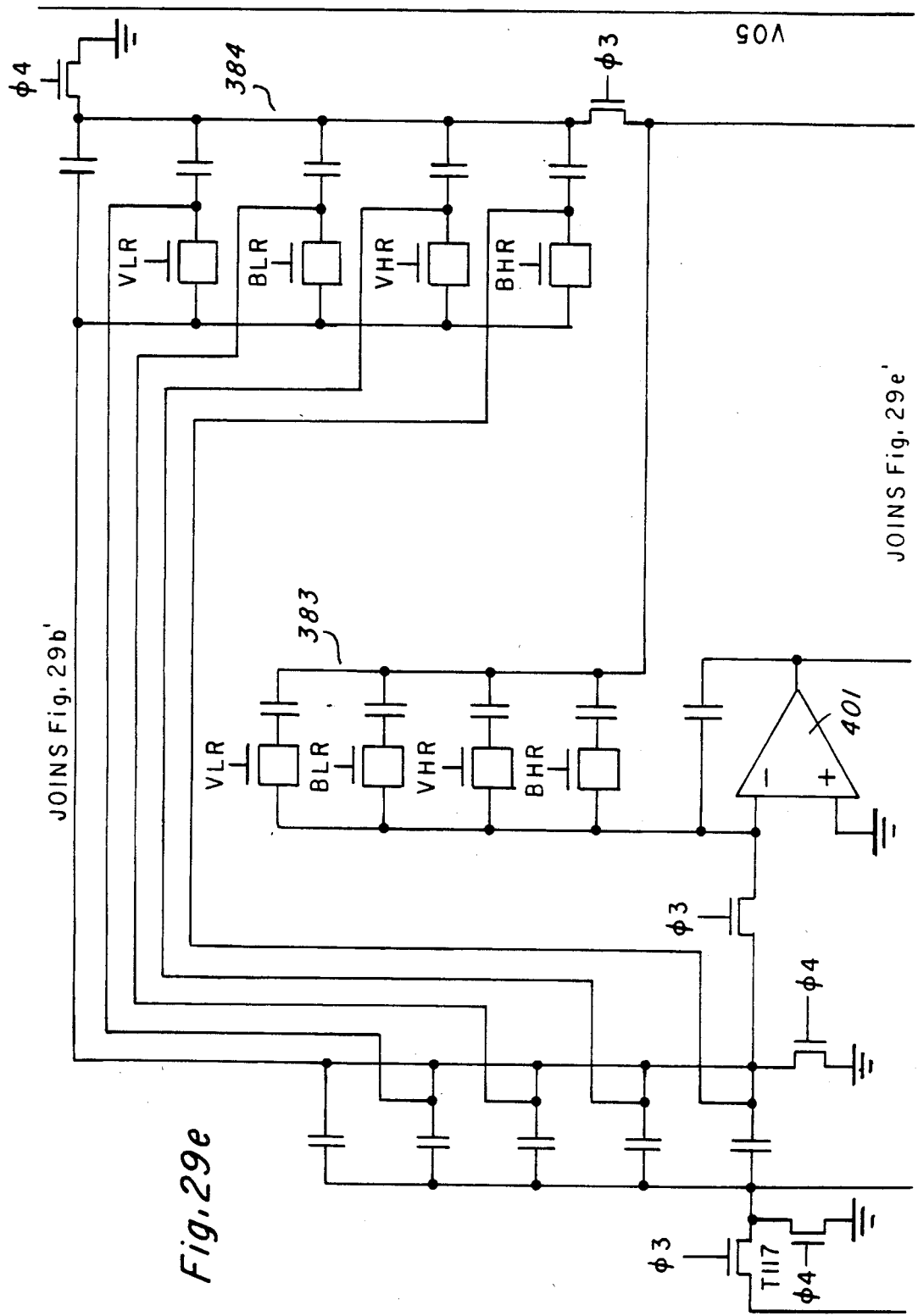
Figure 29E:
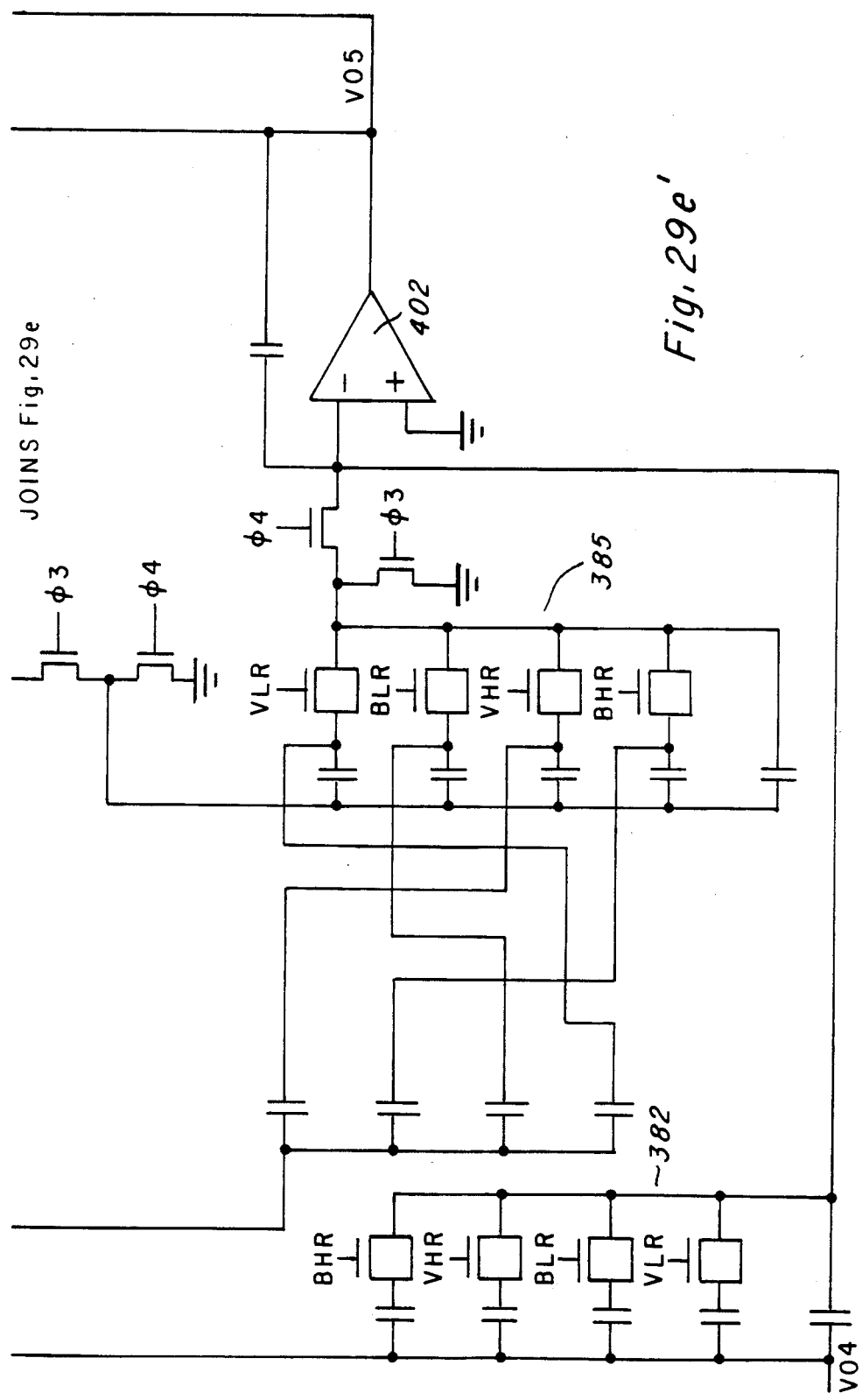

PSK RCV FILTER BELL LOW BAND MODE
FIG. 29A
TF(2) =
−.4789329488D+00   .9423457535D+00   −.4789329488D+00
.1000000000D+01    −.1845998266D+01  .9184990674D+00
Stage #1
FIG. 29A
TF(4) =
−.1220184459D+00   .1432479098D+00   −.1220184459D+00
.1000000000D+01    −.1683997559D+01  .8981989368D+00
Stage #2
FIG. 29D
TF(6) =
−.8211057500D+00   .1639753504D+01   −.9335981121D+00
.1000000000D+01    −.1767598274D+01  .8950997780D+00
Stage #3
FIG. 29D
TF(8) =
−.1288792727D+01   .2140557100D+01   −.1288792727D+01
.1000000000D+01    −.1677994432D+01  .9690999857D+00
Stage #4
FIG. 29E
TF(10) =
−.7161768048D+00   .1390376290D+01   −.8279012954D+00
.1000000000D+01    −.1725998059D+01  .9018039210D+00
Stage #5
FIG. 29B
TF(12) =
−.2221887895D+00   .3469711558D+00   −.2221887895D+00
.1000000000D+01    −.1680012944D+01  .9218046100D+00
Stage #6
FIG. 29C
TF(14) =
.1367982287D+00    −.1369311015D−04  −.1367845355D+00
.1000000000D+01    −.1819999844D+01  .9127963858D+00
Stage #7

PSK RCV FILTER BELL HIGH BAND MODE
NO STAGE #1
FIG. 29A
TF(2) =
−.1677444433D+00   .3038289869D+00   −.1677444433D+00
.1000000000D+01    −.1432002404D+01  .9190013127D+00
Stage #2
FIG. 29D
TF(4) =
−.1018741704D+01   .1589229948D+01   −.1159320284D+01
.1000000000D+01    −.1332002254D+01  .8879988355D+00
Stage #3
FIG. 29D
TF(6) =
−.5244339540D+00   .9639719093D+00   −.5244339540D+00
.1000000000D+01    −.1476622130D+01  .9045085635D+00
Stage #4
FIG. 29E
TF(8) =
−.9522289978D+00   .1344168379D+01   −.1120398076D+01
.1000000000D+01    −.1213206683D+01  .9297003826D+00
Stage #5
FIG. 29B
TF(10) =
−.4714735258D+00   .8027191717D+00   −.4714735258D+00

-continued

| | | |
|---|---|---|
| .1000000000D+01 | −.1549975314D+01 | .9474979892D+00 |
| | | Stage #6 |
| FIG. 29C | | |
| TF(12) = | | |
| .1044611116D+00 | −.2558824458D−05 | −.1044585528D+00 |
| .1000000000D+01 | −.1271989969D+01 | .9039999454D+00 |
| | | Stage #7 |

PSK RCV FILTER VAD LOW BAND MODE

| | | |
|---|---|---|
| FIG. 29A | | |
| TF(2) = | | |
| −.5033886085D+00 | .9891572882D+00 | −.5033886085D+00 |
| .1000000000D+01 | −.1845997629D+01 | .9184994814D+00 |
| | | Stage #1 |
| FIG. 29A | | |
| TF(4) = | | |
| −.1177897923D+00 | .1382889281D+00 | −.1177897923D+00 |
| .1000000000D+01 | −.1683997559D+01 | .8981989368D+00 |
| | | Stage #2 |
| FIG. 29D | | |
| TF(6) = | | |
| −.8778997493D+00 | .1732886822D+01 | −.9832494048D+00 |
| .1000000000D+01 | −.1786804792D+01 | .9153009465D+00 |
| | | Stage #3 |
| FIG. 29D | | |
| TF(8) = | | |
| −.1285470758D+01 | .2135028833D+01 | −.1285470758D+01 |
| .1000000000D+01 | −.1677994041D+01 | .9690999857D+00 |
| | | Stage #4 |
| FIG. 29E | | |
| TF(10) = | | |
| −.6552249830D+00 | .1267280356D+01 | −.7499147792D+00 |
| .1000000000D+01 | −.1744295294D+01 | .9191971264D+00 |
| | | Stage #5 |
| FIG. 29B | | |
| TF(12) = | | |
| −.2386977603D+00 | .3727373582D+00 | −.2386977603D+00 |
| .1000000000D+01 | −.1680007902D+01 | .9218021986D+00 |
| | | Stage #6 |
| FIG. 29C | | |
| TF(14) = | | |
| .1301901943D+00 | −.9484632426D−05 | −.1301807097D+00 |
| .1000000000D+01 | −.1820004476D+01 | .9128060989D+00 |
| | | Stage #7 |

PSK RCV FILTER VAD HIGH BAND MODE

NO STAGE #1

| | | |
|---|---|---|
| FIG. 29A | | |
| TF(2) = | | |
| −.1677444433D+00 | .3038301681D+00 | −.1677444433D+00 |
| .1000000000D+01 | −.1432001270D+01 | .9190013012D+00 |
| | | Stage #2 |
| FIG. 29D | | |
| TF(4) = | | |
| −.1018741704D+01 | .1589238009D+01 | −.1159320284D+01 |
| .1000000000D+01 | −.1332018081D+01 | .8880051775D+00 |
| | | Stage #3 |
| FIG. 29D | | |
| TF(6) = | | |
| −.7669376694D+00 | .1356849181D+01 | −.7669376694D+00 |
| .1000000000D+01 | −.1476678727D+01 | .8892950700D+00 |
| | | Stage #4 |
| FIG. 29E | | |
| TF(8) = | | |
| −.1346583892D+01 | .1916848585D+01 | −.1536180871D+01 |
| .1000000000D+01 | −.1165000162D+01 | .9055991431D+00 |
| | | Stage #5 |
| FIG. 29B | | |
| TF(10) = | | |
| −.4746338552D+00 | .8081002725D+00 | −.4746338552D+00 |
| .1000000000D+01 | −.1549984165D+01 | .9474979776D+00 |
| | | Stage #6 |
| FIG. 29C | | |
| TF(12) = | | |
| .1131656347D+00 | .4960650717D−05 | −.1131705953D+00 |
| .1000000000D+01 | −.1272008913D+01 | .9040030490D+00 |
| | | Stage #7 |

Anyone skilled in the art is capable of departing from the preferred embodiment shown herein without departing from the spirit of the invention. The invention is not limited by this preferred embodiment, with obvious implementation changes possible, but is limited only by the appended claims.

What is claimed is:

1. An integrated circuit PSK modem for transmitting and receiving PSK signals derived from digital signals over a first and second carrier frequency respectively, comprising:
   (a) transmit encoding means for encoding digital data into a first format for conversion to corresponding PSK signals;
   (b) transmit modulating means implemented in switched capacitor circuits and connected to receive the first format, having at least one filter with a plurality of selectable capacitors connected in parallel, for phase modulating the first carrier frequency according to the first format to provide corresponding PSK signals;
   (c) receive demodulating means, implemented in switched capacitor circuitry, having at least one filter with a plurality of selectable capacitors connected in parallel, for demodulating the PSK signals on the second carrier frequency to provide PSK signals in a second format for conversion to corresponding digital signals;
   (d) receive encoding means connected to receive the second format for encoding the second format into corresponding digital signals; and
   (e) switch means, connected to the filter in each of the modulating and demodulating means, each switch means comprising means for selecting at least one capacitor for connection to the filter and means for nullifying the stray capacitance of any unselected capacitor.

2. The modem of claim 1, wherein the switch means comprises a reference voltage common with the filter reference voltage.

3. The modem of claim 2, wherein the selecting means comprises a switch connected between each capacitor and the filter.

4. The modem of claim 3, wherein the nullifying means comprises a switch connected between each capacitor and the reference voltage.

5. The modem of claim 4, wherein the selecting switch and the nullifying switch comprise FET transistors activated to permit the selecting transistor to be turned on when the corresponding nullifying transistor is turned off, and vice-versa.

6. A multi-mode switched capacitor filter, comprising:
   (a) an operational amplifier having a first input connected to a reference voltage, and having a second input;
   (b) a plurality of capacitors selectably connected in parallel to the second input of the operational amplifier;
   (c) means for connecting any or all of the plurality of capacitors to the second input of the operational amplifier; and
   (d) means for nullifying the stray capacitance of any unselected ones of the selectable capacitors and the stray capacitance of a associated selecting means by connecting the stray capacitance of any unselected ones of the selectable capacitors and of the associated selecting means to the reference voltage to thereby nullify the effect of the stray capacitances on the second input of the operational amplifier.

7. The circuit of claim 6, wherein the selecting means comprises a switch between each capacitor and the circuit.

8. The circuit of claim 7, wherein the nullifying means comprises a switch between each capacitor and the reference voltage.

9. The circuit of claim 8, wherein the selecting switch and the nullifying switch comprise FET transistors activated to permit the selecting transistor to be turned on when the corresponding nullifying transistor is turned off, and vice-versa.

* * * * *